United States Patent [19]

Morten et al.

[11] Patent Number: 5,021,949

[45] Date of Patent: Jun. 4, 1991

[54] METHOD AND APPARATUS FOR LINKING AN SNA HOST TO A REMOTE SNA HOST OVER A PACKET SWITCHED COMMUNICATIONS NETWORK

[75] Inventors: Richard M. Morten, Gaithersburg; Ted P. Smith, Frederick, both of Md.

[73] Assignee: International Business Machines Corporation, Armonk, N.Y.

[21] Appl. No.: 161,647

[22] Filed: Feb. 29, 1988

[51] Int. Cl.⁵ ............................................. H04J 3/24
[52] U.S. Cl. ................................. 364/200; 370/94.1; 370/60; 364/242.94; 364/240.8; 364/242.96; 364/242.5; 364/284; 364/284.4
[58] Field of Search ... 364/200 MS File, 900 MS File; 370/94.1, 60

[56] References Cited

U.S. PATENT DOCUMENTS

| | | | |
|---|---|---|---|
| 4,200,930 | 4/1980 | Rawlings et al. | 364/200 |
| 4,500,960 | 2/1985 | Babecki et al. | 364/200 |
| 4,586,134 | 4/1986 | Norstedt | 364/200 |
| 4,677,588 | 6/1987 | Benjamin et al. | 364/900 |
| 4,855,905 | 8/1989 | Estrada et al. | 364/200 |

OTHER PUBLICATIONS

F. N. Parr et al., "Protocol Boundary for SNA Terminals with Condensed State Information," IBM TDB, Aug. 1982, pp. 1317-1319.
R. C. Campbell et al., "Series/1 Terminal Interface Processor System Program," IBM TDB, Nov. 1985, pp. 2316-2318.
M. P. Caraballo et al., "Programmable Communications Processor," IBM TDB, Mar. 1985, pp. 6323-6324.
A. Cohen et al., "3275 Dial SNA Gateway Facility," IBM TDB, Mar. 1986, p. 4378.
B. Gavis et al., "Technique for Optimal Assignment of Traffic to Routes in Telecommunication Networks," IBM TDB, Apr. 1983, pp. 5970-5973.

Primary Examiner—Gareth D. Shaw
Assistant Examiner—Kevin A. Kriess
Attorney, Agent, or Firm—John E. Hoel

[57] ABSTRACT

The invention disclosed herein provides the basic operating capabilities of SNA data communications for host based application-to-application sessions across a packet switched network such as the Defense Data Network (DDN). The problem that is presented by the integration of these two technologies is that SNA is a connection oriented technology and DDN is a connectionless technology that requires an Internetting Protocol (IP) header on all information transmitted through the network and across multiple networks. One of the concepts of the invention is the definition of a localized SNA network to each SNA host by the channel attached Front End Processors (FEPs). These FEPs present an SNA PU4 definition to the host to allow it to carry out regular SNA sessions over the packet switched network to another host through its own respective FEP. The two FEPs working together imbed the SNA protocols in the IP datagrams and provide the proper SNA connections and control. This technique also allowed any host to access any other host for which it has authorization.

20 Claims, 26 Drawing Sheets

FIG. 17.

| SYSTEM ELEMENTS | EXPLANATION |
|---|---|
| HOST NODES | SYSTEM/370 ARCHITECTURE MACHINES RUNNING WITH MVS OR VM, AND VTAM. SOME HOST NODES ARE NCHs. NCHs MUST RUN WITH MVS. ALL HOST NODES HAVE AT LEAST ONE CHANNEL-ATTACHED FEP OR NCF. A NCF CAN HAVE ONLY ONE CHANNEL-ATTACHED NCH NODE. |
| SERIES/1 NODES | SERIES/1 NODES ARE CONFIGURED AS NCFs, FEPs, OR RAFs. |
| SERIES/1 NODE RESOURCES | THESE RESOURCES ARE THE HARDWARE AND SOFTWARE CONFIGURATIONS AT EACH SERIES/1 NODE.<br><br>FOR INSTANCE, A RAF CONFIGURATION MIGHT HAVE SEVERAL DOWNSTREAM 3274s, AND EACH 3274 CONFIGURATION MIGHT INCLUDE SEVERAL TERMINALS AND PRINTERS. ALL OF THESE DEVICES AND THE SOFTWARE AND HARDWARE REQUIRED TO OPERATE THEM ARE SERIES/1 NODE RESOURCES ASSOCIATED WITH THAT RAF.<br><br>ALSO, ONE FEP CONFIGURATION MIGHT HAVE THE HOST-TO-HOST APPLICATION SOFTWARE, WHILE ANOTHER FEP CONFIGURATION MIGHT HAVE TWO OR THREE INSTANCES OF THE TERMINAL-TO-HOST APPLICATION SOFTWARE. THESE SOFTWARE APPLICATIONS AND THE HARDWARE AND SOFTWARE REQUIRED TO OPERATE THEM ARE SERIES/1 NODE RESOURCES ASSOCIATED WITH THOSE FEPs. |
| NETWORK TOPOLOGY | THE NETWORK TOPOLOGY IS ALL OF THE RELATIONSHIPS THAT ALLOW COMMUNICATION BETWEEN DDN/SNA NODES AND THEIR RESPECTIVE SYSTEM SERVICE CONTROL POINTS (SSCPs), PUs, AND LUs, INCLUDING DDN ADDRESSES NEEDED FOR COMMUNICATION PATHS ACROSS THE DDN. |

METHOD AND APPARATUS FOR LINKING AN SNA HOST TO A REMOTE SNA HOST OVER A PACKET SWITCHED COMMUNICATIONS NETWORK

BACKGROUND OF THE INVENTION

1. Technical Field

The field of the invention relates to data processing and more particularly relates to a method and apparatus for linking SNA data processing equipment over a packet switched communications network.

2. Background Art

In 1974, IBM's System Network Architecture (SNA) significantly advanced the state of the art in teleprocessing software systems. E. H. Sussenguth, "Systems Network Architecture: A Perspective," *Conference Proceedings*, 1978 International Conference on Computer Communications, Kyoto, Japan, 1978, pp. 353-358; D. Doll, "IBM Strengthens its Architecture," *Data Communications* 8, 56-67 (1979). SNA provides a unified design for the functions and structure of data communications products. Prior to the introduction of SNA, teleprocessing networks had many problems: Terminals were often dedicated to the use of a single application, numerous and diverse line-control procedures and terminal types were ingrained into the support programs, application programs, and network operations; and multiple access methods were in common use, thwarting any attempt to share resources among applications. Each of these problems made it difficult to expand existing applications or to add new ones. SNA was introduced to solve these problems and to make teleprocessing applications easier to install, operate, and expand.

SNA also had its roots in the hardware technological advances of the early 1970s. At that time, it became economically possible to incorporate a small processor into the design of many terminals.

Prior to such microcomputers, a terminal was commanded directly by its host computer. For example, each keystroke produced an input character transmitted independently at the rate of generation; and each output character was sent at a rate not exceeding that of the printer.

With the new microcomputer-based designs, the processor within the terminal handles many functions independently of the host, and the transmissions between host and terminal are complete messages sent at high speed. This reduces the processing power required at the host and/or allows more terminals for a host of the same size. A more important change, however, was in system structure. No longer is a tight coupling between terminal and host needed; device control now can be placed at or near the end terminal and not in the host. Thus, system commands, protocols, and procedures designed for tight coupling are no longer required; instead, a new set specifically designed for distributed processing is required.

Just as the processor in the terminal now handles device control, it also readily becomes an application processor. From a system standpoint, the application may now be performed in any several places within a network—at the host, at a controller, or even at the terminal itself.

This is a new structure that essentially did not exist before 1974 and definitions for the control of such a system were needed. The advent of distributed processing, then whether for device control or distributed application processing, was the fundamental technical rationale behind the creation of SNA.

From an architectural point of view, SNA is a top-down structured design composed of layers. R. J. Cypser, *Communications Architecture for Distributed Systems*, Addison-Wesley Publishing Co., Reading, MA, 1978; SNA *Technical Overview*, Order No. GC30-3073, available through IBM branch offices. The lowest layer, data link control, directly manages physical resource—the transmission facilities that connect nodes. Successive layers provide additional services. For example, the path control layer provides a routing service so that its users are unaware of the physical topology of the network, and some nodes contain a control point that controls the nodes (e.g., terminals and controllers) and lines in their own portions of the network. Other layers provide services to applications; these can include transparent access to local or remote resources, mapping of data streams to and from application data structures (also called presentation services), access to other local or remote programs, management of buffer commitments, and encryption of data before transmission and decryption upon receipt.

In SNA, a network addressable unit (NAU) is a location in the SNA network that supports one or more ports for communication via the network. Each NAU has a network address.

SNA defines three types of NAU.

1. System Services Control Point (SSCP): A special-purpose NAU used for network management. An SNA network can have one or more SSCPs, each of which manages a portion of the network. The function of the SSCP is the general management of a control domain, such as bringing up the network, helping to establish logical connections between other NAUs, and helping in recovery and maintenance, when necessary. It also provides the interface to the network operator services for that domain.

2. Physical Unit (PU): An NAU that acts as a companion to the SSCP in SNA network configuration management. Each node that has been defined to an SSCP has at least one PU. The PU provides a location for configuration-related services which must be performed at a particular node. An SSCP and PUs together control the network configuration and the data-transportation resources provided by the nodes in the domain of the SSCP.

3. Logical Unit (LU): An NAU that provides windows or ports through which the end-user accesses the SNA network. The LU is also the port through which an end-user accesses SSCP-provided services to help in establishing logical connections between LUs. The LU may support communication between end-users (or LUs) by editing or transforming the requests, grouping requests, correlating responses with requests, and otherwise bridging from the environment of the end-user.

In SNA, four examples of nodes, hosts, communications controllers, cluster controllers, and terminal nodes, are designated as types T5, T4, T2 and T1, respectively. The architectural distinctions among them are in the layers and function subsets that are used for each type. These type numbers correspond to each node's PU-type (PU5, PU4, PU2, and PU1), which denotes the capabilities in the lower layers, particularly in data link control and path control.

PU1—Type-1 (Terminal) Node

A terminal is a node of lesser function to which one or more I/O devices can be attached, and which depends on the boundary function of the adjacent host or communications controller for (1) transforming network addresses to local address form, and vice versa, and (2) handling normal-flow sequence numbers.

PU2—Type-2 (Cluster Controller) Node

A cluster controller (CLC) node can control a wide variety of devices and may have a data-processing capability. It depends on the boundary function of the host node or of the communications controller to which it is attached for assistance in packing data flow within a session, for transforming network addresses to local address forms and vice versa, an for some assistance in session control for its PU and LUs.

PU4—Type-4 (Communications Controller) Node

A communications controller (COMC) is a node that handles transmission services for a subarea of the network and controls communication lines and such related resources as line buffers. It may provide the intermediate function and also the boundary function for cluster controller nodes and terminal nodes. Usually, there are no logical units in a COMC; however, there is no architectural restriction against it. Architecturally, for example, a COMC might contain some part of LUs for attached devices that are incapable of housing their own LU functions. The type-4 path control may have the capability of both segmenting and blocking.

PU5—Type-5 (Host) Node

A host is a type-5 node of the network. It provides a general purpose data-processing function, and may also provide the intermediate function and boundary function (for example, the boundary function for channel-attached cluster controllers is located in the host). The system services control point function for a control domain of the network is often located in a host. A host that houses an SSCP is sometimes referred to as a control host. The type-5 path control may have the capability of both segmenting and blocking. Implicit in the host are all the processing engines, storage devices and management functions needed to carry out its role.

Networking is the concept of a geographical distribution of terminals (usually hundreds or thousands in ten to one hundred locations) working with application programs in computer complexes (usually one to ten or more computers in a like number of locations).

As the need for general-purpose networking capability grew, so also did the need for codification of conceptual design so that hardware and software products would work in harmony, and so that each installation could be readily tuned for performance and reliability. SNA implemented in such System 370 software products ad VTAM, TCAM, and NCP, now provides extensive networking capability. S. Scott, "VTAM Means Software for More Logical Network Management," *Data Communications* 8, No. 1, 77–90 (1979). L. Esau, "How to Access a Network via IBM's TCAM," *Data Communications* 8, No. 2, 89–106 (1979). A. Hedeen, "Networking: Building a Software Bridge Between Multiple Hosts," *Data Communications* 8, No. 3, 87–100 (1979).

SNA enabled multiple-host networks. J. P. Gray and T. B. McNeill, "SNA Multiple-System Networking," *IBM Syst. J.* 18, 263–297 (1979). This included capabilities in which a terminal controlled by one host could access an application in any host in the network, and host-to-host sessions could also be established. The single control point (for session establishment and configuration services) and hierarchical control were generalized to a network of multiple control points which operates as peers of one another. Further enhancements provide functions such as parallel links, transmission priority, and multiple active routes for data transmission. Parallel links may be used between adjacent nodes of a network to provide additional bandwidth and backup, and these parallel links may be logically grouped to automatically distribute traffic across the links of a group. This concept also compensates for degradation resulting from errors on any of the links in the group, because transmission is disrupted only if the last remaining link in the group fails. Network availability can also be increased by providing multiple routes between the same two points in a network, so that traffic can be rerouted (and disrupted sessions reconnected) to avoid failing intermediate nodes or failing links. Multiple routes can also be useful for traffic load leveling. These capabilities gave SNA the complete configuration flexibility of mesh networks, as distinct from the former tree structures and connection of trees.

To save costs, networks are normally designed so that the peak rate of traffic into the network may, at times, exceed the maximum network throughput. Queues in the network help smooth the peak loads, but flow-control mechanisms are necessary to prevent substantial throughput degradation, or even deadlocks, as the offered load increases beyond the network's capacity. G. A. Deaton and D. J. Franse, "A Computer Network Flow Control Study," *Conference Proceedings,* 1978 International Conference on Computer Communications, Kyoto, Japan, 1978, pp. 135–140. V. Ahuja, "Routing and Flow Control in Systems Network Architecture," *IBM Syst. J.* 18, 298–314 (1979). Flow control operates by limiting the rate at which traffic is accepted into the network. SNA products use a flow control mechanism based on pacing which allows a specific number of message units to be sent from one end of a route, after a pacing response is received from the other end. This number is dynamically adjusted by checking queue depths at the nodes along the route. The dynamically adjusted pacing values provide greater throughput than statically defined values used in other systems. Another aspect of SNA flow control is the use of message priorities, such that at each trunk line messages are transmitted in the order of the priority given to their respective sessions.

SNA is based upon predefined routing with pacing which is distinct from routing schemes for packet switched networks that allow routing decisions on every message without establishing explicit physical routes for session traffic.

Packet switching uses asynchronous time-division multiplexing (ATDM) of messages on each segment of each path. In a switched facility the circuit is set up by a special signaling message that threads its way through the network seizing channels in the path as it proceeds. After the path is established, a return signal informs the source that data transmission may proceed, and all channels in the path are used simultaneously. A given message, going from node to node, ties up an entire circuit between that pair of nodes.

Packet switching provides store-and-forward nodes between the two nodes of the subscriber. The packet carrier shares that circuit (that was between packet-carrier nodes) with still other subscribers. There may be a series of store-and-forward nodes in the path, in which case each segment could be individually time-shared among subscribers. The circuits provided by packet carriers are called virtual circuits in that they appear to be available to a subscriber but may in fact be shared with other subscribers unknown to him.

On packet-switching networks, there must be a separate and distinct signaling phase, in which the user exchanges control packets with the network, to advise the network of the address of the called party. After access is granted and initial signaling is completed, each user information record not only must contain the normal data link controls, but in addition must contain a packet header field. Once the system determines that it has reached the end of the packet header field, the user should be free to use any code or bit sequences for either coded or noncoded information.

The SNA way of accommodating the variable message lengths from different types of work stations is to provide a facility for segmenting longer messages into more manageable segments. These segment sizes would be selected to fit the buffers along the path, and might also be tailored in accordance with line-reliability problems or response-time requirements. The architecture then must provide the controls necessary to identify this segmentation and to permit the reconstruction of the entire message at the destination point.

Reassembly of segments that could arrive out of sequence, because they can take different paths, poses another set of problems. This out-of-sequence arrival must be prevented in SNA by routing via the same physical path for each source/destination pair. However, in packet switched networks additional segment headers and buffer management are used to reestablish the correct sequence.

In message switching an entire message is sent to a centrally located node, where it is stored for as long as necessary, until an appropriate connection can be made with the destination. In the process of packet switching, on the other hand, the source and destination first agree to a logical connection. The message is segmented into smaller parts if that is needed to avoid monopolizing a line, and the segments, or packets, are routed through intermediate nodes in real time to the destination. Destination tables in each intermediate node permit a given message to "find its way" at each such node toward its destination. The primary objective of message switching systems usually is to ensure the ultimate delivery of a message in a reasonable time which may be minutes, hours or even days, depending on line availability and line-loading conditions. The primary objective of packet switching is to preserve fast response time, on the order of a few seconds, while reducing costs through the shared use of the lines, which can be high-speed trunks.

The message switching system has very large amounts of secondary storage to permit the accumulation of relatively large queues of messages. In the message switching system, the intermediate node that has the message switching function accepts the responsibility for the ultimate delivery. It acts as a "recovery node" in that the message is assumed to be safe and recoverable once it reaches the message switching node. In contrast to this, the packet switching system first ensures that a source-to-destination connection exists, that protocols are pre-established for an effective dialogue between source and destination, and that buffering and pacing are agreed to beforehand for efficient data flow. The buffer sizes and the queue management in multiple intermediate nodes can then be more economical.

Data terminal equipment (DTE) is defined as any type of user facility from a large computer system to a very simple terminal. Data circuit-terminating equipment (DCE) is defined as terminating the access line from the carrier's data switching exchange (DSE) and performing any signal conversions necessary to the operation of the carrier.

Real digital circuits extend from one DCE, via the DSE network, to another DCE. In packet switching networks, on the other hand, a real circuit extends from each DCE to a DSE, and virtual circuits are provided among DSE's. This involves sharing of a braodband facility among multiple unrelated subscribers. The technique employes asynchronous time-division multiplexing on a message (that is, a fixed-size packet) base.

In packet switching all messages (both user information and network call control information) are formed into discrete units called packets, which contain a header to specify packet control functions and packet network destination. The packet network provides a virtual circuit, that is, one that appears to be a point-to-point connection for a pair of DTEs, but actually is a circuit that is shared (in part) by many DTEs through multiplexing (asynchronous time-division multiplexing) provided by the packet carrier. These virtual circuits may be switched (in which case, a virtual-call set-up and clearing procedure is required of the DTE).

One of the things desired in some data processing systems is to be able to multiplex many different sessions across a single interface when different messages have different destinations. This can be achieved by creating a logical channel ID to locally designate each virtual circuit. For this, each virtual call or permanent virtual circuit is locally assigned a logical channel group number and a logical channel number. For virtual calls, these are assigned during the call set-up phase. The logical channel ID (logical channel group number plus logical channel number) then must be carried in every packet header (except those for restart packets where these ID fields are zero). A virtual circuit may carry many different SNA sessions, concerning different logical units (LUs) that are all located at the same logical channel. The transmission header (TH) (carried within the data field of the data packet) would identify each session. Alternatively, a separate virtual circuit (and logical channel) could be used for each session.

The Data Switching Exchanges (DSEs) of packet switching networks are built to recognize packets. All of the data to be sent between DTEs are preceded by packet headers. In addition, all of the network control messages are also preceded by packet headers. Each packet header also includes the local logical channel ID for that virtual circuit and also a packet type indicator.

The ARPANET was the first packet-switching network. This network was designed under a 1969 DARPA research and development program. Initially the ARPANET was an experimental network built to test the concepts of packet switching and resource sharing. As the ARPANET matured, users with operational requirements, rather than experimental requirements, began to use it.

In April 1982, the U.S. Department of Defense (DoD) directed that the Defense Data Network (DDN) be implemented as the DoD common-user data-communications network, based upon ARPANET technology and architecture. The Defense Data Network (DDN) is described in the NTIS publication AD-A166324 entitled "DDN (Defense Data Network) Protocol Handbook," Vol. 1, *DoD Military Standards Protocols*, December 1985 by E. J. Feinler, et al., and its companion volumes 2 and 3 (The DDN Standard). Additional information can be found in the NTIS publication AD-A137427 "Defense Data Network X.25 Host Interface Specification," December 1983.

FIG. 1 shows a graphic representation of the architectural model of the DoD protocol suite. The architecture is similar to, but not identical with, the International Standards Organization (ISO) Open Systems Interconnection (OSI) architecture. (See *Computer Networks*, Vol. 7, No. 5, p. 293-328 (October 1983) for a discussion of the DoD Internet Architecture Model.)

The DDN standard establishes criteria for the Internet Protocol (IP) which supports the interconnection of communication subnetworks. It introduces the Internet Protocol's role and purpose, defines the services provided to users, and specifies the mechanisms needed to support those services. The standard also defines the services required of the lower protocol layer, describes the upper and lower interfaces, and outlines the execution environment services needed for implementation.

Transmission Control Protocol (TCP) is a transport protocol providing connection-oriented, end-to-end reliable data transmission in packet-switched computer subnetworks and internetworks.

The Internet Protocol (IP) and the Transmission Control Protocol (TCP) are mandatory for use in all DoD packet switching networks which connect or have the potential for utilizing connectivity across network or subnetwork boundaries. Network elements (hosts, front-ends, bus interface units, gateways, etc.) within such networks which are to be used for internetting shall implement TCP/IP.

The Internet Protocol is designed to interconnect packet-switched communication subnetworks to form an internetwork. The IP transmits blocks of data, called internet datagrams, from sources to destinations throughout the internet. Sources and destinations are hosts located on either the same subnetwork or connected subnetworks. The IP is purposely limited in scope to provide the basic functions necessary to deliver a block of data. Each internet datagram is an independent entity unrelated to any other internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural mode, the Internet Protocol resides in the internetwork layer. Thus, the IP provides services to transport layer protocols and relies on the services of the lower network protocol. In each gateway (a system interconnecting two or more subnets) an IP resides above two or more subnetworks protocol entities. Gateways implement internet protocol to forward datagrams between networks. Gateways also implement the Gateway to Gateway Protocol (GGP) to coordinate signaling and other internet control information.

In an April 1982 directive, the Department of Defense (DoD) stated that the Defense Data Network (DDN) would be implemented as the common user data communication network. With DDN, DoD would reduce costs, improve reliability, and gain interoperability for all information systems and data networks. Therefore, all major DoD requests for proposals that have communication networking requirements demand the use of DDN.

IBM, in the early 1970's, adopted System Network Architecture (SNA) as the standard for communication networking. IBM communication products developed since that time, including both hardware and software, support SNA. However, DDN and SNA are incompatible standards. While both standards consist of a seven layer architecture concept to perform the various networking functions such as routing and flow control, the separation of functions into layers and the theories of how to perform the functions are different.

It is because of these two incompatible standards that the DDN benefits of reduced cost and improved reliability cannot be achieved at present for the large number of SNA installations that currently exist within the DoD community.

Following is a glossary of terms to be used herein.

| | |
|---|---|
| $SSNA | Series/1 Product for SNA PU Functions |
| #FREEBUF | DDN/SNA Buffer Management Macro to Free a Buffer |
| #GETBUF | DDN/SNA Buffer Management Macro to Get a Buffer |
| #RSTRBUF | DDN/SNA Buffer Management Macro to Restore a Buffer |
| #SAVEBUF | DDN/SNA Buffer Management Macro to Save a Buffer |
| ABEND | Abnormal End of Task |
| ADM | Administrative |
| AMOD | Access Module |
| AMODs | Access Modules |
| API | Application Program Interface |
| ARJE | Advance Remote Job Entry |
| BCAM | Basic Channel Access Method |
| BMF | Buffer Management Facility |
| CLIST | Command List |
| CPU | Central Processing Unit |
| CSI | Console Service Interface |
| DDN | Defense data Network |
| DDR | Direct Datagram Request |
| DLC | Data Link Control |
| DNAM | DDN Access Method |
| DoD | Department of Defense |
| DSAF | Destination Subarea Field |
| DSX | Distribution System Executive |
| EBCDIC | Extended Binary-coded Decimal Interchange Code |

-continued

| | |
|---|---|
| EDL | Event Driven Language |
| EDX | Event Driven Executive |
| ER | Explicit Route |
| ERs | Explicit Routes |
| ERN | Explicit Route Number |
| FEP | Front End Processor |
| FEPs | Front End processors |
| FSGETQ | SWOF Macro to Get an Element from Queue |
| FSPUTQ | SWOF Macro to Put an Element to a Queue |
| HCF | Host Command Facility |
| HLI | High Level Interface |
| HMOD | Hardware Module |
| HMODs | Hardware Modules |
| I/O | Input/Output |
| IP | Internet Protocol |
| IPF | Initialization Parameter File |
| IPL | Initial Program Load |
| JCL | Job Control Language |
| LU | Logical Unit |
| LUs | Logical Units |
| MACLIB | Macro Library |
| MNCH | Master Network Control Host |
| MVS | Multiple Virtual Storage |
| NCCF | Network Communication Control Facility |
| NCD | Network Control Domain |
| NCF | Network Control FEP |
| NCFs | Network Control FEPs |
| NCH | Network Control Host |
| NCHs | Network Control Hosts |
| NCP | Network Control Program |
| NMVT | Network Management Vector Transport |
| NRD | Node Resource Distribution |
| NRDLs | Node Resource Distribution Lists |
| OSI | Open Systems Interconnection |
| PDS | Partitioned Data Set |
| PDSs | Partitioned Data Sets |
| PIU | Path Information Unit |
| PIUs | Path Information Units |
| PMOD | Personalized Module |
| PS/2 | IBM Personal System/2 |
| PU | Physical Unit |
| PUs | Physical Units |
| PU2 | Physical Unit 2 |
| PU4 | Physical Unit 4 |
| PU5 | Physical Unit 5 |
| RAF | Remote Access Facility |
| RAFs | Remote Access Facilities |
| RECFMS | Record Formatted Maintenance Statistics |
| RM | Remote Manager |
| ROS | Read Only Storage |
| Sysgen | DDN/SNA System Generation Function |
| SDS | Sequential Data Sets |
| SDLC | Synchronous Data Link Control |
| SNA | System Network Architecture |
| SNAPS | NSA Portable Software by Data Connections, Ltd. |
| SNAP-2 | SNA PU Type 2 Secondary Product |
| SNAP-5 | SNA PU Type 5 Primary Product |
| SNAP-LINK | SDLC Primary and Secondary Link Level Product |
| SNAP-THRU | SNA Inter-domain Pass-through Primary Product |
| SSCP | System Service Control Point |
| SWOF | System Wide Operator Facility |
| SWOP | System Wide Operator Program |
| TCI | Transmission Control Interface |
| TCP | Transmission Control Protocol |
| TG | Transmission Group |
| TGs | Transmission Groups |
| TGB | Transmission Group Control Block |
| TSO | Time Sharing Option |
| UDP | User Datagram Protocol |
| VM | Virtual Machine |
| VRs | Virtual Routes |
| VSAM | Virtual Storage Access Method |
| VTAM | Virtual Telecommunications Access Method |

RELATED COPENDING PATENT APPLICATIONS

A related concept in I/O control is described in the copending U.S. patent application, Ser. No. 043,798, filed Apr. 29, 1987 by S. L. Estrada, et al., entitled "Concurrent Multi-Protocol I/O Controller" assigned to IBM Corporation, the disclosure of which is incorporated herein by reference.

OBJECTS OF THE INVENTION

It is an object of the invention to provide DDN interoperability from IBM host computers that will let SNA installations communicate over DDN packet switched networks.

It is another object of the invention to provide SNA terminals to SNA host function which will enable attachment of remote products such as cluster controllers and associated terminals and also provide for the direct attachment of personal computers.

It is another object to provide a centralized network control which will provide for a centralized communication network manager.

It is still a further object to provide a host-to-host communication capability, enabling MVS and VM host systems to address each other and communicate over DDN, providing direct communication data bases.

SUMMARY OF THE INVENTION

These and other objects, features and advantages are accomplished by the invention disclosed herein. The overall function of the invention is to provide the basic operating capabilities of SNA both for host based application to application as well as remote terminal full screen access across the Defense Data Network (DDN). The problem that is presented by the integration of these two technologies is that SNA is a connection oriented technology and DDN is a connectionless or packet switching technology that requires an Internetting Protocol (IP) header on all information transmitted through the network and across multiple networks.

One of two key concepts utilized in this system is the definition of a localized SNA network to each SNA host by the channel attached Front End Processors (FEPs). These FEPs present either an SNA LU 2 definition or an SNA PU 4 definition to the host to allow it to carry out regular control to the host applications or to the terminal users.

The second key concept that has been implemented here is providing primary SNA support, PU5, in the Remote Access Facilities (RAF). This enables each RAF to control all the SNA terminals and devices attached to it as separate networks. The RAF and the FEP working together imbed the SNA protocols in the IP datagrams and provide the proper SNA connections and control. This technique also allows any terminal to access any host that it is authorized for. This is not permissible in normal SNA X.25 networks today.

The resulting invention provides SNA terminals to SNA host function enabling attachment of remote products such as 3274 cluster controllers and associated terminals such as 3278s and 3180s, and also provide for the direct attachment of PCs emulating 3270 devices. The invention also provides centralized network control for a centralized communication network manager using IBM's Network Control program products such as Network Communications Control Facility (NCFF) and Network Problem Determination Application (NPDA). The invention further provides host-to-host communication capabilities, enabling MVS and VM host systems to address each other and communicate over DDN, providing direct communication between data base products.

DESCRIPTION OF THE DRAWINGS

These and other objects, features and advantages of the invention will be more fully appreciated with reference to the accompanying figures.

Figure 1:
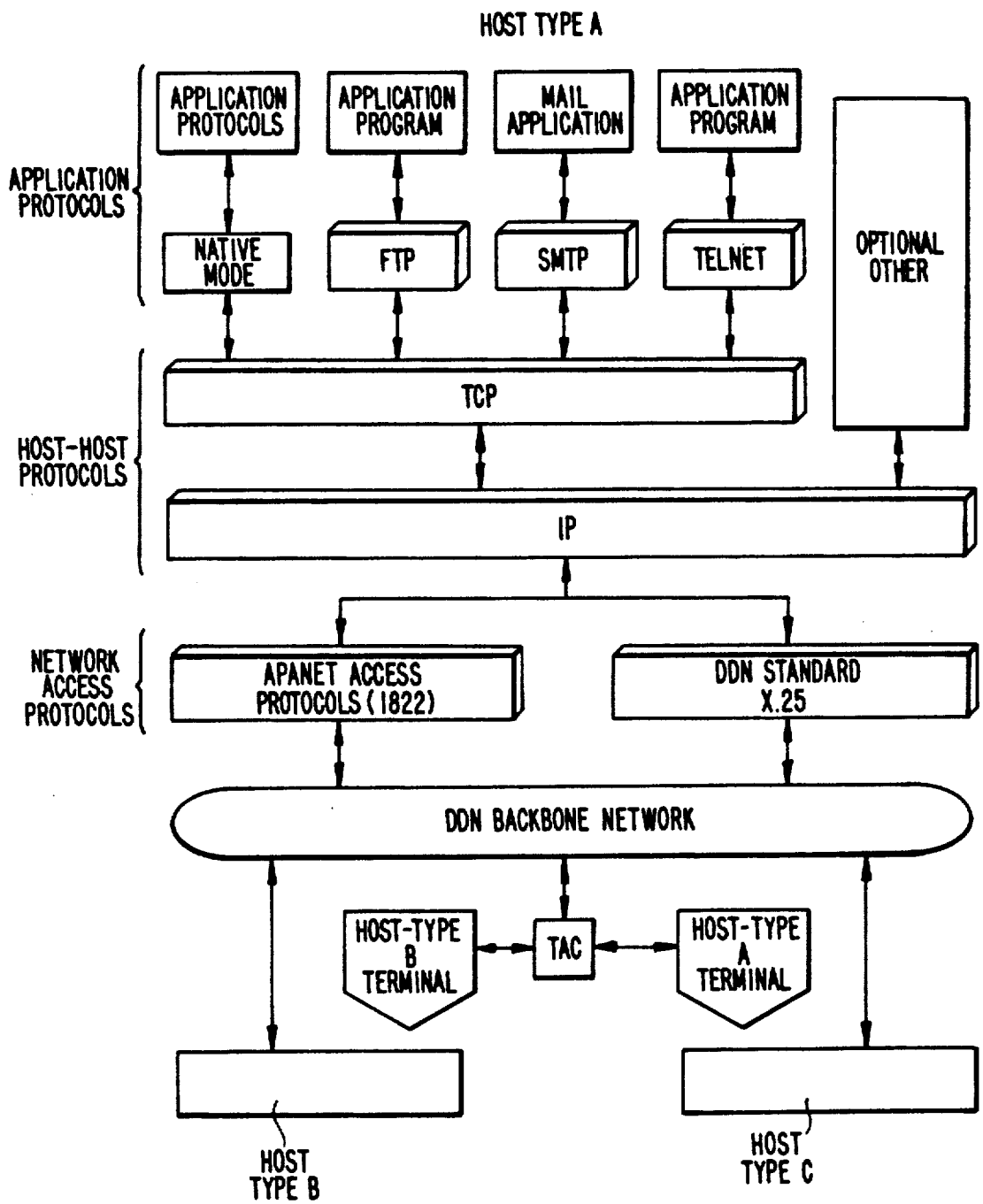
Figure 2:
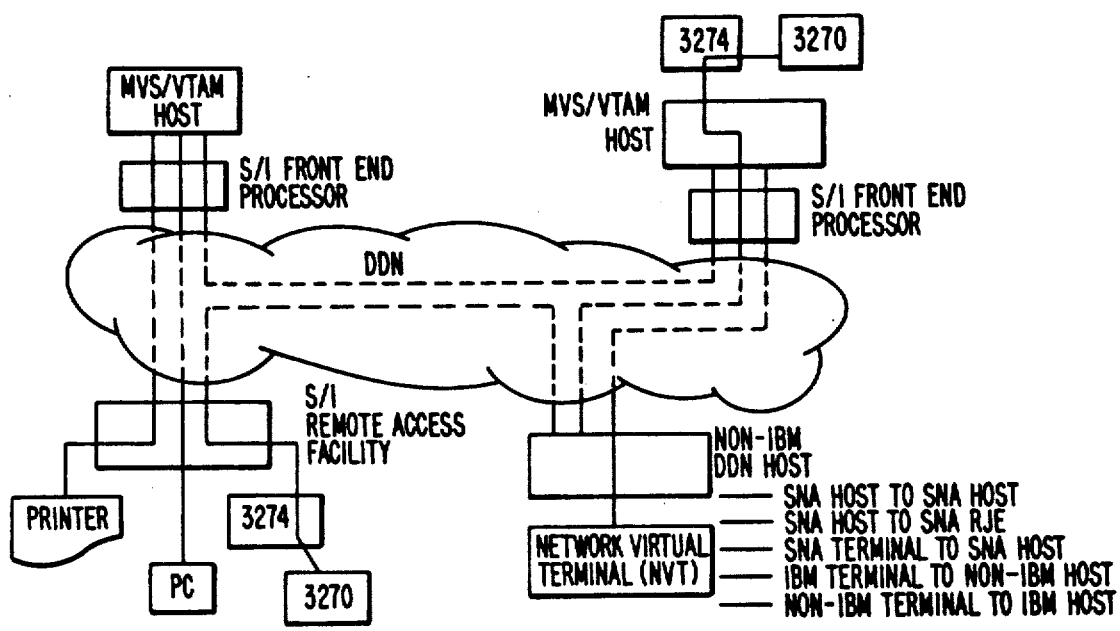
Figure 3:
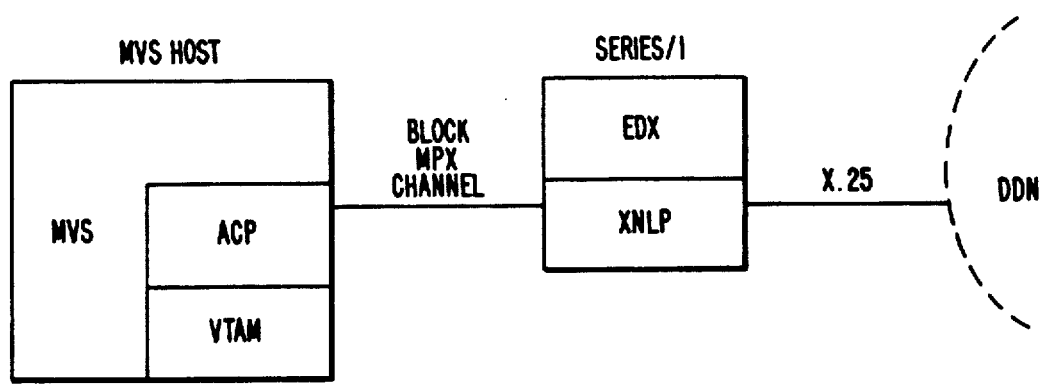
Figure 4:
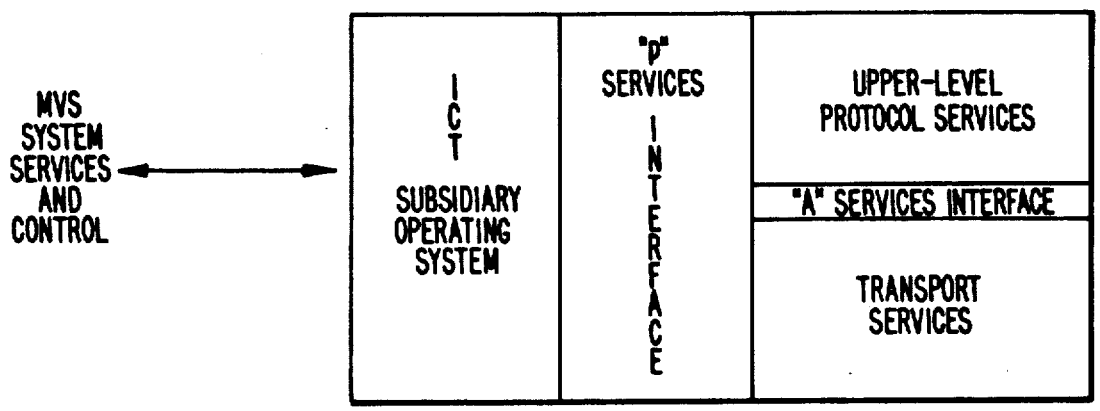
Figure 5:
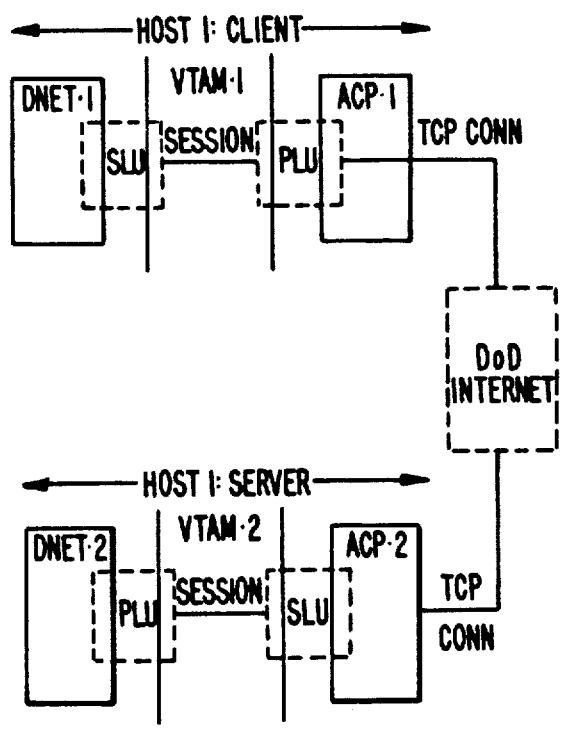
Figure 6:
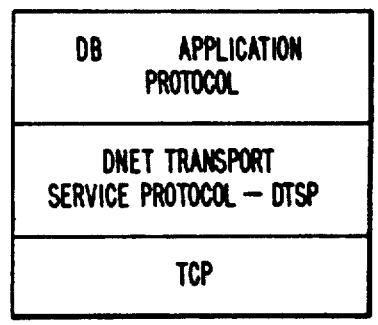
Figure 7:
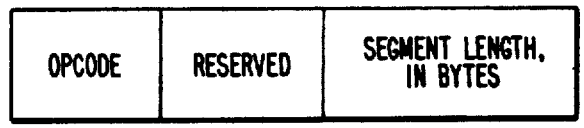
Figure 8:
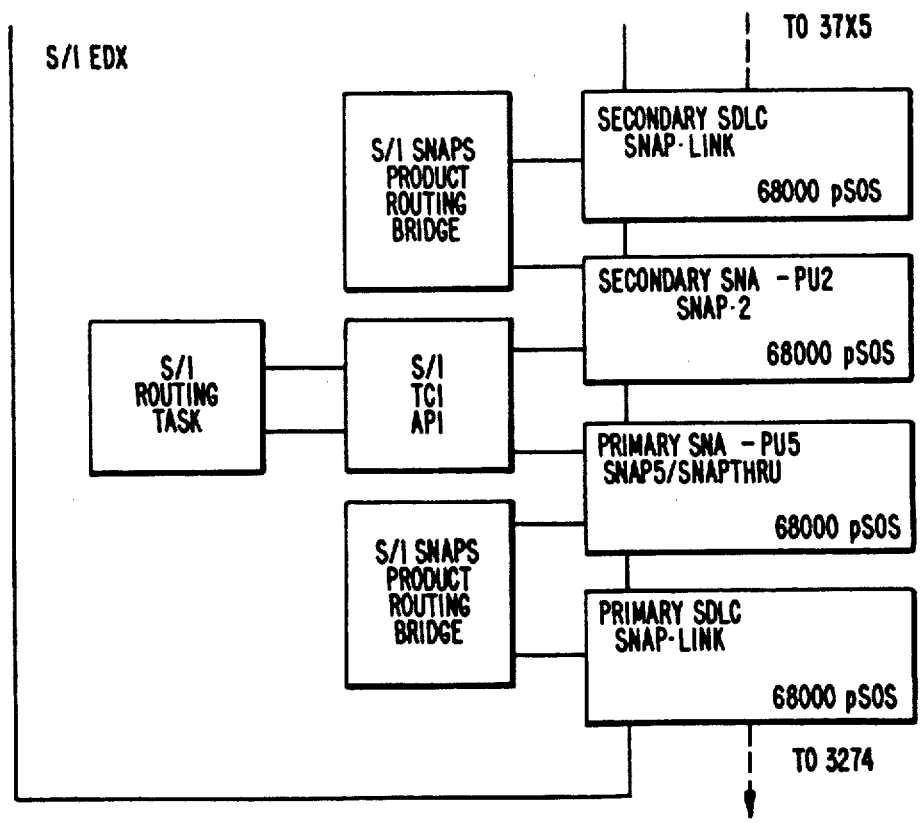
Figure 9:
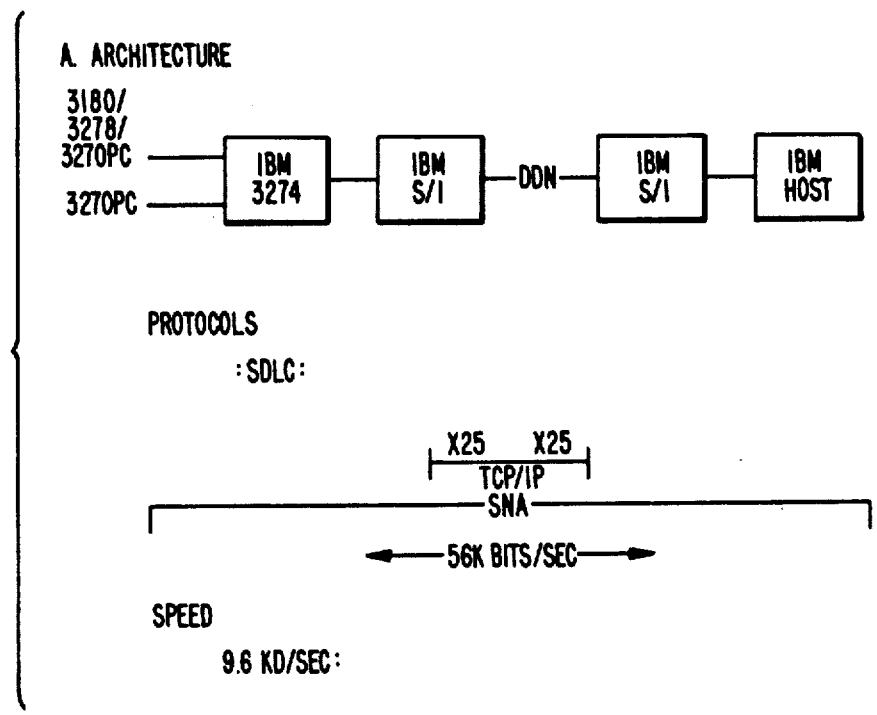
Figure 10:
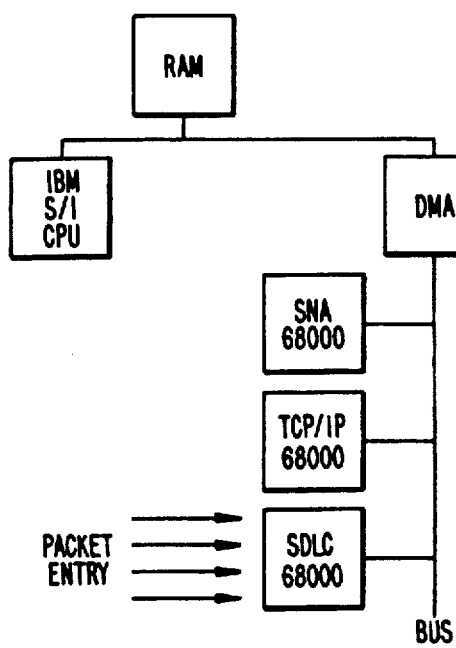
Figure 11:
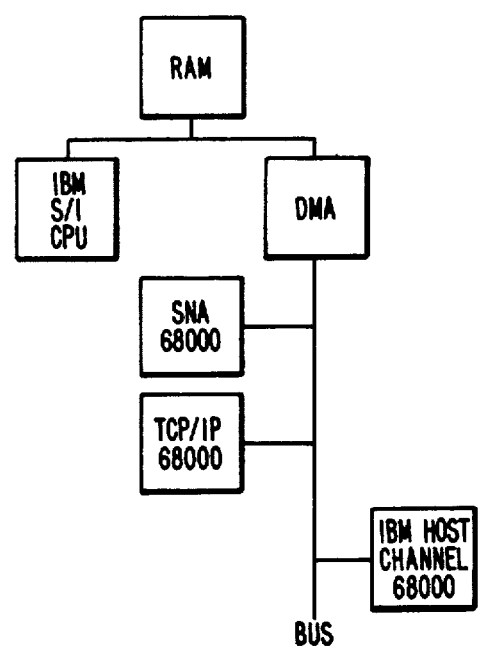
Figure 12:
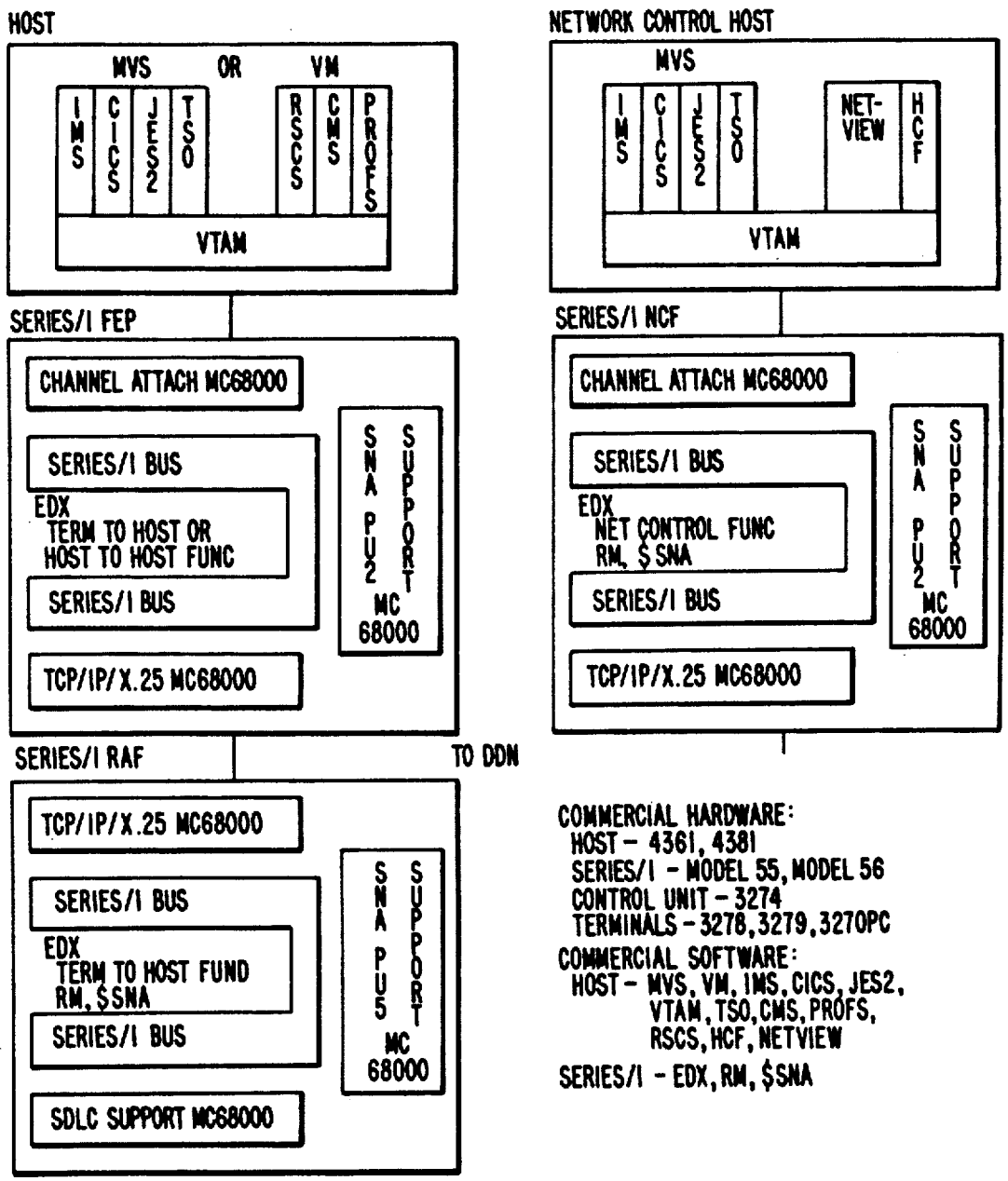
Figure 13:
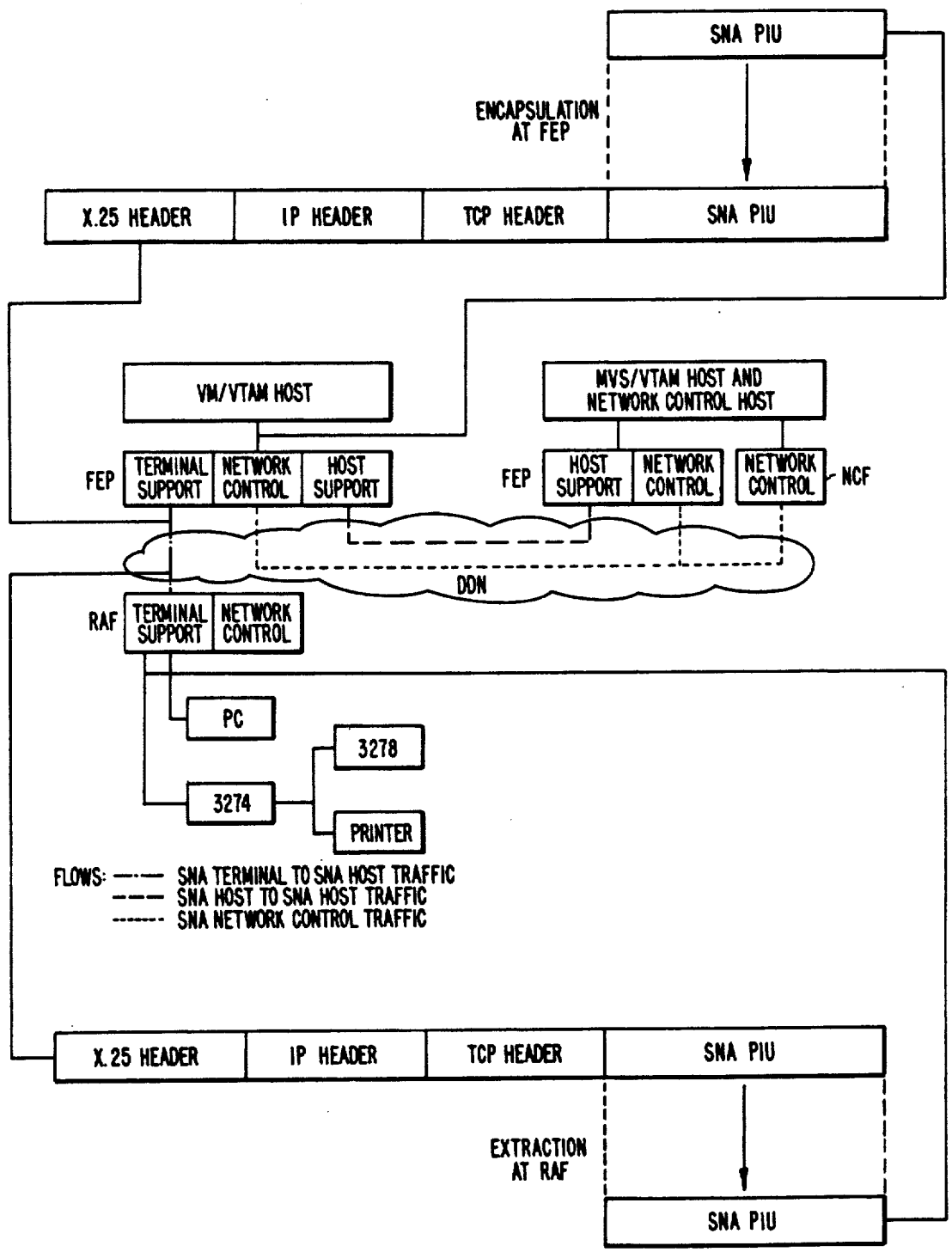
Figure 14:
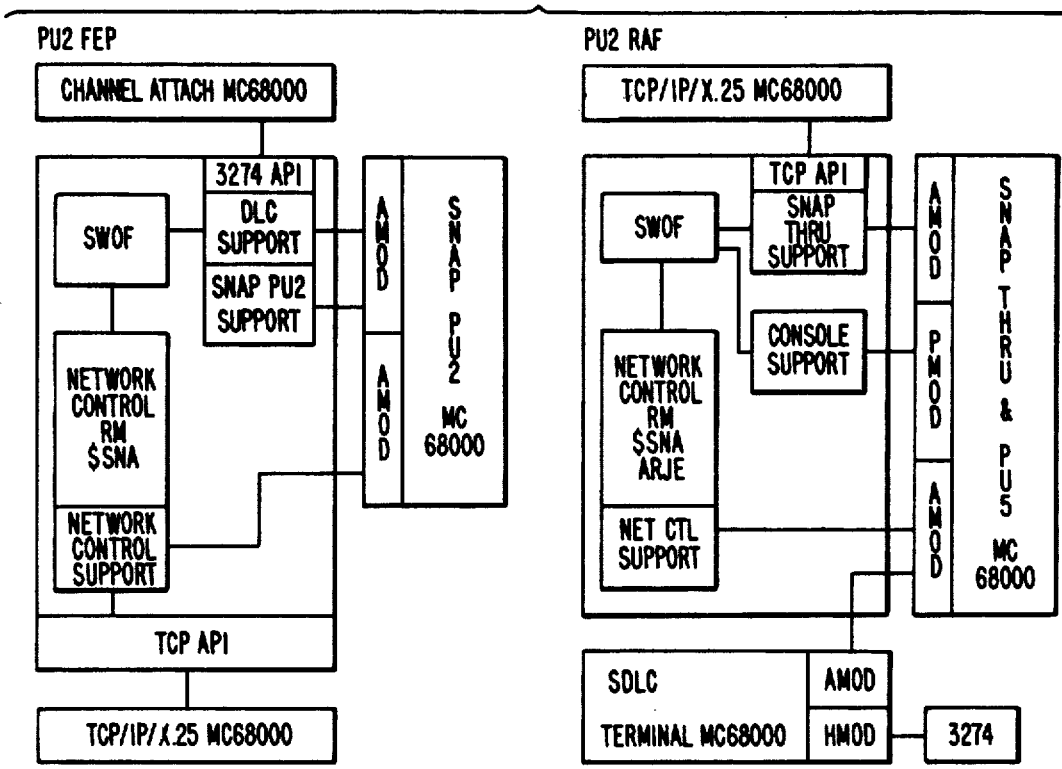
Figure 15:
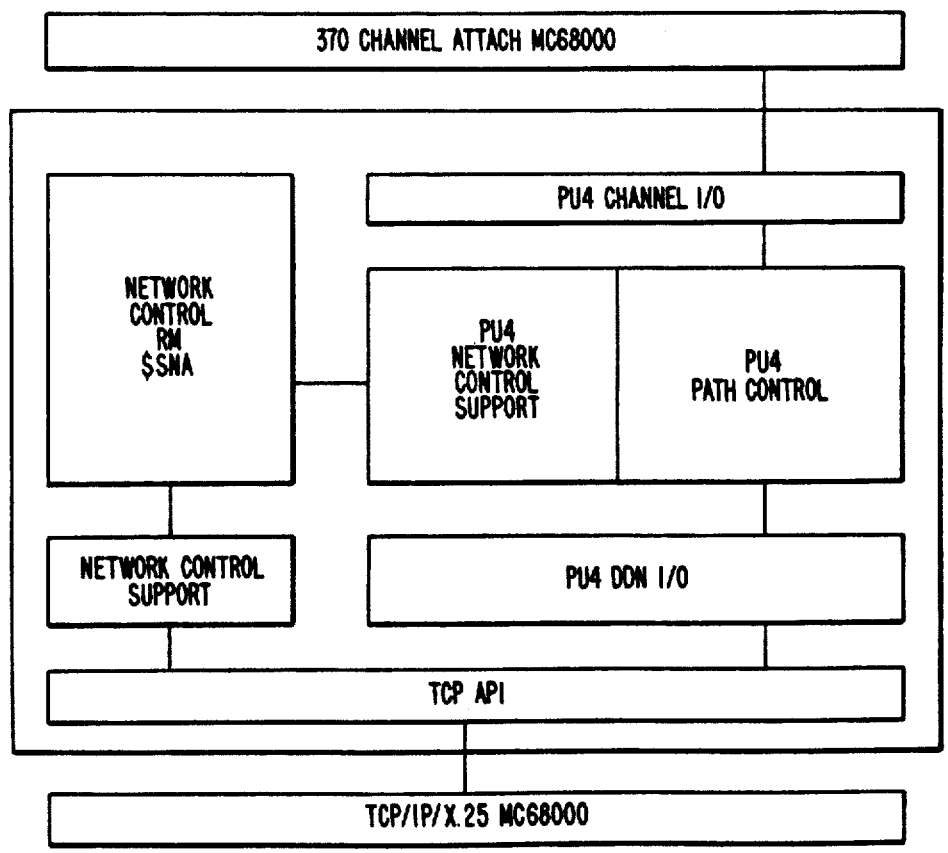
Figure 16:
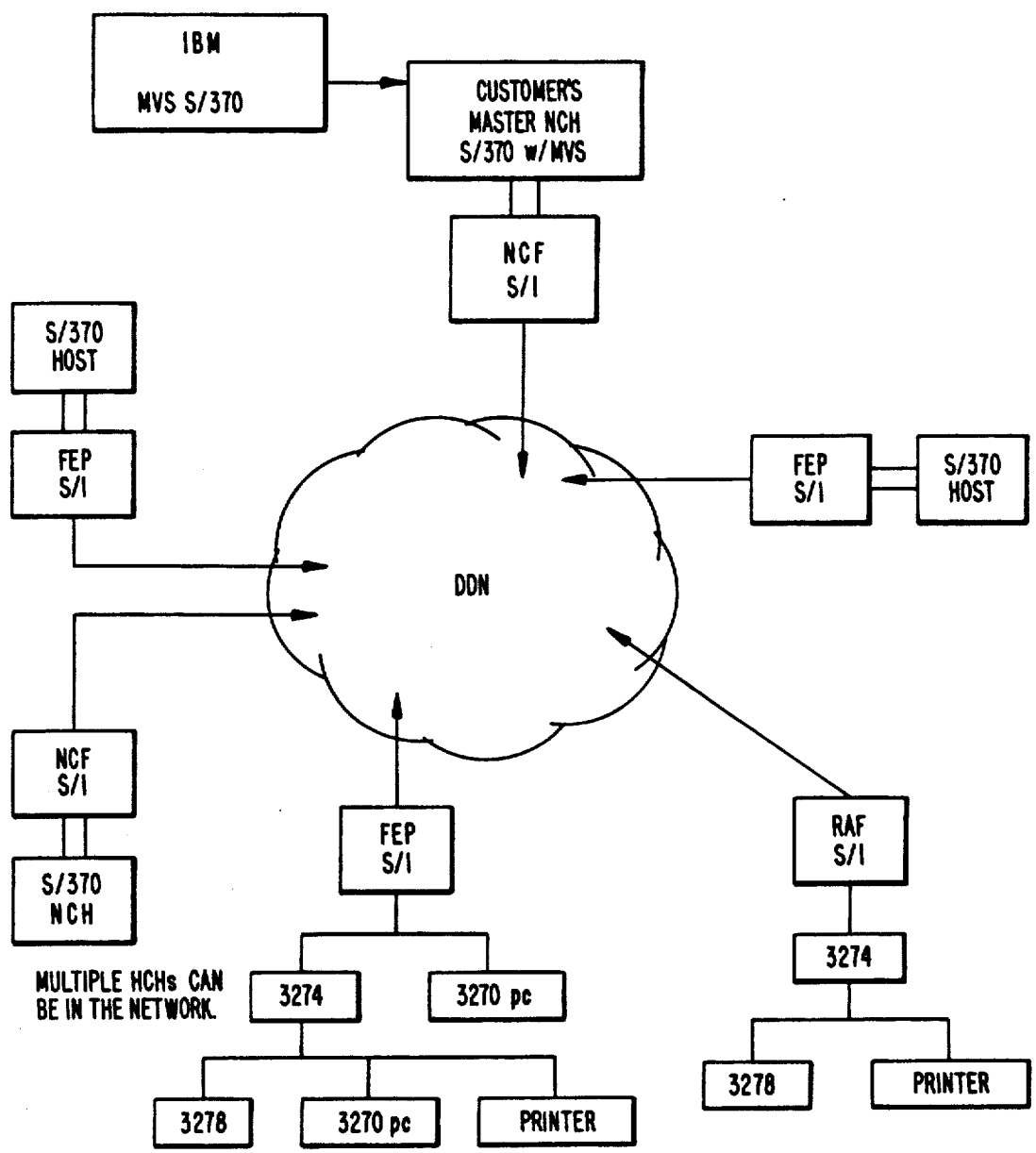
Figure 18:
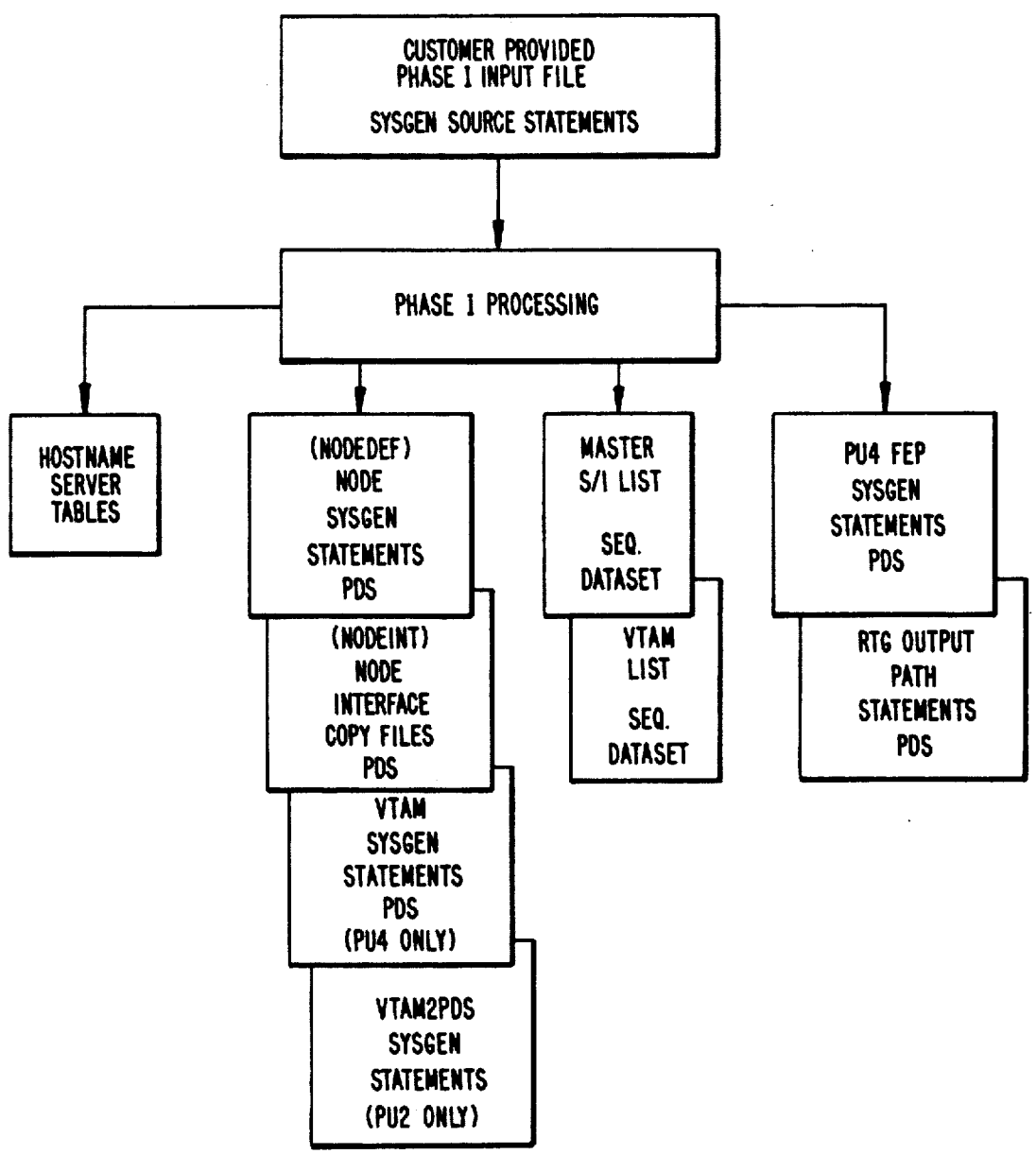
Figure 19:
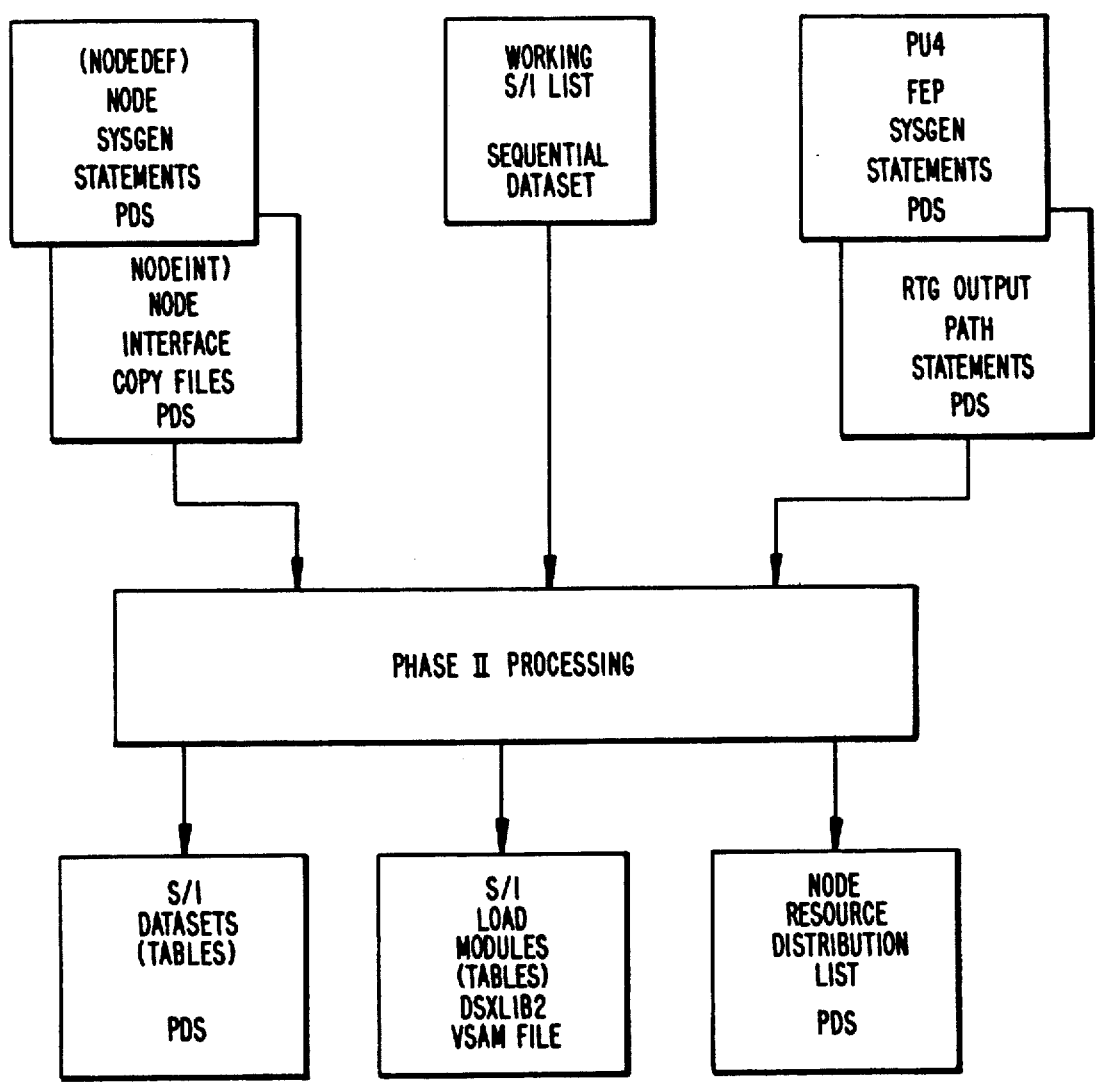
Figure 20:
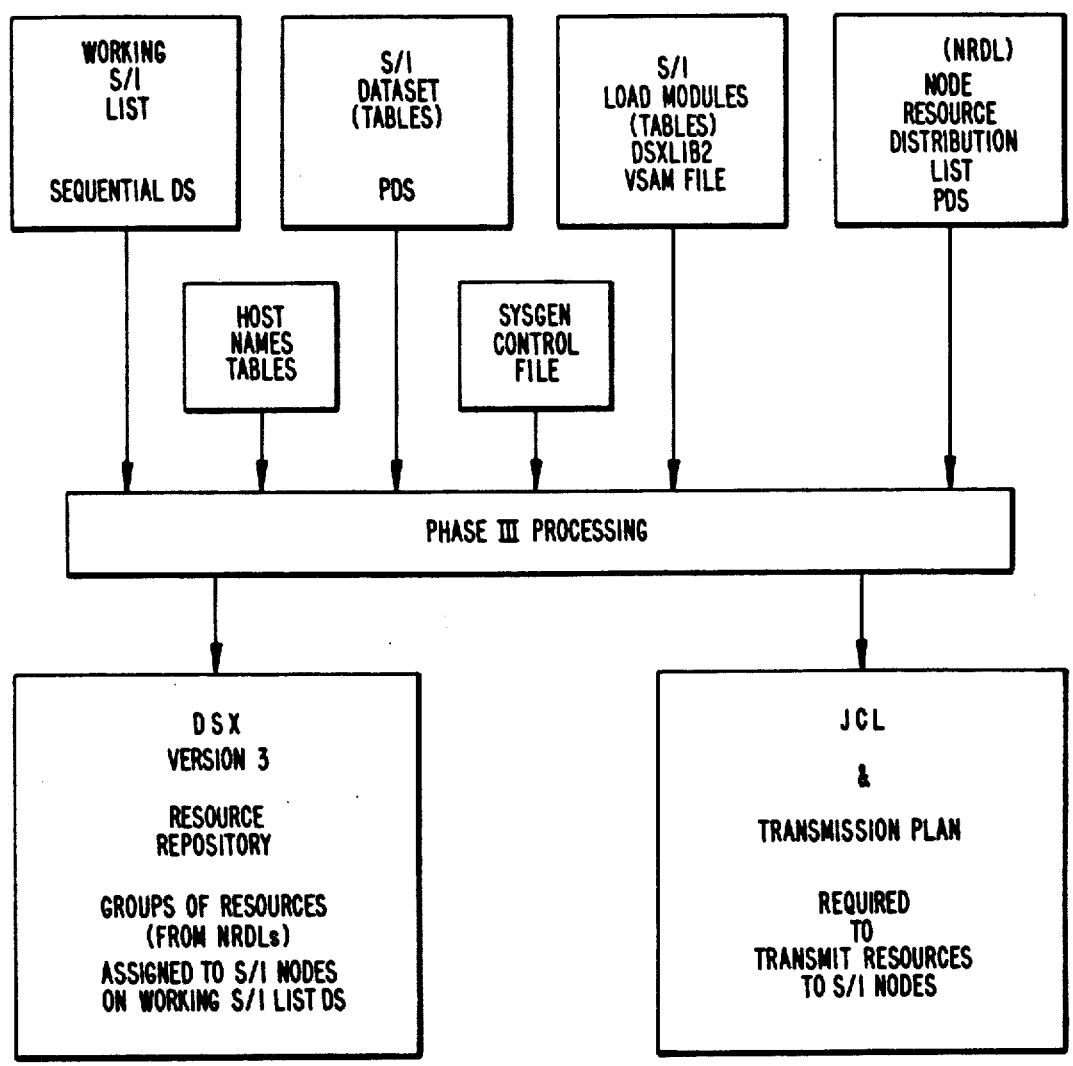
Figure 21:
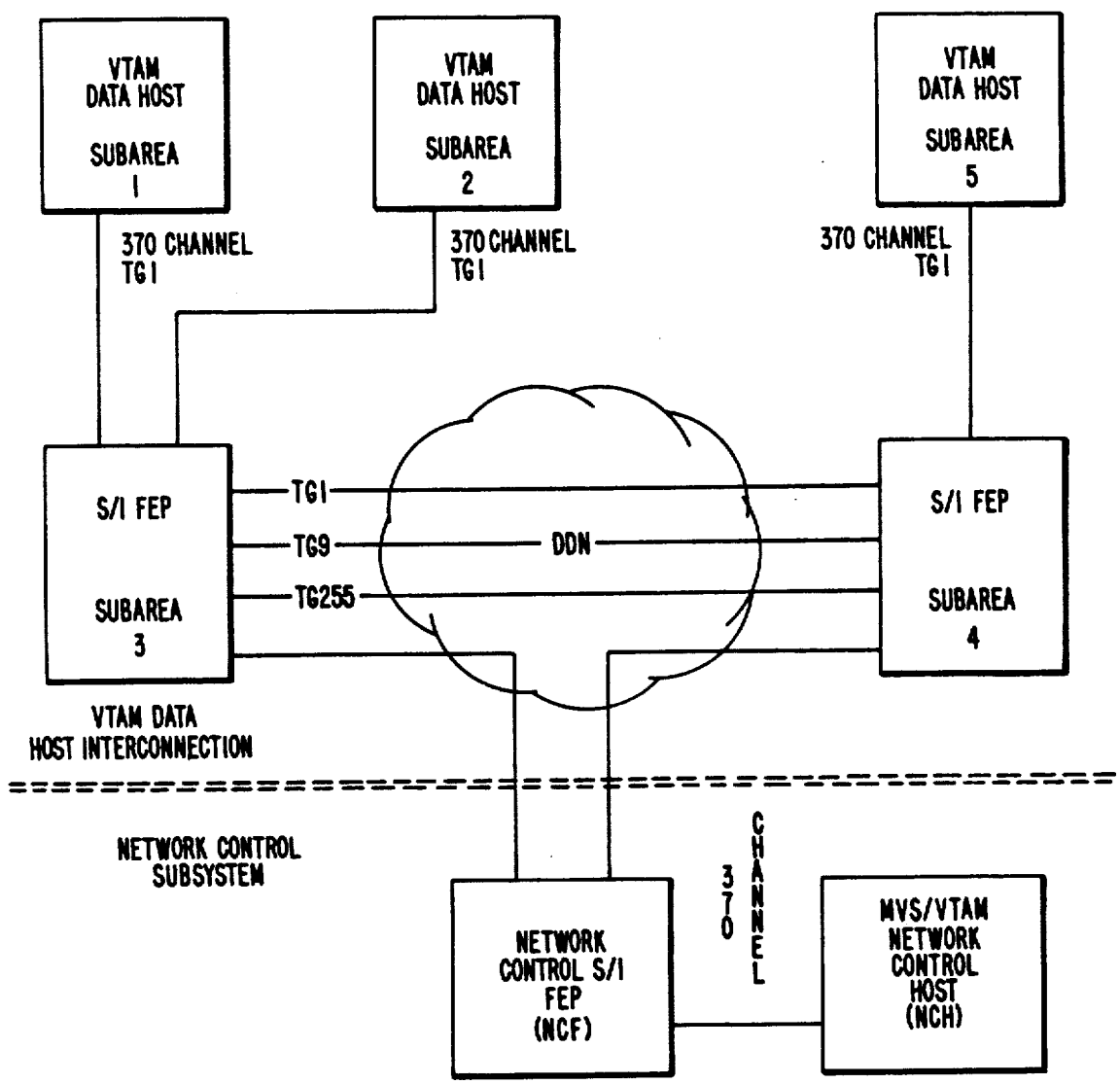
Figure 22:
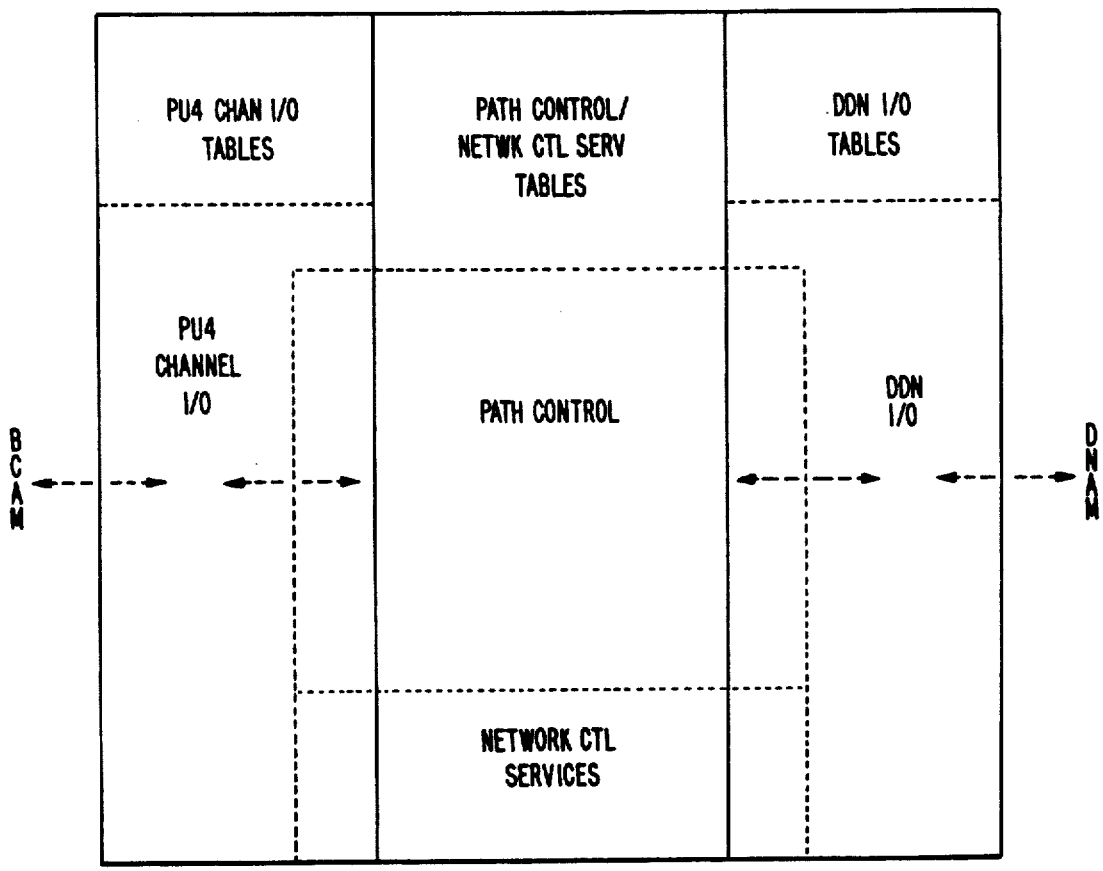
Figure 23:
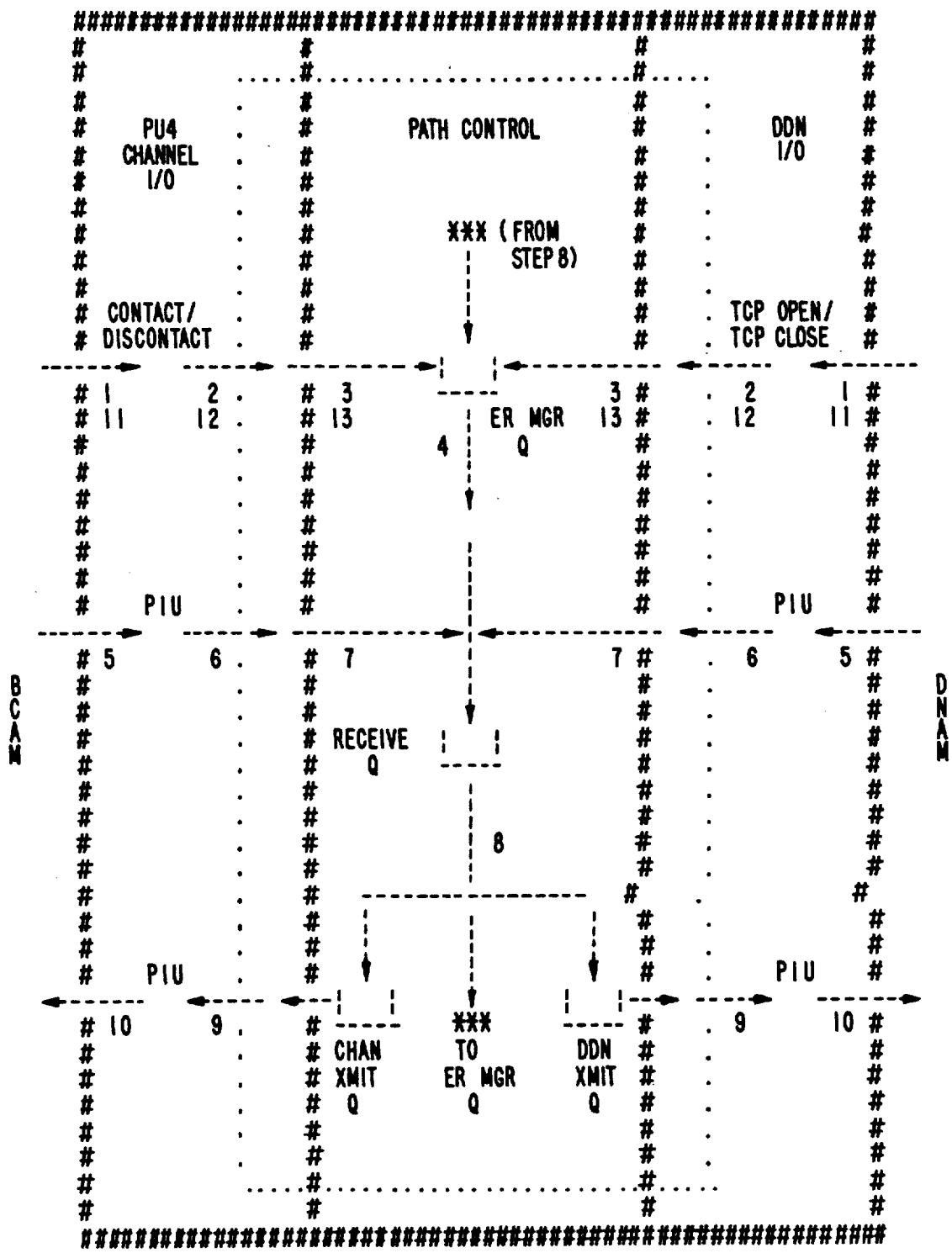
Figure 24:
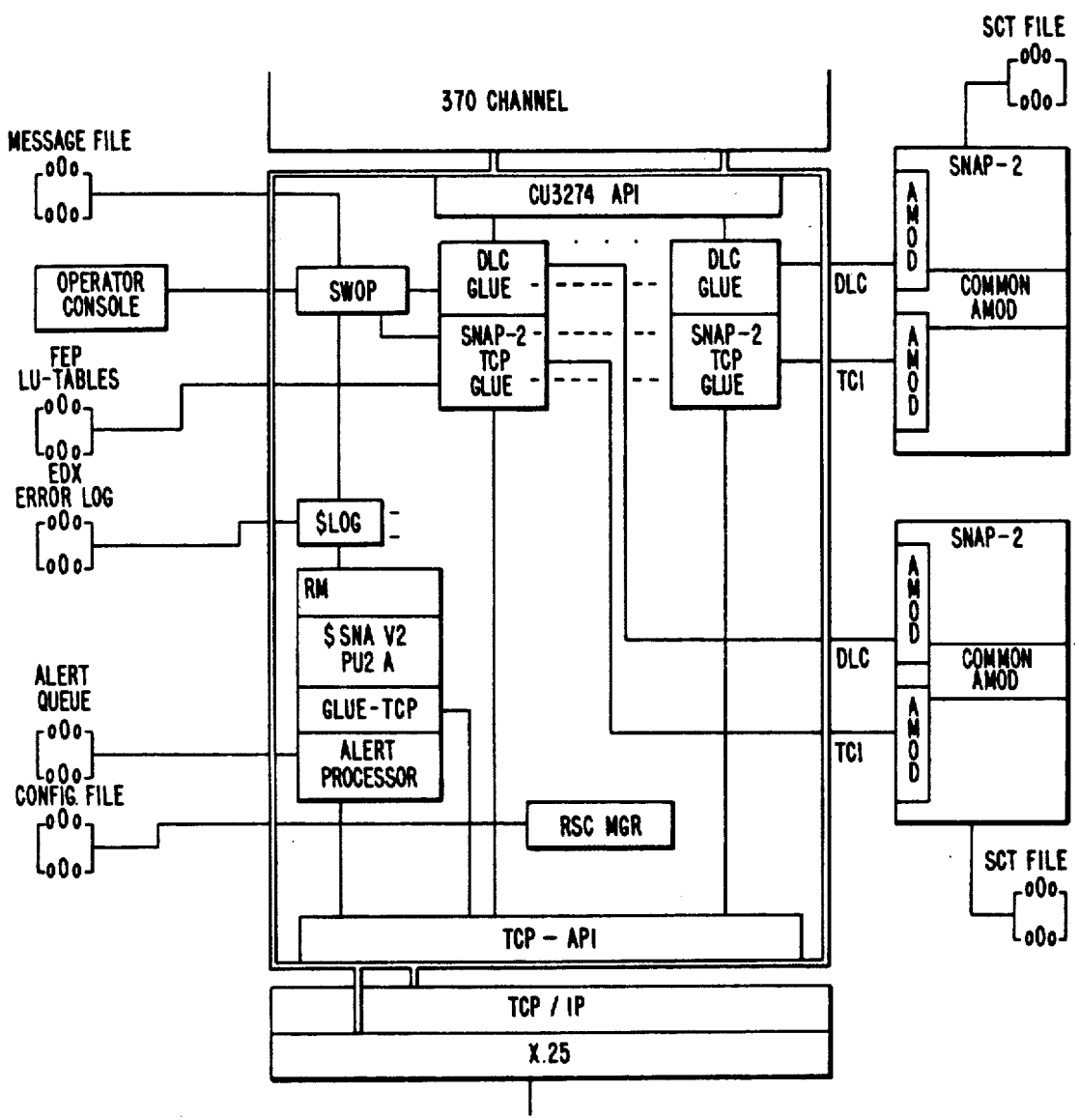
Figure 25:
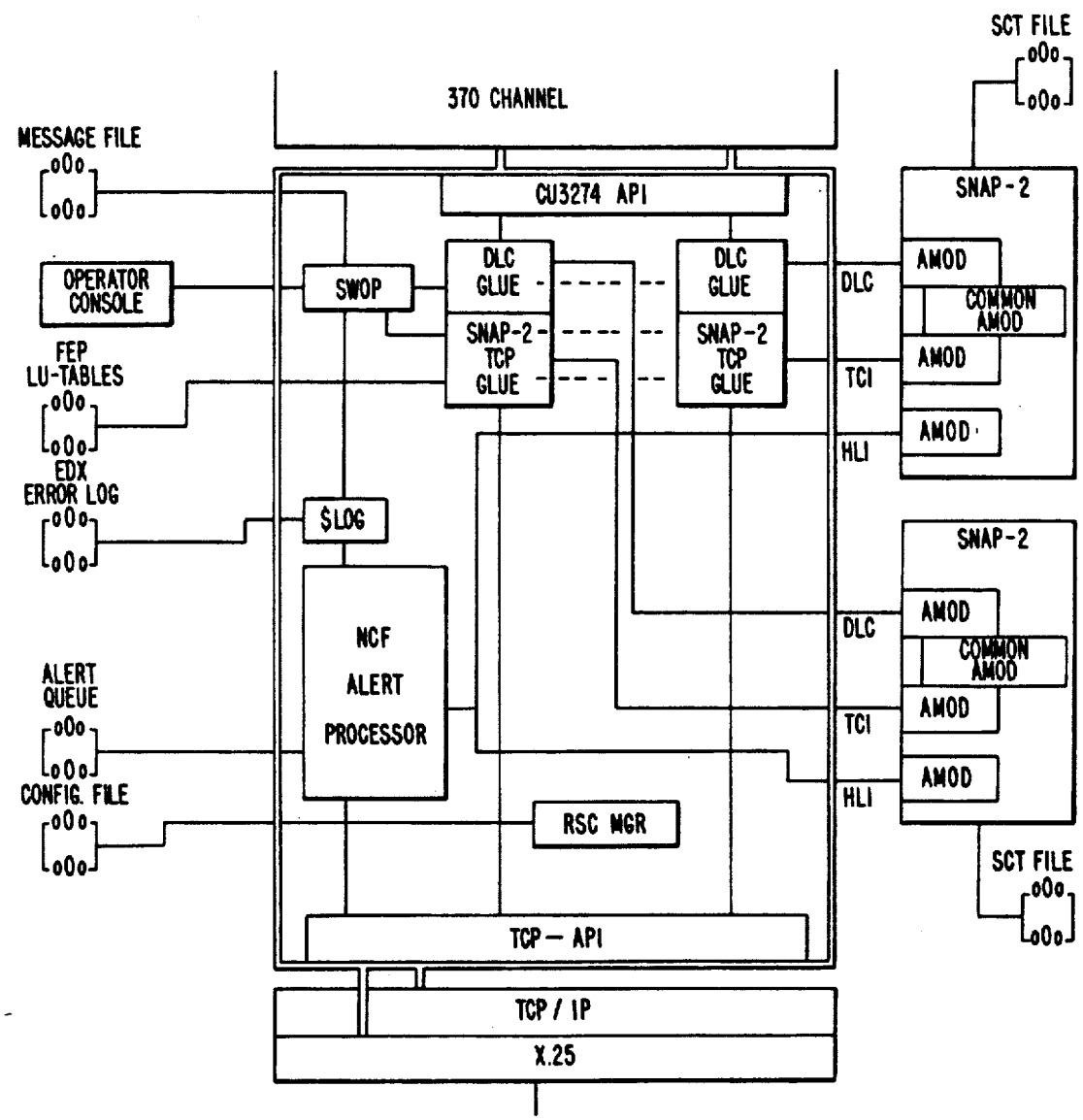
Figure 26:
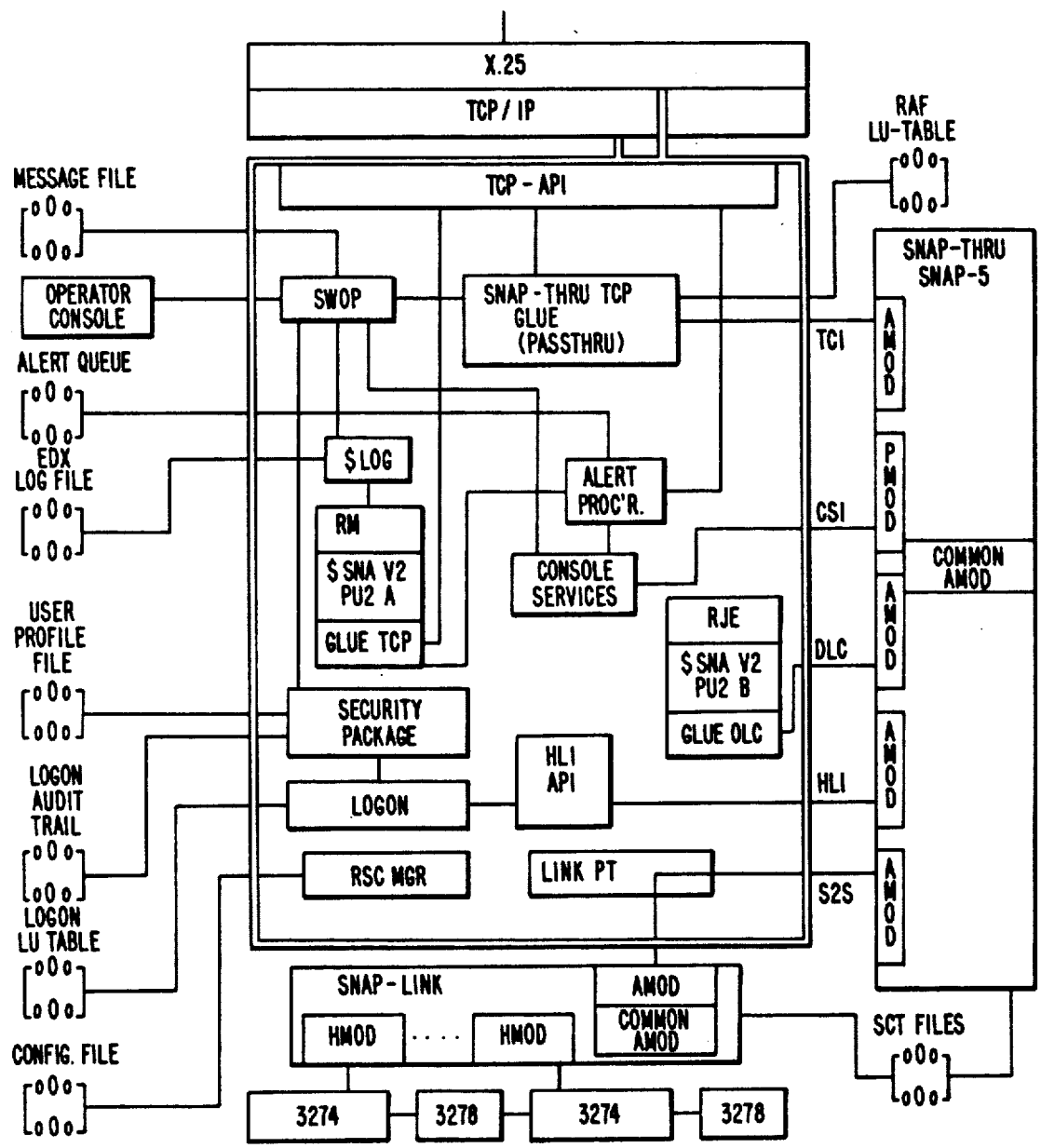
Figure 27:
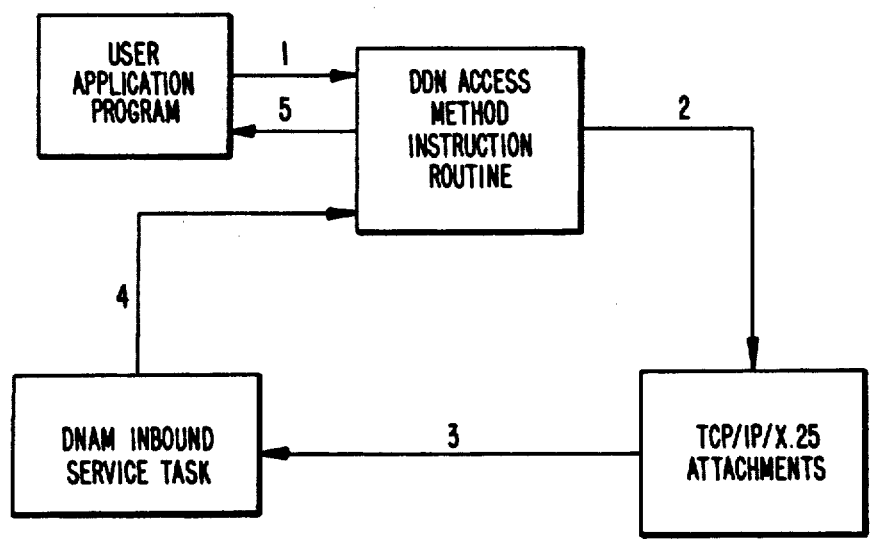
Figure 28:
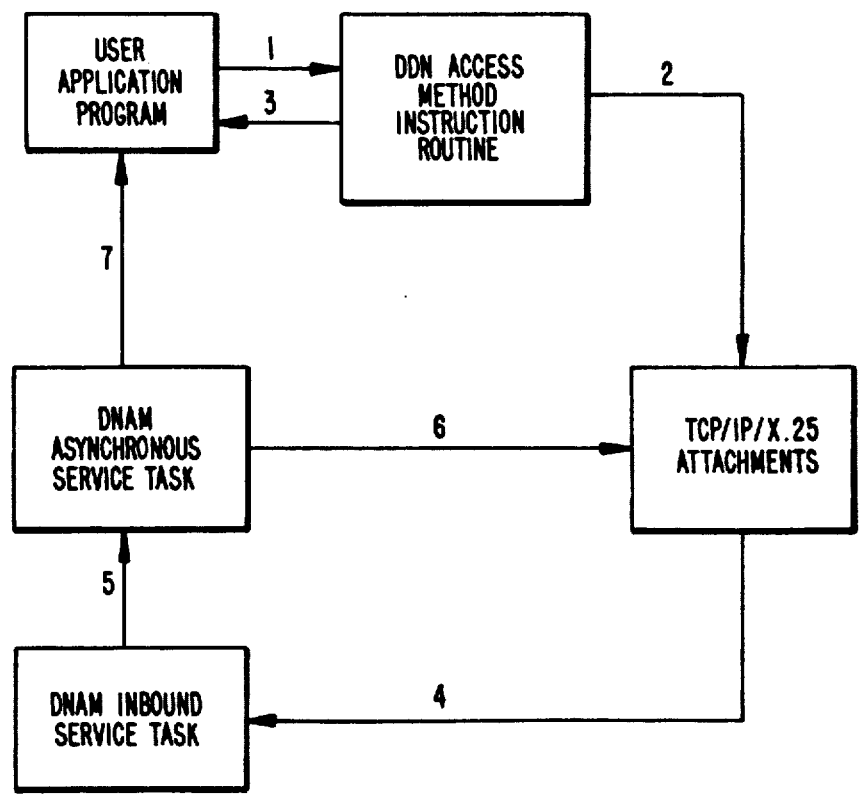
Figure 29A:
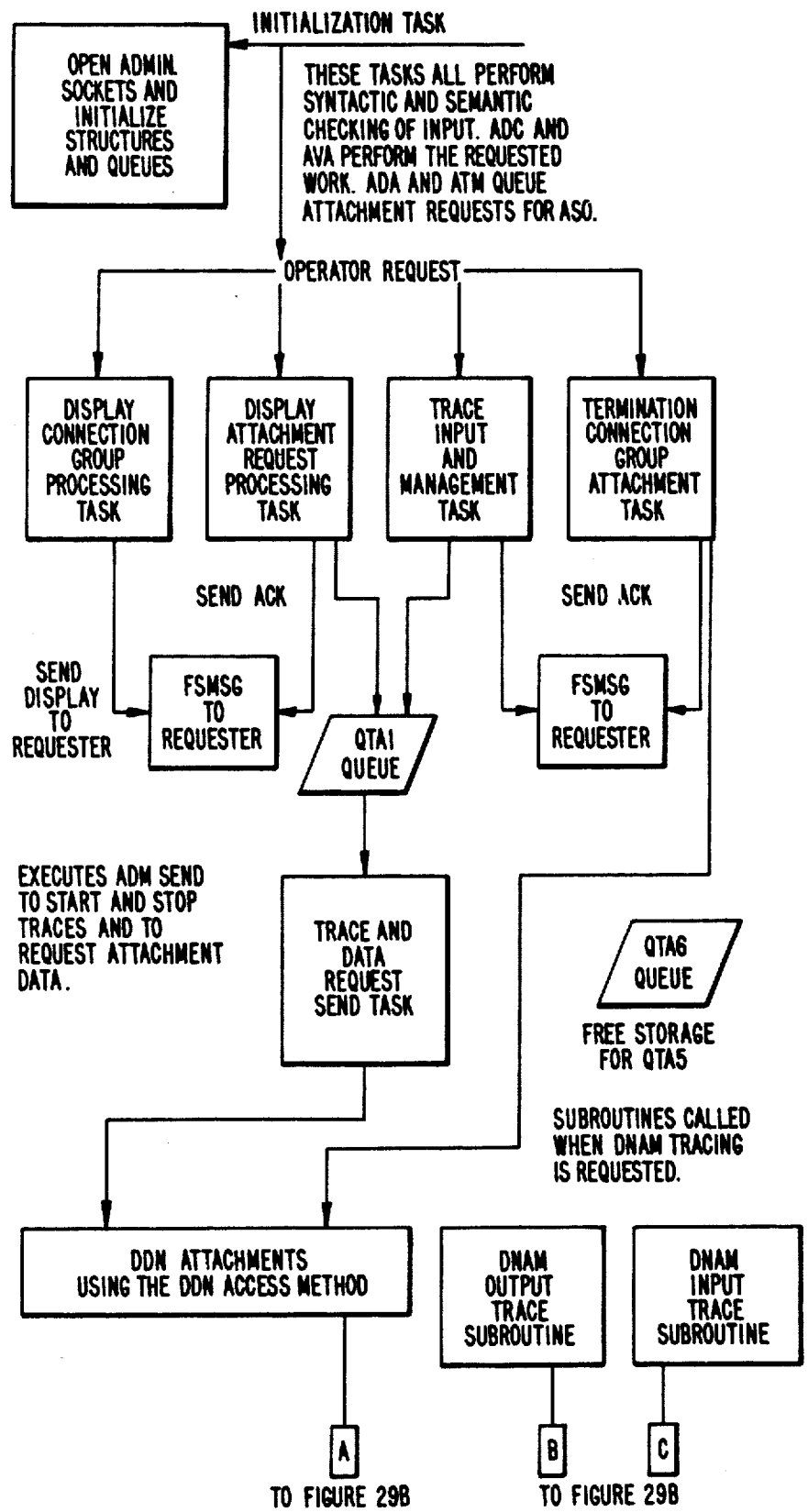
Figure 29B:
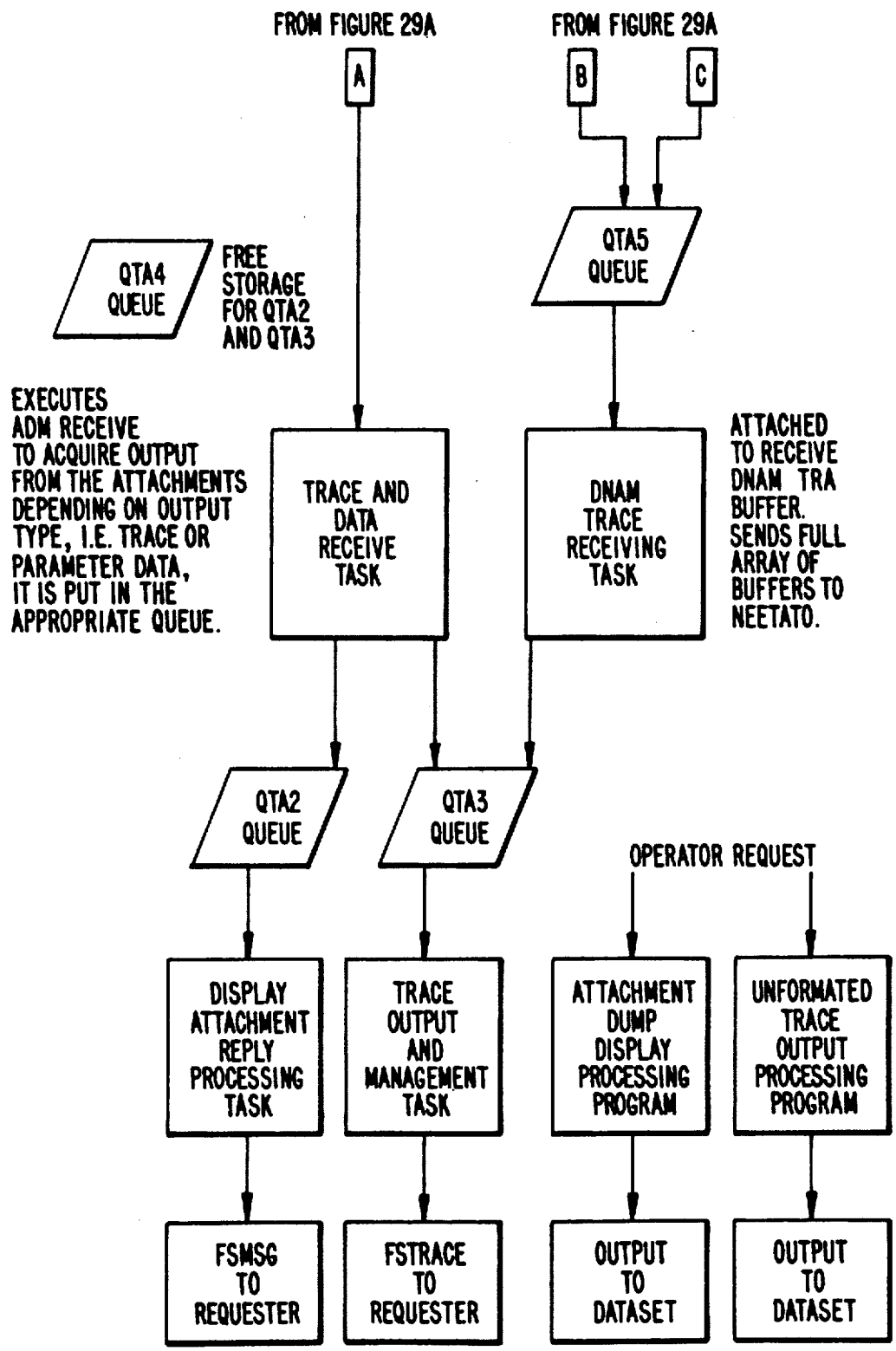
Figure 30:
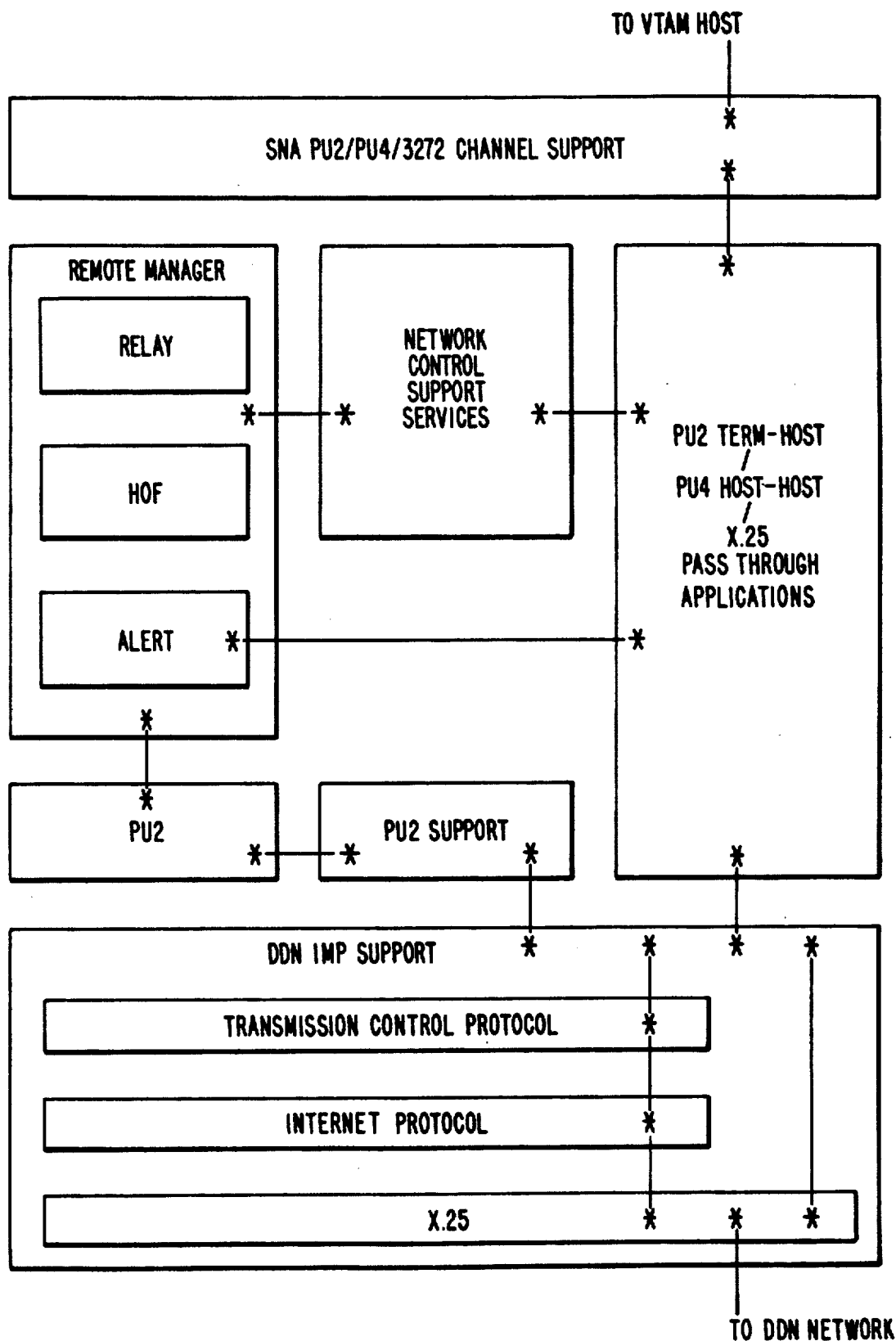
Figure 31:
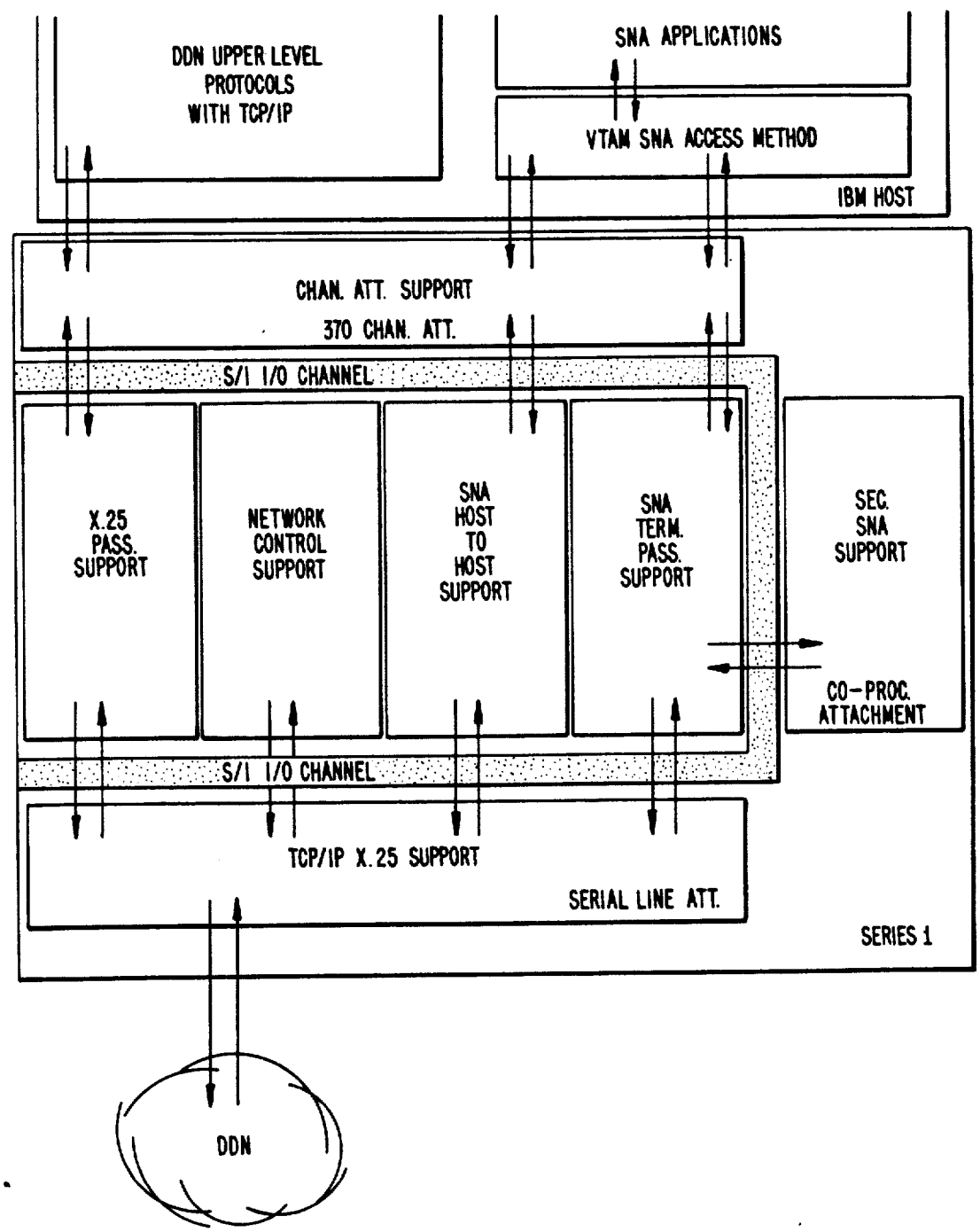
Figure 32:
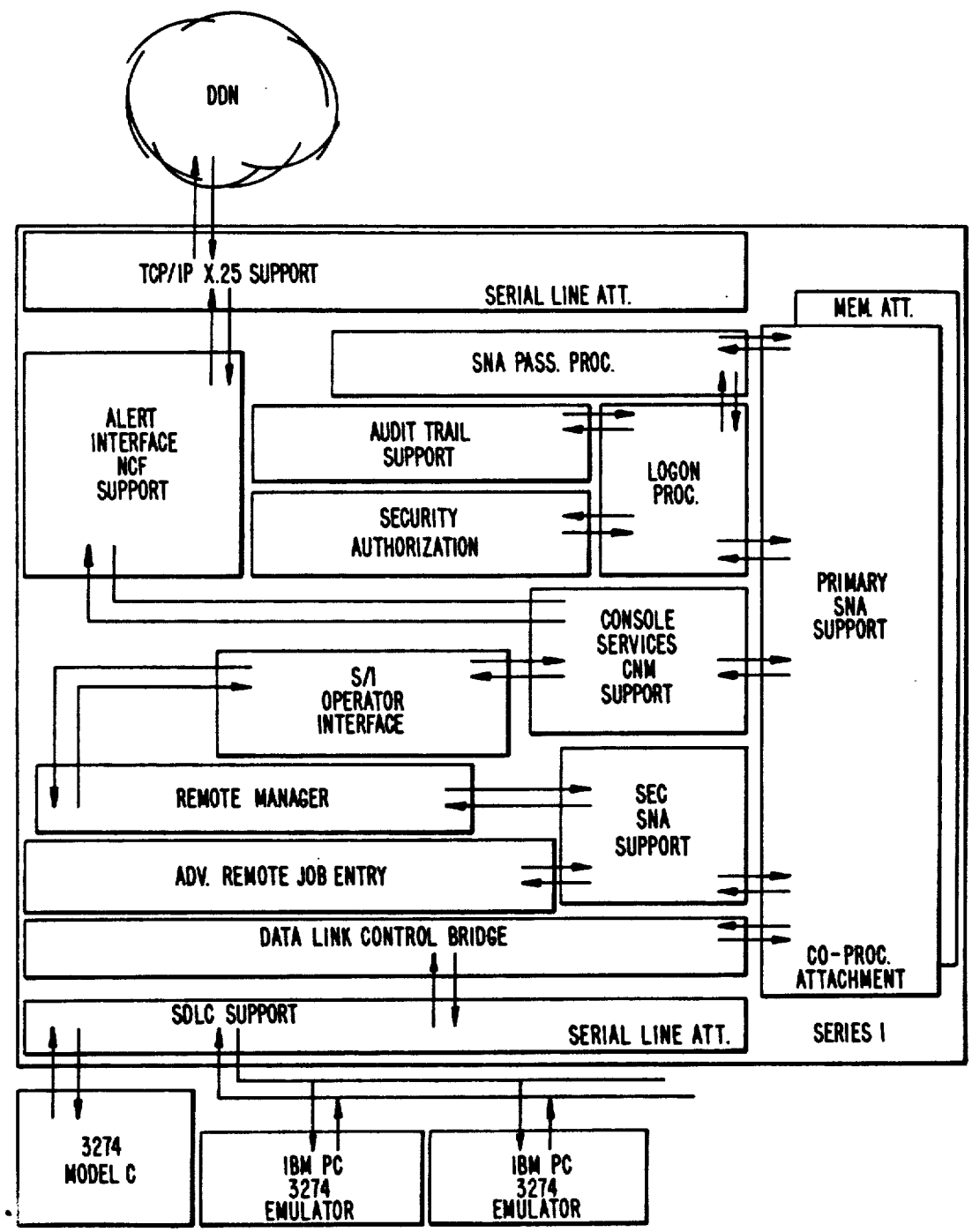
Figure 33:
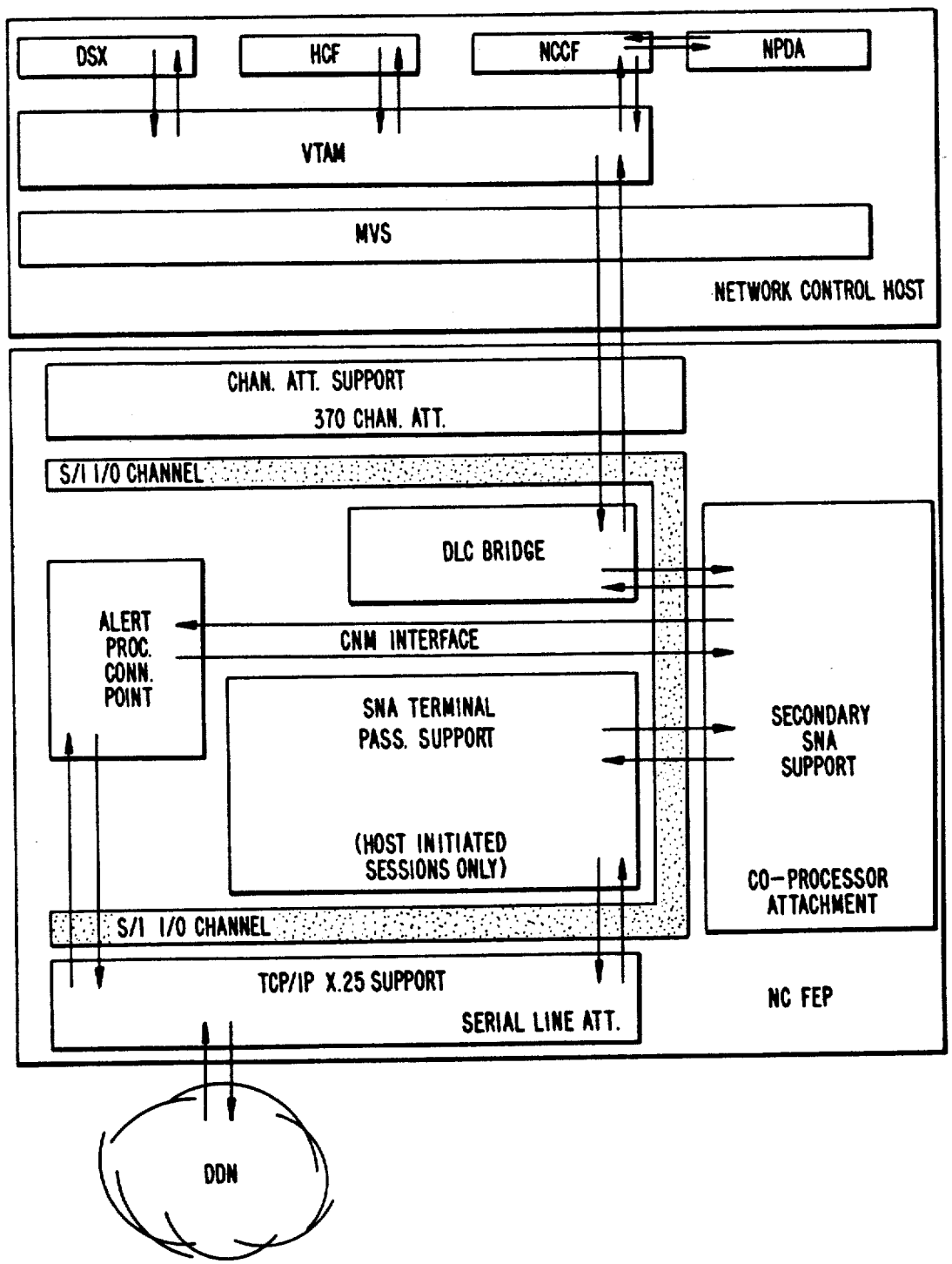

| | |
|---|---|
| FIG. 1 | is a prior art architectural diagram of the Defense Data Network |
| FIG. 2 | Systems Protocol |
| FIG. 3 | MVS/DDN System Block Diagram |
| FIG. 4 | MVS/DDN ACP Structure |
| FIG. 5 | Internet Communication Using ACP between client and server |
| FIG. 6 | DNET-DNET Hierarchy of Protocols |
| FIG. 7 | Header Format |
| FIG. 8 | Configuration Diagram |
| FIG. 9 | Transaction Delay, Resource Utilization and Memory Usage |
| FIG. 10 | Terminal Series/1 Configuration |
| FIG. 11 | Host FEP Series/1 Configuration |
| FIG. 12 | DDN/SNA Configuration |
| FIG. 13 | SNA Data Traffic Flow over DDN |
| FIG. 14 | PU2 FEP Components and RAF Components |
| FIG. 15 | PU4 FEP Components |
| FIG. 16 | DDN/SNA System Sysgen Overview |
| FIG. 17 | DDN/SNA System Elements |
| FIG. 18 | Phase I Processing Overview |
| FIG. 19 | Phase II Processing Overview |
| FIG. 20 | Phase III Processing Overview |
| FIG. 21 | DDN/SNA Host-to-Host System Overview |
| FIG. 22 | PU4 Host-to-Host Application Overview |
| FIG. 23 | PU4 Host-to-Host Application Data Flow |
| FIG. 24 | DDN/SNA Front End Processor |
| FIG. 25 | DDN/SNA NCF FEP |
| FIG. 26 | DDN/SNA Remote Access Facility |
| FIG. 27 | DNAM Synchronous EDL Instruction Flow |
| FIG. 28 | DNAM Asynchronous EDL Instruction Flow |
| FIG. 29A & 29B | DNAM Administrative Facility Task |
| FIG. 30 | Series/1 FEP Functional Overview |
| FIG. 31 | Series/1 Front End Processor Diagram |
| FIG. 32 | Series/1 Remote Access Facility Diagram |
| FIG. 33 | Network Control Front End Processor |

DESCRIPTION OF THE BEST MODE FOR CARRYING OUT THE INVENTION

The invention solves the problem of using DDN communications network in an SNA environment. FIG. 2 shows the system protocol development for the invention.

The invention has three principal features: SNA terminals to SNA host function—this enables attachment of remote products such as 3274 cluster controllers and associated terminals such as 3278s and 3180s and also provides for the direct attachment of PCs emulating 3270 devices.

Centralized Network Control—This provides for a centralized communication network manager using IBM's Network Control program products such as Network Communications Control Facility (NCFF) and Network Problem Determination Application (NPDA).

Host-to-host—This provides communication capabilities, enabling MVS and VM host systems to address each other and communicate over DDN, providing direct communication between data base products such as Information Management System (IMS), and office system products such as Professional Office System (PROFS) and Distributed Office Support System (DISOSS).

Our technical solution requires that Series/1 (S/1) processors be used as interfaces between the commercial hardware/software and DDN. The S/1 processors are configured to perform three unique types of functions: (1) A DDN/SNA Front End Processor (FEP) to interface IBM SNA hosts with DDN, (2) DDN/SNA Remote Access Facility (RAF) to perform a terminal concentrator function for interfacing downstream SNA PU2s to DDN, and (3) Network Control Front End Processor (NCF) to provide Communication Network Management (CNM) support for the S/1s from a centralized network control host.

SNA Terminals to SNA Host Feature

The invention provides the basic SNA terminal pass through capability, utilizing the DDN communication facilities. This is a full scale software development that involves three major activities. First, a set of portable SNA products is ported to the 68K base co-processors in order to provide the primary SNA (PU5) capability in the RAF and in the FEP. Second, channel interface code is developed for the 68K based co-processors in the FEP. Third, for overall control of the SNA functions, a set of Event Driven Executive (EDX), input-/output (I/0) drivers, EDX applications program interface (API) for the outboard (68K) SNA services, and the system support functions (i.e., loaders, dumpers, debuggers, compilers, etc.) is developed and/or ported to the 68K cards. The result of this is a hardware/software package which allows IBM SNA terminals (3270s) to access any IBM SNA host on the DDN, which has an FEP interface to DDN, and allows any application program in an IBM SNA host, to access any printer directly attached to a RAF printer, or any printer attached to a downstream PU2.

Centralized Network Control Feature

This is a software capability that provides a single point of control for the IBM FEP/RAF interfaces to the DDN. We make use of existing IBM Communications Network Management (CNM) products available for SNA networks. The Network Communications Control Facility (NCCF) and Network Problem Determination Application (NPDA) program products are utilized in the network control host. The Series/1 RAFs and FEPs generate asynchronous problem notification (SNA Alerts) for NPDA, so that the NPDA terminal operator is notified of failures detected within the network.

The Host Command Facility (HCF) is utilized in the network control host to provide remote operator support for each FEP/RAF S/1 on the network. The NCF terminal operator is able to operate any given S/1 as though he was sitting at the S1/EDX operator console. This HCF terminal operator is able to lead tasks, cancel tasks, query resource status, activate resources, and deactivate resources.

The Distributed System Executive (DSX) program product is utilized in the network control host. Using the facilities of DSX, centralized control of software distribution, configuration data, user authorization files, and audit trail files is provided at the network control host.

The result of this is an integrated set of software functions residing in the FEPs, RAFs, and NCF which, when used in conjunction with the NCCF, NPDA, HCF, and DSX program products, provides centralized network control for the IBM S/1 RAFs and FEPs attached to DDN.

Host-to-Host Feature

The invention provides a host-to-host capability to enable IBM SNA host based program products to communicate with each other over DDN. This host-to-host function enables the IBM SNA to host resident applications, such as Distributed Office Support System (DISOSS) Systems Network Architecture Distributed System (SNADS) and Customer Information Control Subsystem (CICS) Intersystem Communications, to effectively use DDN to communicate between IBM SNA Hosts.

This host-to-host function is resident in FEPs. It provides a communication pipe for the Virtual Telecommunication Access Methods (VTAM) to communicate with any other VTAM attached to DDN by another FEP, with the host-to-host product.

We implement the SNA explicit routine/virtual route function, which normally runs in an SNA PU4 (37×5), within a S/1 using a TCP/IP/X.25 communication card. This results in an integrated set of software functions residing in an FEP, and allows commercial IBM software program products that use SNA VTAM to communicate between IBM hosts and use DDN for their interhost communication.

Host Interface Design

VM host system includes a VM TCP/IP interface program. The FEP program allows a user to send data files to a host connected to DDN. It includes an image mode file transfer capability for the VM DDN program. It allows users to send executable code files through a VM host an have the files retain the ability to execute on the receiving host.

MVS host system includes in the TCP/IP for MVS, a High-Level Data Link Control Distant Host (HDH) interface, using a Series/1 for connecting MVS to DDN, including an X.25 interface for connecting MVS to DDN. This enables all existing (HDH) installations to convert to X.25 when mandated, without any hardware changes. The Series/1 Front End Processor (FEP) can connect both MVS and VM to DDN suing an X.25 interface.

The following paragraphs explain how X.25 fits into the system structure, and why the ACP is changed.

System Structure

The communication layers required by DDN are implemented across a host and a FEP. The host provides the session layer, presentation layer, and the application layer. This includes Telnet, SMTP, FTP, TCP, and IP. The Series/1 FEP provides the network access layer (X.25), the data link layer (HDLC), and the physical layer.

In the host these services are provided by the operating system (MVS), VTAM, and ACP. In the Series/1, the remaining services are provided by that system's operating system (EDX) and a control program called XNLP (X.25 Network Layer Program). See FIG. 3.

ACP Structure

The ACP resides in the host and is comprised of three major components:

1. User-level Protocol Services—The user-level protocol services include FTP, Telnet, and SMTP.

2. Transport-level Protocol Services—Transport level protocol services include: Transmission Control Protocol (TCP), Internet Protocol (IP), Internet Control Message Protocol (ICMP), and User Datagram Protocol (UDP). These services communicate to the Upper-level protocol services through an internal ACP interface called the "A-level services interface." They communicate to the network layer services.

3. An MVS-Subsidiary Operating System, ICT—ICT is a "mini" operating system which serves as the MVS system services interface. Upper-level protocol services and Transport-level protocol services both interface to ICT through an interface called the "P-level services interface." See FIG. 4.

Network Layer Structure

The network layer is represented primarily in the Series/1. The EDX operating system manages I/O to and from the host and from and to the DDN network. The XNLP operates as application programs under EDX. It communicates with the Network Access Protocol (NAP) in the ACP across the channel interface on one side, and manages X.25 communications with the network on the other.

NAP exists only between the host (the ACP) and the Series/1 (the SNLP). Its function is to provide a path between the IP layer in the ACP, and the X.25 layer in the XNLP. It allows for a reliable and flow-controlled interface between these two components across the host's I/O channel.

Description of the Network Access Protocol

Procedures present in this protocol adapt the IP datagram interface of IP in the host, to the upward-looking interface of X.25 as implemented in the Series/1.

IP generates network-bound datagrams on behalf of upper level protocols in the host. The host-resident NAP generates an X.25 Data Term Equipment (DTE) address using a simple translation algorithm. It appends this field to the head of each datagram and forwards it to the Series/1. In the Series/1, this field is examined to determine if an X.25 virtual circuit exists to that address at the prescribed priority. If found, the appended address is stripped and the datagram is forwarded on the existing circuit. If not found, XNLP establishes the circuit, using the ACP-generated X.25 DTE address; once established, the datagram is forwarded.

For inbound traffic, datagrams are received over X.25 virtual circuits by XNLP. These datagrams are queued to the host and delivered to it in the order received from the network. No X.25 DTE address is appended. NAP, and IP, in the host, then receive the datagram and forward it to the appropriate recipient, represented by a higher-level protocol in the host.

X.25 Virtual Circuit Management—The ACP, due to the distinct layering of this implementation, has no view of X.25 virtual circuits. Its only participation in X.25-specific functions involves the generation of X.25 DTE address as it forwards IP datagrams to the Series/1. Thus, the Series/1 manages virtual circuits autonomously.

As mentioned, circuits are established by XNLP when datagrams arrive from the host for a remote destination, for which a circuit does not already exist. Circuits may also be established as a result of incoming X.25 calls from the network. The ACP perceive this as simply the arrival of datagrams with a different datagram address.

Virtual circuits may be cleared either from the remote end of the virtual circuit or by the XNLP itself. In the latter case, the clearing occurs when the Series/1 detects inactivity on the circuit for a predefined time period.

Finally, provisions exist in the Series/1 to ensure that flow control conditions on any given virtual circuit will not cause suppression of data flow on other virtual circuits to the network. Because the host has no perception of virtual circuits, this flow control is exercised solely by the Series/1 through an internal buffering scheme. The flow of datagrams on the channel interface from the host will be suppressed only if the Series/1 encounters a system-wide buffer exhaustion condition, not because of flow control stoppage on specific virtual circuits.

MVS Distributed Data Base Support

In order to provide a distributed data base using DDN, an enhancement is provided to the user level interface of the Arpanet Control Program (ACP) which allows the DDN Internet to provide communication links between a number of hosts running a relational data base system (DB). All hosts must run an instance of DB and execute the UCLA ACP for communication via the Internet. This will allow each DB instance to communicate with any or all of the other DBs with a degree of concurrency limited only by any inherent limitations of DB itself, and any resource limitations such as main storage.

Background on DB/VTAM Interface

DB is a relational data base which executes in its own MVS address space and calls a module, named DNET, to communicate with other instances of DB using SNA protocols. The DNET module executes under CICS, and locally interfaces to VTAM, to obtain SNA communication services. DNET uses the lowest level of SNA communication. In particular, it interfaces to VTAM as a Logical Unit of type zero (LU0). Using LU0 imposes a fundamental asymmetry to managing the VTAM session, as if a remote terminal ("Secondary Logical Unit" or SLU) were contacting an application program ("Primary Logical Unit" or PLU). The SLU plays an active role and the PLU is passive. Thus, they correspond to the "user" (active) and "server" (passive) sides in the terminology of the Internet protocols.

VTAM provides DNET with a communication interface which is completely independent of the physical location of the remote DNET. Within SNA, the physical location is defined by routing tables generated in the local host an front end processors.

Communication between two DBs is not continuous, but consists of bursts which we call "transactions." A transaction is initiated by a DB instance called the "client," with another DB instance called the "server." A single transaction typically consists of a single request message from client to server, followed by a single response message from server back to client. A new SNA session is set up for each transaction. A single message may be up to 65K bytes long, but averages between 3K and 4K.

Background on ACP/VTAM Interface

The ACP provides a communications interface to the DDN for user and server processes under MVS, using the DoD Internet Protocol (IP). ACP uses VTAM for its interprocess communication (IPC) within the local host. VTAM provides IPC facilities in the form of LU to LU sessions. In each LU to LU session, a logical terminal communicates with a terminal handler program. Thus, a Secondary LU or terminal can request VTAM to establish communications with a Primary LU, normally the terminal handler of a server subsystem. Each primary instance can be simultaneously connected to any number of secondary LUs. The ACP may act in both primary and secondary roles. This corresponds to the server (passive) and user (active) sides in the IP terminology.

Each user or server session within the ACP is handled by one or more User Level Protocol Process (ULPP) routines. A ULPP generally converts between an Internet Protocol and a virtual IBM terminal protocol. A user ULPP is created when a local user requests that VTAM connect to the ACP program. That user ULPP then interfaces with TCP/IP to establish a connection over DDN with a remote host via a well-known port. On the remote host, a server ULPP is created because of the TCP/IP connection that was established. The server ULPP must then open a VTAM connection to complete the conversion path.

New DB to ACP Interface

We modified the ACP to provide a transparent data channel between two DNETs running on different hosts, by interfacing to VTAM, as a virtual DNET on each host. Thus, the SNA communication in each host takes place through VTAM as if both ends were in the same machine. However, the data is encapsulated and sent over a TCP connection between the ACPs on the two actual host.

FIG. 5 shows the communication path between client and server, suing the ACP to provide Internet communication.

For the DNET application, TCP is simply an end-to-end Transport Service (is ISO terminology), providing reliable, flow-controlled, full-duplex virtual circuits called "connections." A TCP connection acts as a simple byte pipe, with no inherent record structure. TCP is responsible for breaking the byte system into packets, as needed, and for reassembling the packets into the receiver buffer.

Each end of a TCP connection is called a "socket," and labelled with the pair:

("host address", "port")

where "port" is a 16-bit port number. Ports in the range 1-255 are assigned (by convention) to particular services; these are called "well-known" ports (WKPs).

The client/server model fits naturally onto TCP. For example, if a client program on a remote host sends a TCP connection request, specifying a WKP on the local host. The ACP will start an appropriate server program (ULPP) and pass to it the identities of the local and remote sockets. The ULPP can then complete the TCP connection and provide the service.

A given socket can participate in any number of connections to different sockets. Hence, there can be multiple concurrent connections to the same WKP on a given server host.

DNET-DNET communication needed the hierarchy of protocols as shown in FIG. 6.

The DB Application Protocol is irrelevant to the layers below. A DB message is an entirely arbitrary stream of bytes (indeed, it will probably be encrypted in some fashion).

However, DNET was designed for the SNA transport service, whose features differ, in certain ways, from those of TCP. In such an application it was necessary to insert a light-weight or thin protocol layer above the available transport service, to supply the missing features expected by the application. We called this the DNET Transport Service Protocol or DTSP. SNA has an implicit definition of the boundaries of a message; a TCP does not. Therefore, it was necessary to include in DTSP some message delimiter mechanism.

In the standard way, we divided a message into segments, and preceded each segment with a header containing (1) the length of the segment, and (2) the end-of-message bit.

FIG. 7 shows a header of 4 bytes.

Thus, a segment can be up to $2^{**}16-1$ bytes. The "opcode" filed would be used if we needed to add any other DTSP features; for the present, it is ignored.

The following LU VTAM-usage profile for DNET was established. This VTAM usage is the one that the ACPs already existing VTAM Application Program (PLU) and Virtual Line Terminal (SLU) modules were made to conform to:

1. No Bind Image Checking,
2. Maximum Buffer Size 65K, Average Buffer Size 4-6K,
3. No Chaining, No Brackets,
4. No SNA Responses,
5. No Sequence Numbers,
6. Only Receive Specific and Send Specific Used,
7. SLU Plays Role of Session Initiator, and
8. PLU Must Support a Minimum of 4 SLUs.

DDN/SNA Design

The design for the integration of SNA into DDN (the DDN/SNA System) allows for IBM commercial SNA products to effectively use the DDN for communications between these SNA products, gives non-IBM DDN users access to applications running on IBM MVS/VTAM hosts or IBM concentrators, and allows terminal users attached to IBM concentrators to have access to applications on non-IBM DDN hosts.

We insert S/1 processors between the IBM SNA products and DDN. The functions performed by the intermediary S/1s are: the encapsulation of the SNA protocols within the transport level protocol (TCP) envelope, enabling an SNA session to be created across DDN; to provide necessary protocol conversions when an IBM terminal user is accessing DDN compatible applications, thereby providing DDN interoperability for the remote SNA terminal user without going to a host, first, and to provide the necessary protocol conversions for non-IBM terminal users attached to DDN to have access to the DDN compatible applications on IBM hosts. The primary features provided by the IBM DDN/SNA Design are:

Provide Network Virtual Terminal users access to IBM MVS/VTAM applications running on IBM hosts.

Provide DDN Network Virtual Terminal users access to the DDN approved upper level protocols (TELNET, FTP, SMTP) running on IBM MVS/VTAM hosts or IBM S/1 concentrators.

Allow IBM SNA products to communicate, using the DDN as the transport medium, while preserving the flexibility and functionality of the IBM SNA products.

Provide IBM terminal users, locally attached to an IBM MVS/VTAM host, access to the DDN approved upper level protocols running on non-IBM hosts attached to DDN.

Provide IBM terminal users, attached to BM S/1 concentrators, to have access to the DDN approved upper level protocols running on non-IBM hosts attached to DDN.

Provide for the centralized control of the IBM s/1s used to interconnect the SNA network with the DDN.

The following is a description of what the invention provides:

FEP/RAF To DDN Overview

The IBM SNA products attach to DDN through IBM S/1 processors which perform the role of communications servers and communications concentrators. For IBM MVS/VTAM hosts, a S/1 provides multiple SNA PU2 interfaces, an SNA PU4 interface, and an ACP interface to DDN. A S/1 communications server attached to an IBM MVS/VTAM host is called a DDN/SNA Front End Processor (FEP). For down stream SNA PU2s, a S/1 provides a communication concentrator interface to DDN. A S/1 concentrator supporting down stream SNA PU2 is called a DDN/SNA Remote Access Facility (RAF).

Network Control Overview

All DDN/SNA S/1 nodes, FEPs and RAFs, are assigned to an IBM MVS/VTAM host for network control services. This host is referred to as the Network Control Host (NCH). The NCH will be front ended with a special purpose S/1, dedicated to performing the network control function. This S/1 is referred to as the network control FEP (NCF).

The sphere of network control encompasses the network of Series/1 computers, which are used to provide interconnection between DDN and the IBM equipment attached to the Series/1 computers. The network control facilities provided allow for the investigation of trouble on the physical links connected to DDN.

There are three functional capabilities used to perform network control. These are provided by the Remote Manager program product for the S/1:

1. Problems detected by a RAF or FEP are asynchronously reported to the network control host as SNA ALERT messages. These messages are spooled by the NCCF/NPDA program products running on the network control host. A NCCF terminal operator is able to browse the alert spool file using the alert's history display panel. In addition to the alert file support, the alert messages are filtered by NPDA for immediate output to an active NPDA most recent event display panel. The NCCF terminal operator who has an active alert panel is able to monitor for critical alert summaries as they are received by NCCF/NPDA. This operator is able to examine each alert in detail by requesting the event detail display.

2. Based on the data received in the alert message, the NCCF terminal operator may want to acquire an HCF session with the Host Operator Facility (HOF) in the S/1 that originated the alert message. While remotely operating the S/1, the NCCF/HCF terminal operator is able to query status of various Series/1 components to further isolate the problem. The basic problem determination tools are implemented with operator commands/responses so that the problem determination process is the same, whether the S/1 is being operated locally or remotely.

3. The NCCF terminal operator is able to invoke an SNA session between the DSX program product, running on the NCH, and the relay facility of the Remote Manage function, running on any RAF or FEP, to transfer files between the designated S/1 and the network control host (NCH). These files can be new network configuration tables or new program load modules being distributed to the S/1; or the files can be S/1 maintained error logs being retrieved for further analysis at the NCH.

Host-to-Host Physical Unit Four Support

The S/1 FEP provides the subarea routing capabilities of a Physical Unit Type 4. The subarea routing function allows MVS/VTAM applications residing in an IBM host to communicate with MVS/VTAM applications, running in other IBM hosts, connected to DDN with S/1 FEPs. The type of applications which utilize this SNA host-to-host capability are:

VTAM Cross Domain Resource Manager (CDRM),
CICS InterSystem Communication (ISC), and
DISOSS SNA Distribution Services (SNADS).

The subarea routing function supports the Explicit Route (ER) and Virtual Route (VR) capabilities of an SNA network. The Path Information Units (PIU) supported are:

Activate Explicit Route,
Activate Virtual Route,
Deactivate Virtual Route, and
Deactivate Explicit Route The S/1 FEP provides the minimum subset of the PU4, Physical Unit Services (PUS), to accomplish the subarea routing function between PU5 hosts. These services allow for the activation of the physical link to the DDN IMP and for the establishment of the appropriate ERs and VRs to the remote host, asynchronous notification of the locally attached SSCP (VTAM) of any FEP detected network failures, asynchronous notification of the designated network control host of any network failures detected by the FEP, and orderly deactivation of the FEP network resources. The SNA formatted PIUs supported are:

Activate Physical Unit,
Start Data Traffic,
Activate Link,
Set Control Vector,
Contact,
Contacted,
Inoperative,
Network Services Lost Subarea,
Explicit Route Inoperative,
virtual Route Inoperative,
Discontact,
Deactivate Link, and
Deactivate Physical Unit.

DDN/SNA Prototype System Example

The objectives of the DDN/SNA Prototype System example of FIG. 8 are:

1. Prove the feasibility of the outboard (68000) resident SNA protocols in an S/1 EDX environment.
2. Verify the SNAPS product "port" to the 68000 SOS environment.

SNAP-LINK—SDLC Data Link Control,
SNAP-2—SNA Physical Unit Type 2,
SNAP-5—SNA Physical Unit Type 5, and
SNAP-THRU—SNAPS bridge between SNAP-5 and SNAP-2.

3. Verify the interoperability of the SNAPS products with commercial IBM SNA products (MVS/VTAM, 37X5/NCP, and 3274-61C).

4. Provide the basic building blocks for the implementation of the specified DDN/SNA functions for the Front End Processor (FEP) and the Remote Access Facility (RAF).

5. Provide real storage occupancy sizes for the outboard SNA functions.

6. Provide a prototype configuration of the DDN/SNA FEP/RAF environment on which benchmark throughput and response time measurements can be acquired.

The configuration diagram shown in FIG. 8 depicts an example configuration. The specific building blocks in the FIG. 8 example configuration of the DDN/SNA are:

1. Outboard SDLC resident on a 68000 communication card,

2. Outboard NSA PU2 resident on a 68000 co-processor,

3. Outboard SNA PU5 resident on a 68000 co-processor, 4. 68000 co-processor operating system and I/O drivers to S/1, 5. S/1 EDX access method for communicating with the 68000 I/O processors, 6. S/1 EDX routing module for passing data between outboard SNAPS products no resident on the same outboard 68000, and 7. S/1 EDX Application Program Interfaces (API) to the outboard SNAPS products.

Analytical Performance Model

This model of the system was developed to predict the results of an IBM Series/1 (S/1) based Defense Data Network (DDN) communications system. The model is constructed to predict transaction response time for various configurations of the S/1, with different user load and transaction scenarios. The model has information describing the hardware, software, protocols, and workload features of the architecture. The characteristics of the model are then translated to mathematical formulas that construct a network of queues representation for this architecture. The model uses two mathematical algorithms to generate performance measures. It uses a standard queue algorithm based on a network of Queuing Theory, that is solved by Jackson's Theorem and a heuristic technique. The results of the model consisted of a combination of reports describing the components of transaction delay, as well as specific details on resource utilization and memory usage.

The model computes response time in a typical configuration as shown in FIG. 9. We assume an SNA controller which is either a 3274 with display heads such as 3180s or 3278s, or PC emulating secondary SNA functions. These are attached to the terminal Series/1 which is in turn attached to the DDN. The host Front End Processor (FEP) is attached to DDN and then channel attached to an IBM or equivalent host. The terminal Series/1 configuration and Host Series/1 configuration are shown in FIGS. 10 and 11.

• Description of Input Requirements

The following input parameters are what is used in the system performance model. These parameters were varied depending on system requirements and user applications.

1. Packet Header Sizes—The parameters specify the size of each type of packet requiring S/1 resources. The values for the parameters are derived from protocol specifications and are constant values. An example of the Packet Header size is the TCP/IP packet length.

2. Software Execution Times—The parameters described the total service requirements for each protocol and software in the S/1. An example of Software Execution Times is the SNA protocol processing time in the S/1.

3. Interface/Channel Transmission Rates—The parameters include information on the data transfer rates of the two types of serial lines, the S/1 Input Output bus and the Defense Data Network. An example of the Interface/Channel Transmission Rates is the DDN packet transfer delay.

4. Workload Information—The parameters described the transaction arrival rate and chain size values. An example of the Workload Information is the size of the request and response chains.

5. Configuration Information—The parameters specify the S/1 hardware architecture to be modelled. An example of the Configuration Information is the quantity of serial links from the S/1 to DDN.

Description of Output Results

1. An example of the output of the model is included here —An example of a "Basic Results Report" for a particular set of system parameters with output timings is the model output. A summary of the key input parameters and output results are listed below: (All time is in seconds).

Input Parameters

Number of Users: 100
Number of TS/1s: 4
Number of SDLC Links per TS/1: 8
Number of Request Pkts: 1
Number of Response Pkts: 5
Transaction Throughput Through Host S/1: 2
Host Delay: 1

Output Results

| | |
|---|---|
| Mean Response Time (First Packet of Response) | 2.21 |
| Mean Response Time (Last Packet of Response) | 3.21 |
| Request Packet Delay (First Packet of Chain) | .591 |
| Request Packet Delay (Last Packet of Chain) | .591 |
| Response Packet Delay (First Packet of Chain) | .620 |
| Response Packet Delay (Last Packet of Chain) | 1.61 |

2. The Detailed Delay Breakdown listed below presents information on the various components of one-way packet delay:

| | |
|---|---|
| DDN Delay | .122 |
| SDLC Link Delay-Request | .227 |
| SDLC Link Delay-Response | .240 |
| DDN I/F Delay-Request | .110 |
| DDN I/F Delay-Response | .125 |
| Processing Delay | .130 |
| I/O Channel Delay | 8.29 |

3. The Resource Utilization list shows the utilization for the S/1 Processors, serial lines, and channels.

More Detailed Description of the Invention

The software in the DDN/SNA design has portions that reside in the IBM Series/1 (S/1); MC68000 hardware, and SNA host. The software allows the flow of SNA terminal traffic to and from SNA hosts, SNA host-to-host traffic and SNA network control traffic over the DDN. FIG. 12 shows a hardware configuration used in System Test to test the data flows. The figure also indicates what commercial hardware and software can be used in the testing.

System traffic flows can be between SNA remote terminals and SNA hosts, between SNA hosts and SNA hosts, and SNA network control traffic. FIG. 13 shows how the data flows for terminal to host traffic, host-to-host traffic, and the network control traffic. It also indicates some possible combinations of functions on the S/1 Front End Processors (FEPs), Remote Access Facilities (RAFs), and Network Control FEP (NCF). It should also be noted that the NCH can also be part of the network and it can communicate to remote terminals and hosts.

SNA TERMINAL TO SNA HOST SOFTWARE

The code includes all the code needed to support 3270 devices attached to a S/1 RAF and have these devices communicate with a SNA host as local attached devices through a S/1 FEP. Physical Unit 2 (PU2) terminal traffic is allowed to operate on DDN and the RAF supports Physical Unit 5(PU5) traffic to control the attached terminals.

Code also does generation and distribution of tables needed to define the configuration of the SNA terminals and the SNA hosts. These tables are generated on and distributed from a central MVS SNA host to the S/1 FEPs and the S/1 RAFs.

SNA HOST TO SNA HOST SOFTWARE

Code implements all of the functions and error recovery logic. This code allows the user to have host-to-host Physical Unit 4 (PU4) traffic flow over DDN. A few examples of host applications that send PU4 data are IMS, Customer Information Control System (CICS), Job Entry Subsystem 2 (JES2), Job Entry Subsystem 3 (JES3), and Remote Spooling Communications Subsystem (RSCS).

Code also provides for the generation and distribution of tables needed by this function to define the configuration and routing between the SNA hosts. These tables are generated on and distributed from a central MVS SNA host to the S/1 FEP. Since the tables for all hosts are generated on a single host, code cross checks the routing information. This check finds invalid routing information and has the changes corrected at the host before distribution to the FEPs. This feature saves the user time when generating a new system modifying an existing system.

Centralized Network Control Software

The code connects the host, commercially available control products to the S/1 commercially available network control products. On the host, these products include Netview, Host Command Facility (HCF), and Distribution System Executive (DSX). On the S/1, the products are the Remote Manager (RM) and Host Operator Facility (HOF). This code gives the user the ability to monitor and control all FEPs and RAFs from a MVS SNA host called the NCH.

Code also allows for the distribution of any code updates to be sent from the Network Control Host to all FEPs and RAFs. This code helps minimize the problems associated with applying and tracking new releases of code on the user's network.

Portion TCP/IP/X.25 to a MC68000 Co-processor Card

The portion of TCP and IP onto a S/1 attached processor included providing the X.25 packet level and frame level underneath those protocol layers. In the hosting S/1, we designed an application program interface under the EDX operating system to allow convenient access to TCP connections maintained by code executing on the attached processor.

Network Management

As more protocol processing is migrated to attached processors, access to their functioning and configuration becomes more difficult. For example, there is no terminal directly attaching to the machine bearing these protocol functions; and in fact, there may be no terminal on the S/1 at all. Network management and fault location can become impossibly difficult if great care is not taken in the protocol porting design.

We found that the protocol code was seriously deficient in these fundamentally important network management issues. What was originally perceived as "porting" became, in fact, a major design effort to include trace points and event counters at significant points within the various protocol layers, and to allow convenient access to those critical performance and history items from a diagnostician who might well be remote from the S/1 under examination.

Analysis of intermittent faults at lower levels of the communication protocol is often overlooked because of the fault tolerance and robustness of affected levels. For example, line errors are automatically corrected at the frame level of X.25 and are unseen by the user of the facilities unless a performance degradation can be sensed by the user or the errors are so severe that an outage occurs. From the user's perspective, little can be inferred simply though the sensing of reduced performance; errors may be occurring at lower levels; or the system may simply be busier than usual. Resolution of these vague and often transistory conditions demands real time inspection of behavior of the underlying levels of protocol, ideally without removing the affected connection from service. With this in mind, we have in effect defined a strategy for on-line fault location at the various protocol layers in a way that causes minimum perturbation of the operational system, yet is easily performed. Code of this sort can be as lengthy and as complex as the actual protocol code that is is serving.

Flow Control

In the layered model for DDN, TCP is a connection oriented protocol. It serves the purpose of connecting a user and server, while at the same time insuring reliable data transfer and controlling the flow of such data on a per connection basis such that the receiving end of the TCP connection is not overrun by the transmitting end of the connection.

Down in the network layer, X.25 is similarly connected oriented, in this case on a per virtual circuit basis. Flow control insures that the sender of packets on one end of a virtual circuit will not overrun the recipient of those packets on the other end of the circuit.

There is no correlation between TCP connections and X.25 virtual circuits' and the flow control procedures exercised by these two layers operate autonomously.

Between TCP and X.25 lies the IP layer. IP is connectionless; it simply emits and accepts datagrams from the underlying (X.25) layer and has no perception of either virtual circuits or flow control procedures operating over TCP connections.

Being connectionless, IP participates in no connection oriented flow control procedures. Thus, if the underlying X.25 layer "backs up" because of flow control stoppages induced at the remote end of virtual circuits, that layer has in effect only a simple on/off procedure that it can use in back pressuring IP from supplying yet more datagrams to it. Since the back pressure applies uniformly to all datagrams emitted by IP, congestion on one or a few virtual circuits owned by the X.25 layer can stop all flow from IP to it. Stopping all flows from IP can have the effect of denying access to all TCP users on an X.25 link, in spite of the fact that TCP flow control would allow it and selected virtual circuits which are not stopped would also allow it.

We regard the problem described as a serious deficiency that is innate to layered architectures containing a connectionless layer.

The problem is rooted in lack of buffering for the communication subsystem. The term "back pressure" mentioned above is symptomatic of an X.25 layer that is incapable of buffering enough IP datagrams to insure a TCP connection's window's worth for each such TCP connection using its services. If X.25 can absorb all of TCP's data outbound sufficiently to cause window closure on all TCP's connections, then TCP flow control procedures will be triggered before underlying layers start causing inequitable allocation of network services to selected connections.

It is impractical in many cases (including the work we are performing) to supply such a generous amount of data buffering at the X.25 level, since TCP windows can be quite large and there can be many such connections operating over a common X.25.

Therefore, we developed a set of procedures for the management of resources at the various levels of protocol, in order to balance the availability of buffers to the various levels and connections such that fairly equitable compromises could be dynamically established based upon the instantaneous demands put on the buffering system.

These procedures operate across all levels in the subsystem; in effect, if X.25 starts consuming too many buffers queued for transmission, controls are exercised to start restricting flows into IP from TCP. Similarly, this back pressuring can be applied between TCP and the interface to the S/1. Even though IP is connectionless, the control procedures we have developed are sensitive to both X.25 and TCP flow control in such a way that equitable allocation of buffers is preserved for each TCP connection in use. In effect, we have developed a "shell" around IP to accommodate its lack of connection oriented flow control.

Multiple TCP Instances

A design requirement in the overall development effort was making provision for more than one interface card to DDN. This requirement was viewed as important both for increasing bandwidth between the S/1 and the network and to allow alternate paths between these two points.

Each card connecting to the network carries the network and transport layers of DDN, namely X.25, IP, and TCP. Thus, multiple cards implies multiple instances of X.25 and TCP on a common S/1.

Several significant problems were uncovered as we addressed this implementation. It became evident that a shortcoming exists in the protocol suite, not only for DDN but for Open System Interconnection (OSI) standards as well: the actual routing of a transport connection in hosts, where multiple instances of the transport layer exists, can not be determined. This shortcoming we attribute to the fact that a physical instance of TCP (or OSI TP) does not have an address in its own right. Instead, the exhaustive network address value defining the TCP connection (port) is composed of an internet address (host address) and port on TCP. By implication, it appears that the terms "host" and "TCP" are synonymous since there is no specification in the address for an instance of TCP within the host.

We have in fact one instance of the upper level protocols (Telnet, FTP, SMTP) above these multiple TCPs and would like to represent the S/1 as a single host to the internet from this perspective. If we assume that a connection is established over one of these TCPs to a common service, there is no difficulty as long as the virtual circuit bearing that connection persists for the duration of the TCP connection. It is possible, however, to have the virtual circuit preempted for other higher priority connections if none are otherwise free and available. TCP tolerates this reemption since it has no specific knowledge of X.25 operations under it. Therefore, the TCP connection can persist even if the X.25 virtual circuit is cleared. If a virtual circuit can be reestablished on behalf of that connection before a timeout occurs within TCP, the user is unaware of the temporary loss of the circuit.

With multiple hardware connections, however, it may be that the reestablished circuit has taken a different physical path to the S/1, appearing on another network interface card, underneath another instance of TCP. The ultimate effect of taking a different physical path will be failure of the TCP connection because of inability to force reestablishment of the virtual circuit to the proper TCP.

We see no solution for this problem. In studying it, we felt that it would become a serious matter only if virtual circuits would become preempted and therefore, we j have taken the strategy of supplying enough X.25 logical channels in each card to support the maximum TCP connection load that the card can accommodate.

Multiple TCPs in one host present another difficulty: if we are to offer upper level services as a common host over multiple physical links, passive TCP opens must be established over each such link to accommodate arbitrary link selections by the Interface Message Processor (IMP) on routing incoming active opens to that service.

A third difficulty surfaced relating to the possibility of "crossing" active opens. "Crossing" active opens occur when each end of a connection to be established issues an active open to the other; but because of selection strategies that are imposed by the IMP, and are beyond our control, these flow over two different hardware links. Since the individual TCPs are ignorant of each others' activities, connection deadlocks can result.

These issues suggest a need for a common control point to manage the establishment of TCP connections over the several TCPs present on the S/1. Therefore, we studied the TCP implementation and identified points where S/1 control code could be energized to oversee the connection establishment process, and yet not burden the normal TCP functions on the attached processors.

This design has been completed and it satisfies the problems cited. From upper levels looking down, we hide the existence of the multiple TCPs and give the appearance of only one. Thus, only one passive open need be executed. We intercept incoming active opens from the network and if we find a match to the passive open, inform the attachment to accept the open and complete the connection; which card carried the incoming active open is no longer of significance. In the case of "crossing" active open requests, an arbitration scheme has been established, based upon the numerical value of the source and destination addresses, that guarantees completion of the connection over a single virtual circuit.

Although requiring intervention by S/1 code at TCP connection establishment time, this solution has been designed not to interfere with TCP functioning in the attached processor, thereby, preserving the performance benefits that accrue in off-loading TCP from the S/1.

Enhancements to EDX Operating Systems

The DDN/SNA required a number of enhancements to EDX: (1) System wide operator facility to effectively and efficiently handle message exchanges between programs, and to provide a single operator interface; (2) Cross partition data area services to provide access to common data areas across S/1 code partitions; and (3) Buffer management facility to provide the passing of buffers across S/1 code partitions.

System Wide Operator Facility

Enhancements were made to EDX to provide a way to handle message exchanges between programs in S/1 storage and to provide a common operator interface to a user. Enhancements were designed, coded, tested and documented in a package called System Wide Operator Facility (SWOF). The message exchanged provided a cross partition queuing and buffering of messages between programs. Timing measurements indicate that to "put" or "get" a message requires approximately 1.4 ms.

The common operator interface, using the message exchange functions, allows program modules to send information (log), trace and error/alert messages in a common format to a single service routine which logs the message to appropriate disk files and displays the message at the operator console. Facilities are provided to browse the files by message type, severity, and/or date.

Cross Partition Data Area Services

The Cross Partition Data Area Services is a method of providing a common data area to two or more programs in different partitions of a DDN/SNA FEP or RAF. These services were designed, coded, tested and documented in 1986.

A common data area would normally be used if a program must share a data field with another program in a different partition. The cross partition data area is mapped only to one partition and the users in other partitions typically make use of Cross Partition macros to manipulate the shared data items. Cross Partition data areas will be used for less frequently referenced data fields. As many as 16 different data areas may be defined, each identified by a unique logical value in the range of 0 to 15 (which is independent of the partition in which it resides).

Cross Partition data area 0 is reserved and identifies the data area which physically resides in partition 1 and contains global data common to multiple functions and/or partitions, such as the Series/1 logical name and buffer management statistics. The first 32 words also contain the vectors (address and key) used to address data areas 0-15.

Two mechanisms exist for defining Cross Partition data areas to be used. If instructed, system initialization will load data modules into designated partitions and store the vector information. Alternatively, an application may define and initialize the data area itself and pass the vector information to system initialization. In any case, all Cross Partition data areas should be defined by the completion of initialization.

Fourteen macros are supplied to operations when one or more operands reside in a Cross Partition data area. These macros follow the normal syntax of Event Driven Language (EDL) statements:
label #Xopcode opnd1,opnd2, KEYWORDs or
label #Xopcode opnd1, KEYWORDs Each positional parameter may be either a local (LOC) or cross partition (XPD) data reference. The interpretation and syntax of local operands are as in normal EDL. XPD operands are similar to EDL in syntax, but differ in interpretation. At least one operand must be cross partition. Keyword parameters TO and FROM designate opnd1 and opnd2, respectively, as either local or cross partition data references. If the keyword is present, the corresponding positional parameter is XPD. If the keyword is omitted, the corresponding positional parameter is LOC.

The value specified for TO/FROM indicates the predefined logical cross partition data area to which opnd1/opnd2 refers. This defines a physical physical partition number and data address of the target/source data structure. The corresponding positional parameter is used to determine the effective address of the data item in this structure.

Buffer Management Facility

The Buffer Management Facility (BMF) provides the following services to the user program:
Gaining access to buffers from unmapped storage outside of the user's partition by mapping the unmapped storage to the user's partition (refer to EDX manuals for a description of mapped and unmapped storage),
Providing buffers that are smaller than 2 k bytes,
Providing very large buffers by viewing them as chains of 2 k byte blocks,
Creating a smaller buffer from a larger buffer when only a part of the larger buffer is needed to contain the user's data,
Allowing buffers to be sent across partitions by enqueuing the address of the buffers rather than performing a cross partition move, and
Allowing buffers to be acquired in one partition and freed in another.
The user program can request services from the BMF through the use of the following statement and instructions: #DEFBUF, #GETBWA, #FREEBWA,

GETBUF, #RSTRBUF, #FREEBUF, and #SAVEBUF.

The #DEFBUF statement creates a Buffer Management Control (BMC) block and lets the user specify the maximum size of a buffer that can be acquired by a single #GETBUF. This maximum buffer size will set some limits on the size of the buffer work area that will be acquired by the #GETBWA instruction. Whenever "maximum buffer size" or "MAXSIZE" is used, it refers to the maximum buffer size defined on the #DEFBUF statement. The #DEFBUF statement is non-executable (refer to the "EDX Language Reference" manual for a description of the difference between a statement and an instruction).

The #GETBWA instruction acquires a buffer work area in the user's partition. If the maximum buffer size is less than or equal to 2 k bytes then the size of the buffer work area would always be equal to 2 k bytes. Otherwise, the user can specify the size of the buffer work area as a multiple of 2 k bytes and less than or equal to the maximum buffer size. Once the buffer work area has been acquired, it will be used to contain a buffer from unmapped storage and its size will determine the maximum amount of storage that can be acquired by a single #GETBUF.

The #FREEBWA instruction releases the buffer work area in the user's partition.

The #GETBUF instruction gains access to a buffer from unmapped storage by mapping it to the buffer work area. The amount of buffer storage acquired by one #GETBUF can not exceed the size of the buffer work area.

The #RSTRBUF instruction restores the buffer identification that has previously been saved by a #SAVEBUF and maps the corresponding buffer or part of it to the buffer work area. The amount of buffer storage resorted by one #RSTRBUF is equal to the smaller of the buffer work area size or the buffer size.

The #FREEBUF instruction releases the buffer that currently resides in the buffer work area, or the buffer chain that has n2 k byte blocks currently residing in the buffer work area.

The #SAVEBUF instruction saves the identification of the buffer that currently resides in the buffer work area or the identification of the buffer chain that has n2 k byte blocks currently residing in the buffer work area. The instruction then swaps the buffer or part of that buffer chain out of the buffer work area. If the user does not want the entire buffer to be saved, he may choose to specify the amount of storage to be saved via the operand BUFSIZE of the #SAVEBUF instruction.

After a #GETBWA, #FREEBUF, #SAVEBUF, or #SWAPBUF OUT is issued, the buffer work area does not contain any buffer from unmapped storage and is available to the user for other purposes. After a #GETBUF, #RSTRBUF, or #SWAPBUF IN is issued, the buffer work area contains a buffer from unmapped storage that can be sent across partitions as required. After a #SAVEBUF with BUFSIZE is issued, the buffer work area may be partially filled and is not available to the user as a private work area. After a #FREEBWA is issued the buffer work area no longer exists.

Each user program that wants to use the BMF, would have to specify the maximum buffer size via the #DEBUF statement and then issue a #GETBWA instruction to acquire a buffer work area. Once that is done, any buffer management function that affects that buffer work area has to refer to the label of the corresponding #DEFBUF statement.

The BMF can provide buffers that are smaller than 2 k bytes, but it can only handle one small buffer size at a time. At system generation time, a small buffer size may be chosen and can only be equal to one of the following values: 256, 512, 1024, and 2 k bytes. Its default value is 2 k bytes.

The system will enter the slowdown mode when either the number of available 2 k byte blocks of unmapped storage (reserved for the BMF) or the number of available queue elements (in the queue class reserved for the BMF) drops below its associated enter slowdown threshold. While the system is in slowdown, only crucial buffer requests would be honored; all other buffer requests would be rejected. The user programs issuing non-crucial buffer requests would have to perform a wait and would subsequently be posted by the BMF when the system exits slowdown. The system will exit slowdown when both the number of available 2 k byte blocks and the number of available queue elements become greater than their corresponding exit slowdown threshold.

SNA Terminal to SNA Host Software

To allow SNA terminal to SNA host traffic to operate on DDN, several elements must be supported on the FEP and/or RAF. These elements include NSA PU2, SNA PU5, SNA Data Link Control (DLC), SNA pass-through applications and SNA log-on and security applications. SNA primary (PU5), secondary (PU2), pass-through and DLC functions are provided by software knows as SNA Portable Software (SNAPS). To port the code to different environments requires the customizing at an isolation layer and designing/coding access methods called Access Modules (AMODs).

High level and low level designs have been completed and documented for the SNAPS PU2, PU5, and Link isolation layer AMODs, Personalized Modules (PMODs), HMOD, and Console Service Interface (CSI). These include AMODs for DLC, High Level Interface (HLI) for application programs, Transmission Control Interface (TCI) for pass-through through; PMOD for console services and alert processing; and error handling/alert messages from the SNAPS code.

Two S/1 configurations were specified for this function; FEP SNA PU2 processor between the 370 host and the DDN, and a RAF SNA PU5 processor between the DDN and the SNA terminal control units. See FIG. 14 for the components used in a PU2 FEP and RAF configuration.

PU2 FEP Design

The FEP is a S/1 channel connected to a 370 host. It appears to the host as a NSA 3274 device or devices, multiple Physical Units (PUs) with multiple Logical Units (LUs). SNAPS PU2 code, residing on MC68000 co-processors, provides the PU2 and LU support to the channel interface. A pass-through module in the S/1 provides the support and interface from the PU2 to a TCP interface to TCP code residing on another MC68000 co-processor.

High level and low level designs have been completed and documented for the FEP system. Module designs included are:

A pass-through function between the 370 channel 3274 Application Program Interface (API) and the DLC AMOD for SNAP PU2, A pass-through function between the SNAPS PU2 TCI AMOD and the TCP API, Interfaces and messages to the SWOF common operator support, and A Resource Manager which controls the loading of programs to the co-processors and S/1, manages routing/connecting of module interfaces, and controls the orderly shutdown and reloading of programs. This module is also common to the RAF and NCF.

RAF Design

The RAF is a S/1 serving as an interconnection between the DDN and downstream SNA devices such as 3274s. To the downstream SNA devices, the S/1 appears as a SNA host (primary PU5). SNAPS PU5 code residing on a MC68000 co-processor provides the PU5 System Service Control Point (SSCP) support and SNAP LINK on another MC68000 co-processor provides the primary Synchronous DLC (SDLC) support to the terminals. A pass-through module in the S/1 provides the support and interface between the PU5 TCI AMOD to the TCP interface.

High level and low level designs have been completed and documented for the RAF system. Module designs included are:

A pass-through function between the SNAPS PU5 TCI AMOD and the TCP API,

A HLI API between application programs in S/1 and the HLI AMOD in PU5,

Resource Manager as described under the FEP,

A pass-through module between the PU5 DLC AMOD and the SNAP LINK AMOD, and

A DLC modification to the S/1 $SNA Program Product to interface to PU5 DLC AMOD. Working in conjunction with the S/1 Advance Remote Job Entry (ARJE) Program Product, this modification provides Remote Job Entry (RJE) support with local S/1 printers.

SNA Host to SNA Host Software

A SNA PU4 node provides the following four primary functions:

Data Link Control—Provides the function needed to transmit and receive data over the 370 channel and over the DDN.

Path Control—Provides the function needed to route the data between the data link control functions.

Boundary Node Function—Provides an interface to attached PU2 peripheral nodes.

PU4 Physical Unit Services—Provides for local SNA host control of the network resources owned by that host. The SNA host can perform tracing, dumping, activation, or deactivation of these resources. Of these four functions, only the first two should be supported on the PU4 FEP. The third function is unnecessary since PU2 nodes may only be attached to a RAF. The fourth function is unsupported for the following reasons:

It overlaps and conflicts with the concept of a centralized network control function. Many of the functions provided by the NCP Physical Unit Services needs to be available to the remote Network Control host rather than the locally attached SNA host.

Each SNA host would require knowledge of the attached PU4 FEP resources and be dependent on any configuration changes to those FEPs. With the current PU4 FEP design, all SNA hosts are treated as "data hosts" and thus, have no knowledge of the network resources.

This function requires the establishment of a session between the PU4 FEP and the SSCP in the SNA host. Support of a SSCP to PU4 session requires the processing of many types of PIUs and therefore, places a much stronger dependence on future changes to SNA. With the current PU4 FEP design, processing of only six PIU types is required.

To provide this function would require a significant amount of effort (estimated as twice that of the total PU4 support).

The 370 channel and DDN data link control functions, the path control function, and the support code for the centralized network control function are described. Refer to FIG. 15 for an overview of these functions.

PU4 Channel I/O

The PU4 Channel I/O data link control function interfaces with the channel attached MC68000 card to communicate with one host over one PU4 channel. The PU4 Channel I/O function and the channel attached MC68000 card together perform the Data Link Control and as such respond to all channel commands as a NCP 3725 Communications Controller. The PU4 Channel I/O function:

Processes contact/discontact/error sequences and informs Path Control when the channel operative/inoperative state changes, Receives PIUs from the host and passes them onto Path Control for routing to their destination, and Receives PIUs from Path Control and transmits them to the final destination host.

High level and low level design have been completed and coding has begun for this function.

PU4 DDN I/O

The DDN I/O data link control function interfaces with the TCP API to communicate with the remote PU4 FEPs on the DDN. The DDN I/O function and TCP API together perform the Data Link Control for the DDN interface. DDN Access Method (DNAM) resides in the EDX supervisor partition. The DDN I/O function:

Processes open, close, and error sequences; and informs Path Control when a DDN connection operative or inoperative state changes. For each remote PU4 FEP one or more (maximum of 8 defined at system generation time) unique DDN connections are established at initialization time or upon operator request.

Receives PIUs from remote PU4 FEPs via the DDN connections and passes them to Path Control for routing to their final destination.

Receives PIUs from Path Control and transmits them to the remote PU4 FEPS via the DDN connections. It is the remote PU4 FEPs responsibility then to forward the PIUs to the final host destination.

PU4 Path Control

The Path Control function routes data between the source and destination SNA hosts and controls data traffic in the network. More specifically, the Path Control function:

Performs PIU validation, prioritization, tracing, and routing;

Monitors the Virtual Routes (VRs) for congestion and performs VR pacing; and

Manages and maintains the status of the Explicit Routes (ERs) and broadcasts this information to all affected nodes, as required.

PU4 Network Control Support

Network Control Support are utility functions that would normally have been accomplished by the "Physical Unit Services" function in a normal SNA node. These functions interface with the FEP Network Control modules and are invoked by the Network Control operator. The functions include:

Activating or deactivating a trace of a channel or DDN connection,

Displaying status of a channel or DDN connection and it associated ERs, and

Activating or deactivating a DDN connection. Note that a channel may not be activated or deactivated by the Network Control operator. This function may only be initiated by the locally attached SNA host operator. High Level design has been completed for this function. Low level design has been completed and significant progress has been made on the coding of the trace subfunction.

Centralized Network Control Software

The Network Control design provides a single point of control for all FEPs and RAFs. This design makes use of existing IBM Communications Network Management (CNM) products. This design uses a NCH channel attached to a NCF which communicates with software components in the FEPs and RAFs.

NCH Design

The NCH is a 370 host from which the Network Operator runs the DDN/SNA Network. The NCH is channel connected to one or more NCFs in the same manner that other network hosts connect to their associated FEPs. The NCF provides connectivity from the NCH to the DDN/SNA network.

The NCH provides the CNM capability for the network, and performs this task by using standard IBM CNM products. Among these are:

Netview—Primary product for CNM functions. With Netview, the operator can monitor network resources and receive a comprehensive display of network activity.

DSX—Product used by the network operator to perform bulk data transfers between the NCH and any of the FEPs or RAFs in the network. This function is used to down load new configurations, distribute password and user profiles, and retrieve dump and audit trail information.

HCF—Product used to allow the network operator to enter S/1 commands remotely on a FEP or RAF. The operator at the NCH appears as a local S/1 operator and can enter any of the S/1 commands that a local operator can enter.

The NCH environment has been designed to utilize standard IBM products to minimize operator training requirements, installation effort, and impact of future software changes on the host. The Netview product has been included to replace the functions previously provided by the Network Communication Control Facility (NCCF) and Network Problem Determination Application (NPDA) products.

NCF Design

The NCF is a front end processor (much like a FEP) S/1 channel connected to a 370 host. This processor appears to the host as a SNA 3274 device or devices (exactly like the PU2 FEP). The NCF function is to interface to the DDN, receive the SNA alerts generated by the FEPs and RAFs connected to the DDN and also serve as the interface between the NCH and the RM facilities within the FEPs and RAFs for HOF and DSX sessions from the host.

The NCF system module designs include all the programs in a FEP except for Alert processing and $SNA/RM interface. An Alert processor receiving module is required which interfaces with the TCP API to receive the alert messages from FEPs and RAFs and pass them on to the host via the SNAPS PU2 HLI AMOD interface.

FEP Network Control Modules

The network control modules communicate with the NCH. These modules work with commercial S/1 products to send alarms and dumps to the NCH; and to receive operator commands, configuration tables, and new code from the NCH.

The FEP system module design includes an Alert processor module which in conjunction with S/1 standard products $SNA and RM processes error messages from the FEP hardware and software, and transmits them via the TCP interface to the NCF as SNA alert messages.

RAF Network Control Modules

The RAF network control modules communicate with the NCH. These modules work with commercial S/1 products to send alarms and dumps to the NCH; and to receive operator commands, configuration tables, and new code from the NCH.

A Console Service module in the S/1 interfacing between SWOF operator consoles and the PMOD of the PU5 so that the operator can control (activate or deactivate) the PUs and LUs.

An Alert processor as described in the FEP,

A Log-on application program in the S/2 to the HLI API providing user log-on screens and selection of host/applications for user, and A security and audit S/1 program to provide security checking of user identifications and passwords and maintain an audit file of all log-on attempts.

DDN/SNA Front End Processor (FEP)

The S/1 which provides the interface between an IBM MVS/VTAM host and the Defense Data Network is referred to as a DDN/SNA Front End Processor (FEP) shown in FIGS. 30 and 31. The primary requirements for the DDN/SNA FEP are:

Provide the TCP/IP envelope services for passing SNA PIUs between a DDN/SNA FEP and a DDN/SNA for FID2 PIUs and between a DDN/SNA FEP and another DDN/SNA FEP for FID4 PIUs.

Provide an SNA PU2 interface to the MVS/VTAM host for interactive SNA 3270 terminal users which are attached to DDN via a DDN/SNA Remote Access Facility (RAF).

Provide an SNA PU2 interface to the MVS/VTAM host for host initiated sessions which require access to SNA Logical Units which are resident within a DDN/SNA Remote Access Facility (RAF).

Provide an SNA PU4 interface to the MVS/VTAM host for SNA host-to-host communication across the Defense Data Network.

Provide an SNA PU2/LU1 interface to the MVS/VTAM host for host NVT Server TELNET sessions with non-IBM terminal users attached to the Defense Data Network.

Provide support for the centralized control of the S/1 FEP from a remote network control host.

The basic components that make up a S/1 FEP are shown in FIGS. 30 and 31. Each S/1 FEP consists of an IBM channel support function (for PU2, PU4, and 3272 interfaces) a DDN Interface Message Processor (IMP) support function, a Network Control support function (which consists of a Remote Manager and Network Control support services), and either an SNA PU2 terminal-host application, an SNA PU4 host-to-host application, or an X.25 pass through application.

The X.25 pass through application provides the X.25 services for either the MVS/VTAM based Arpanet Control Program on an MVS/VTAM host or the VM/TCP/IP Program Offering on a VM/VTAM host.

DDN/SNA FEP Interfaces

The FEP has four types of external interfaces which are necessary to perform the required functions: A PU2 channel interface to an IBM MVS/VTAM host, A PU4 channel interface to an IBM MVS/VTAM host, a native I/O channel attach interface supporting X.25 for host resident TCP/IP applications, and a RS449/HDLC/X.25 interface to the Defense Data Network.

FEP/SNA PU2 Interface

The FEP appears to the host processor as multiple SNA PU2s. The FEP shall accept and process ACTIVATE PHYSICAL UNIT and DEACTIVATE PHYSICAL UNIT PIUs on the SSCP-PU session. When an DEACTIVATE PHYSICAL UNIT PIU is received, the FEP shall terminate all sessions and connections associated with the LUs of the PU being deactivated, deactivate all associated LUs and recover all assigned resources. A REQMS PIU received over the SSCP-PU session shall be rejected with a function not supported negative response. A minimum of eight PU2s shall be supported by a single FEP. ACTIVATE PHYSICAL UNIT (ERP) will not be supported. Each LU associated with a channel attached PU shall be allocated at system configuration time to one of three distinct LU classes:

1. Interactive 3270 Terminal LU2s

The LU2s to be associated with interactive 3270 terminal sessions are initially assigned to a pool of available 3270 LU2s from which the FEP can dynamically allocate when a RAF connected 3270 terminal user requests a DDN connection to the FEP attached host. The FEP shall respond to VTAM initiated ACTIVATE LOGICAL UNIT PIUs with a positive response for each configured LU2 with a control vector indicating that the LU is unavailable (power-off) and the LU shall be made available for session assignment. ACTIVATE LOGICAL UNIT (ERO) will be treated as an ACTIVATE LOGICAL UNIT (COLD). On receipt of a DEACTIVATE LOGICAL UNIT the FEP shall remove the LU from the pool of LU2s available for session assignment.

2. Interactive 3767 Terminal LU1s

The LU1s to be associated with interactive 3767 terminal sessions are initially assigned to a pool of available 3767 LU1s from which the FEP can dynamically allocate when a DDN connected NVT terminal user requests a DDN connection to the FEP attached host. The FEP shall respond to VTAM initiated ACTIVATE LOGICAL UNIT PIUs with a positive response for each configured LU1 with a control vector indicating that the LU is unavailable (power-off) and the LU1 shall be made available for assignment. ACTIVATE LOGICAL UNIT (ERP) shall be treated as an ACTIVATE LOGICAL UNIT (COLD). On receipt of a DEACTIVATE LOGICAL UNIT the FEP shall remove the LU from the pool of LU1s available for session assignment.

3. Host Inititated session LU2 (LU1s and LU3s)

The LUs for which a host application can initiate a session, (VTAM OPNDST ACQUIRE), are those LUs which define RAF attached logical units (printers) controlled by the RAF resident primary SNA function. For each RAF attached printer to which a host based application such as JES2 must send data, a unique LU must be defined to the host resident VTAM and JES subsystem. The LU definition must comply with the session protocols supported by RAF based SNA support package. Within the FEP each LU shall be associated with the appropriate RAF based LU by defining the RAFs DDN network address, the RAFs DDN host address, and the unique TCP port address defined for the RAFs LU. These addresses will be used by the FEP to establish the DDN/TCP connection when the SNA BIND PIU is received from the VTAM/host. The FEP shall respond to VTAM initiated ACTIVATE LOGICAL UNIT PIUs for this class of LUs with a positive response and a control vector indicating that the LU is available (power-on). ACTIVATE LOGICAL UNIT (ERP) shall be treated as an ACTIVATE LOGICAL UNIT (COLD). DEACTIVATE LOGICAL UNIT shall be supported.

FEP/SNA PU4 Interface

The S/1 FEP channel support shall provide a subset of the NCP Physical Unit Type 4 interface between the locally attached IBM VTAM data host (i.e. a host that does not own or control any PU4 resources) and one or more remote IBM VTAM data hosts. The S/1 FEP channel support will be based on NCP version 4 and will interface with VTAM version 3. Note that TCAM version 3 is a subsystem that uses VTAM as an access method and therefore is supported by the S/1 FEP.

The following access method dependent requirements shall be supported.

SNA 4.2 channel command sequences. Appendix G of the 'NCP Diagnosis Reference for the IBM 3725' describes the commands, Start I/O condition codes, channel status and sense indications for this channel interface. During the contact sequence, the S/1 FEP shall respond to the host in the XID data with 'already loaded'.

Attention time-out feature used (by the S/1 FEP) to determine channel contact loss.

Attention delay feature used (by the S/1 FEP) to ensure that the interrupts to the host access method are kept to a minimum.

Pad bytes preceding each PIU transferred to the host. For VTAM, the number of pad bytes will always be zero.

Host command chaining between buffers. To allow the host to command chain, the S/1 FEP shall ensure that each PIU transferred to the host begins in a new host buffer. To accomplish this, the size and number of buffers used by the host access method must be known by the S/1 FEP.

The attention timeout value, attention delay value, number of pad bytes, size and number of buffer units allocated by the access method shall be specified by the customer during VTAM/PU4 Host-to-Host Application customization and passed in the XID data during the channel contact sequence. Note that a non-zero bad byte count in the XID data will cause the XID data to be rejected by the S/1 FEP channel support.

A S/1 FEP shall support up to two channel attached data hosts. Each data host must be connected to the S/1 FEP with a separate IBM Jaybird/Bluebird Channel Attachment set. A data host may be connected to multiple S/1 FEPs. A data host may not have multiple connections to the same S/1 FEP.

FEP/Native I/O Channel Attach for X.25 Support

The X.25 interface to the TCP/IP program in the host processor shall be a native I/O channel interface. The ARPANET Control Program will use the EXCP facility of MVS I/O to communicate with the FEP and the VM/TCP/IP program will use native VM I/O to communicate with the FEP. The use of the I/O channel(s) and the definitions of new channel commands shall be dictated by the host-to-FEP design and shall be consistent with the 370 channel attach architecture.

FEP/IMP Interface

The interface to the DDN Interface Message Processor (IMP) is an RS449 Type SR physical interface (ISO level 1). The link level protocol shall be HDLC (ISO level 2). The packet level shall be X.25 (ISO level 3a) along with the Internet Protocol (IP) (ISO level 3b). The transport protocol shall be the Transmission Control Protocol (TCO) (ISO level 4).

The specifications used for the implementation of these protocols are:

| 1. RS449 Type SR | MIL-188-114 |
| 2. HDLC | FIPS 100 - FED STD 1041 |
| 3. X.25 | DDN X.25 HOST INTERFACE SPECIFICATION |
| 4. IP | MIL-STD-1777 |
| 5. TCP | MIL-STD-1778 |

The IMP interface attachment maintains current status and historical counts such as number of packets sent, number of packets received, total bytes sent, totally bytes received, the number of re-transmissions received, and the number of re-transmissions requested. This data shall be made available to the S/1 resident DDN IMP Support function upon request.

The DDN IMP Support function through the IMP interface attachment provides both a TCP interface and an X.25 interface to the S/1 FEP application. The DDN IMP Support function shall be able to support multiple physical IMP interface attachments to a single or multiple IMPs.

The IMP interface support package is designed such that all the FEP resident application can share the same physical IMP interface. (i.e. The FEP resident PU4, PU2, and X.25 applications will be able to access the outboard TCP/X.25 services of a single physical IMP attachment card.)

The S/1 resident TCP/X.25 support package is designed such that the upper level S/1 resident applications requiring TCP services have no cognizance of the actual number of underlying physical IMP attachment cards. The TCP/X.25 support package must provide for some level of load balancing when processing outbound connections requests.

The TCP support package provides an optional record mode interface for supporting the transmission of SNA PIUs. This optional TCP PIU service will be selected by the requesting application at TCP OPEN time. The TCP support service will provide to the initiator of the TCP receive operation, the exact data block (PIU) which was supplied to the TCP support service at the other end of the connection on the TCP send operation. It will be the responsibility of the upper level TCP applications to insure that the record service option is selected at both the sending and receiving ends of the TCP connections. Any TCP OPEN ACTIVE connection request with the record option should not be connected to a TCP OPEN PASSIVE or ACTIVE request which has not selected the record option.

The TCP support package provides for the use of 'logical addressing' for establishing TCP connections to remote DDN hosts. The TCP support package shall provide a name conversion service so that a S/1 resident application may convert a long character name for a DDN host or a dotted decimal name for a DDN host to the 32 bit binary IP address required by the other TCP services.

The TCP/X.25 support package supports the generation of the appropriate SNA ALERT messages on any hard failures detected by the attachment card or the S/1 support package and on any other significant changes in status such as loss of carrier or excessive re-transmissions.

DDN/SNA Remote Access Facility (RAF)

The S/1 which provides the concentrator functions for down stream asynchronous and synchronous terminals and interfaces these terminals with the Defense Data Network is referred to as DDN/SNA Remote Access Facility (RAF) shown in FIG. 32.

Provided the TCP/IP envelope services for passing SNA FID2 PIUs between the DDN/SNA RAF and a DDN/SNA FEP.

Provide the primary SNA support functions for the RAF resident PU2s and the down stream PU2s.

Provide locally attached terminal access to the RAF resident DDN Upper Level Protocols TELENET, FTP, and SMTP.

Provide user 'mail box' services for local users having access to RAF attached terminals.

Provide down stream SNA 3270 terminals access to any MVS/VTAM application on an IBM host on the Defense Data Network which is front ended with a DDN/SNA FEP.

Provide access to RAF resident Logical Units such as printers by MVS/VTAM applications at IBM hosts on the Defense Data Network that are front ended with DDN/SNA FEPs.

Provide support for the centralized control of the S/1 RAF from a remote network control host.

DDN/SNA RAF Interfaces

RAF/SNA PU2 Interface. The RAF shown in FIG. 32 supports down stream SNA PU2s attached with RS232C attachments running SDLC in normal response mode. The PU2s to be supported shall be SNA 3274 models 51C/61C or IBM PCs which emulate a remote SNA 3274 with one or more defined LU2s (windows). The RAF shall be the primary station on the SDLC link. The SDLC link to an SNA 3274 shall be point-to-point. The PCs emulating 3274 may be multi-dropped with up to four terminals supported on a given SDLC line. The RAF shall support inbound switched connections for the IBM PC (i.e. a terminal user may dial into an SDLC port attached to the RAF). Outbound switched connections will not be supported (i.e. the RAF will not initiate a switched connection to a terminal.)

The configurations supported are:

1. In a switched environment, the RAF supports 32 dial-in lines (auto answer). This configuration will require eight SDLC attachment cards.

The auto answer (dial-in) support is limited to fixed configurations (i.e. the RAF must be preconfigured with respect to the characteristics of the dial in terminal/cluster.) All down stream terminals may be configured identically such as a PU2 with one LU2 display and one LU1 printer. In which case, any terminal/cluster would be able to dial into any RAF auto answer port. If dial-in support for clusters of various configurations is required, each unique cluster must have a dedicated dial-in port which can be preconfigured to the desired configuration. Cluster definitions determined by XID data during the dial-in process will not be supported.

2. In a multi-drop configuration, the RAF supports 16 multi-drop lines with four terminals attached to each line. This configuration will support 64 terminals users and require four SDLC attachment cards.

3. In an SNA 3274 configuration, the RAF supports eight down stream SNA 3274s with eight 3270 terminals on each 3274. This configuration will require two SDLC attachment cards.

The above configurations can be mixed as long as the aggregate number of terminals configured does not exceed 64.

The PU2 interface attachment maintains current status and historical counts such as number of I frames sent, number of I frames received, total bytes sent, total bytes received, the number of RRs sent, the number of RRs received, retransmissions received and the number of retransmissions requested. This data shall be made available to the S/1 application upon request.

RAF/IMP Interface

The interface to the DDN Interface Message Processor (IMP) is an RS449 Type SR physical interface (ISO level 1). The link level protocol shall be HDLC (ISO level 2). The packet level shall be X.25 (ISO level 3a) along with the Internet Protocol (IP) (ISO level 3b). The transport protocol shall be the Transmission Control Protocol (TCO) (ISO level 4).

The specifications used for the implementation of these protocols are:

| 1. RS449 Type SR | MIL-188-114 |
| 2. HDLC | FIPS 100 - FED STD 1041 |
| 3. X.25 | DDN X.25 HOST INTERFACE SPECIFICATION |
| 4. IP | MIL-STD-1777 |
| 5. TCP | MIL-STD-1778 |

The IMP interface attachment maintains current status and historical counts such as number of packets sent, number of packets received, total bytes sent, totally bytes received, the number of re-transmissions received, and the number of re-transmissions requested. This data shall be made available to the S/1 resident DDN IMP Support function upon request.

The DDN IMP Support function through the IMP interface attachment provides both a TCP interface and an X.25 interface to the S/1 FEP application. The DDN IMP Support function shall be able to support multiple physical IMP interface attachments to a single or multiple IMPs.

The IMP interface support package is designed such that all the FEP resident application can share the same physical IMP interface. (i.e. The FEP resident PU4, PU2, and X.25 applications will be able to access the outboard TCP/X.25 services of a single physical IMP attachment card.)

The S/1 resident TCP/X.25 support package is designed such that the upper level S/1 resident applications requiring TCP services have no cognizance of the actual number of underlying physical IMP attachment cards. The TCP/X.25 support package must provide for some level of load balancing when processing outbound connections requests.

The TCP support package provides an optional record mode interface for supporting the transmission of SNA PIUs. This optional TCP PIU service will be selected by the requesting application at TCP OPEN time. The TCP support service will provide to the initiator of the TCP receive operation, the exact data block (PIU) which was supplied to the TCP support service at the other end of the connection on the TCP send operation. It will be the responsibility of the upper level TCP applications to insure that the record service option is selected at both the sending and receiving ends of the TCP connections. Any TCP OPEN ACTIVE connection request with the record option should not be connected to a TCP OPEN PASSIVE or ACTIVE request which has not selected the record option.

The TCP support package provides for the use of 'logical addressing' for establishing TCP connections to remote DDN hosts. The TCP support package shall provide a name conversion service so that a S/1 resident application may convert a long character name for a DDN host or a dotted decimal name for a DDN host to the 32 bit binary IP address required by the other TCP services.

The TCP/X.25 support package supports the generation of the appropriate SNA ALERT messages on any hard failures detected by the attachment card or the S/1 support package and on any other significant changes in status such as loss of carrier or excessive re-transmissions.

RAF Asynchronous Terminal Interface

The RAF supports locally attached asynchronous ASCII block mode terminals. The asynchronous ASCII terminal interface shall be the standard commercial terminal to S/1 interface(s) which are supported by commercial attachment cards and EDX device handlers. The RAF asynchronous terminal support shall be limited to DDN User TELNET and DDN File Transfer Protocol (FTP).

DDN/SNA Network Control Front End Processor (NCF)

The Network Control Front End Processor (NCF) of FIG. 33 is a specialized S/1 which provides the interface between an IBM MVS/VTAM host running the NCFF, NPDA, HCF, and DSX program products and DDN/SNA FEPs and DDN/SNA RAFs attached to the Defense Data Network. The primary functions provided by the Network Control FEP are:

Provide the connection point services for passing RECFMS/NMVT PIU message generated by DDN/SNA FEPs and DDN/SNA RAFs t the host resident NCCF/NPDA products for network problem determination.

Provide access to the RAF and FEP resident Logical Unit which is subordinate to the Remote Manager for support of the remote operator facility.

Provide access to the RAF and FEP resident Logical Unit which is subordinate to the Remote Manager for support of the remote operator facility.

The network control functions for the S/1 NCF is only supported from the logically attached S/1 operator console. Since the NCF provides the network control interface to all FEPs and RAFs within the network, a recursive requirement would be created if one were to require remote network control support on the NCF. Since this creates another level of complexity and since the NCF will be physically located at the network control host installation, no significant loss of capability is incurred by requiring the network control operator to use the locally attached S/1 NCF operator console.

DDN/SNA NCF Interfaces

NCF/SNA PU2 Interface. The NCF appears to the host processor as multiple NSA PU2s. The NCF accepts and processes ACTIVATE PHYSICAL UNIT and DEACTIVATE PHYSICAL UNIT PIUs on the SSCP-PU session. When an DEACTIVATE PHYSICAL UNIT PIU is received, the NCF terminates all sessions and connections associated with the LUs of the PU being deactivated, deactivate all associated LUs and recover all assigned resources. A minimum of eight PU2s shall be supported by a single NCF. ACTIVATE PHYSICAL UNIT (ERP) will not be supported.

The LUs for which a host application can initiate a session, (VTAM OPNDST ACQUIRE), are those LUs which define RAF/FEP attached logical units for HCF/HOF and DSX/RELAY sessions controlled by the RAF/FEP resident Remote Manager (RM) function. For each RAF/FEP attached logical unit to which a host based application must communicate, a unique LU must be defined to the host resident VTAM subsystem. The LU definition must comply with the session protocols supported by the RAF/FEP based Remote Manager support package. Within the NCF each LU shall be associated with the appropriate RAF/FEP based Remote Manager LU by defining the DDN network address, the RAF/FEP DDN host address, and the unique TCP port address defined for the Remote Manager LU. This address will be used by the NCF to establish the DDN/TCP connection when the SNA BIND PIU is received from the VTAM host. The NCF shall respond to VTAM initiated ACTIVE LOGICAL UNIT PIUs for this class of LUs with a positive response and a control vector indicating that the LU is available (power-on). ACTIVATE LOGICAL UNIT (ERP) shall be treated as an ACTIVATE LOGICAL UNIT (COLD).

NCF/IMP Interface

The interface to the DDN Interface Message Processor (IMP) is an RS449 Type SR physical interface (ISO level 1). The link level protocol shall be HDLC (ISO level 2). The packet level shall be X.25 (ISO level 3a) along with the Internet Protocol (IP) (ISO level 3b). The transport protocol shall be the Transmission Control Protocol (TCO) (ISO level 4).

The specifications used for the implementation of these protocols are:

| | |
|---|---|
| 1. RS449 Type SR | MIL-188-114 |
| 2. HDLC | FIPS 100 - FED STD 1041 |
| 3. X.25 | DDN X.25 HOST INTERFACE SPECIFICATION |
| 4. IP | MIL-STD-1777 |
| 5. TCP | MIL-STD-1778 |

The IMP interface attachment maintains current status and historical counts such as number of packets sent, number of packets received, total bytes sent, totally bytes received, the number of re-transmissions received, and the number of re-transmissions requested. This data shall be made available to the S/1 resident DDN IMP Support function upon request.

The DDN IMP Support function through the IMP interface attachment provides both a TCP interface and an X.25 interface to the S/1 FEP application. The DDN IMP Support function shall be able to support multiple physical IMP interface attachments to a single or multiple IMPs.

The IMP interface support package is designed such that all the FEP resident application can share the same physical IMP interface. (i.e. The FEP resident PU4, PU2, and X.25 applications will be able to access the outboard TCP/X.25 services of a single physical IMP attachment card.)

The S/1 resident TCP/X.25 support package is designed such that the upper level S/1 resident applications requiring TCP services have no cognizance of the actual number of underlying physical IMP attachment cards. The TCP/X.25 support package must provide for some level of load balancing when processing outbound connections requests.

The TCP support package provides an optional record mode interface for supporting the transmission of SNA PIUs. This optional TCP PIU service will be selected by the requesting application at TCP OPEN time. The TCP support service will provide to the initiator of the TCP receive operation, the exact data block (PIU) which was supplied to the TCP support service at the other end of the connection on the TCP send operation. It will be the responsibility of the upper level TCP applications to insure that the record service option is selected at both the sending and receiving ends of the TCP connections. Any TCP OPEN ACTIVE connection request with the record option should not be connected to a TCP OPEN PASSIVE or ACTIVE request which has not selected the record option.

The TCP support package provides for the use of 'logical addressing' for establishing TCP connections to remote DDN hosts. The TCP support package shall provide a name conversion service so that a S/1 resident application may convert a long character name for a DDN host or a dotted decimal name for a DDN host to the 32 bit binary IP address required by the other TCP services.

The TCP/X.25 support package supports the generation of the appropriate SNA ALERT messages on any hard failures detected by the attachment card or the S/1 support package and on any other significant changes in status such as loss of carrier or excessive re-transmissions.

Additional Features of the Invention

The invention handles both the local SNA user and the remote SNA user. It allows PU4 traffic (Host-to-Host traffic), PU2 traffic (Terminal-to-Host traffic), and Network Control traffic to flow over the DDN. The system also allows the user to build their system elements (code and tables) at one central site and distribute them over the network.

The system is comprised of hosts, Network Control Hosts (NCH), Front End Processors (FEP), Remote Access Facilities (RAF), and Network Control FEPs (NCFs). The hosts are System 370 (S/370) architecture machines that can run the Multiple Virtual Storage (MVS) operating system or the Virtual Machine (VM) operating system. The FEPs and NCFs are channel attached Series/1 running the Event Driven Executive (EDX) operating system. The RAFs are also Series/1 running the EDX operating system. They are directly attached to the network using an X.25 interface. The Series/1 was chosen back in 1985 because of availability of existing network control products and its open architecture that enabled co-processor cards to be added to the machine. The RAF can handle up to 64 downstream SDLC terminals. Any of these terminals can connect to any SNA host defined in the network. The FEPs can handle up to 128 terminal sessions per PU2 attachment card, and up to 8 attachment cards. The FEP can also handle up to two channel-attached hosts for PU4 traffic. A PU4 environment can have over 250 subarea address, which means there can be more than 150 hosts in a PU4 environment. The entire network can have as many as 1,000 FEPs, RAFs, or NCFs components.

The system has been tested in an environment using the following commercial products: MVS, Time Sharing Option (TSO), Netview, Distribution Systems Executive (DSX), EDX, $SNA, RM, 4381 host, 4956 Series/1, 3274 control unit, and 3278 terminal.

System Generation and Distribution

The system generation and distribution function is referred to as Sysgen. FIG. 16 visualizes a DDN/SNA system as it applies to the overview of Sysgen.

The objectives of Sysgen are to provide installation, node customizing and distribution, and maintenance capabilities on the Master Network Control Host (MNCH) for the DDN/SNA system.

Installation

The installation package contains everything required to install the DDN/SNA system. The installation package includes:

A set of starter diskettes for initially installing Series/1 nodes with documentation on how to install the starter system. Starter diskettes are used when new Series/1 Nodes are being added to the DDN/SNA system. These diskettes contain:

An executable EDX nucleus and EDX utilities, and

Critical path components that enable the node to communicate with the MNCH. (Critical path components are those components required to establish communications with the MNCH over the DDN.)

The same starter diskette set works for any Series/1 node including the NCF that is channel-attached to the MNCH. For that one NCF, assuming that all of the necessary physical units (PUs) and logical units (LUs) have been defined correctly to Virtual Telecommunications Access Method (VTAM), DSX, $SNA, and RM, the installer is able to download a previously DDN/SNA system generated version of the MNCH NCF EDX, programs, and tables. From that point the installer is able to transmit software resources to any Series/1 node in the DDN/SNA system that has been system generated. After the transmission, the Series/1 node is configured with the $SNA and TCP glue that allows the NCF to have DSX-to-RM LU-to-LU sessions via the DDN.

For a new Series/1 node to become operational, the site operator must allocate all datasets locally on the Series/1 as per instructions contained in documentation distributed with the diskettes.

The site operator follows a script that has instructions on:

Creating the required EDX volumes and data sets,
Installing EDX on the hard disk,
Copying data sets from the diskettes to the Series/1 hard disk, and
Initial Program Loading (IPLing) the Series/1.

At this point, the operator at the new Series/1 node calls, on the telephone, the operator at the MNCH to say that the Series/1 node is ready to receive a software load. The MNCH operator can then distribute a software load to the Series/1 node via a DSX-to-RM LU-to-LU session and remotely IPL the node to use the new DDN/SNA system generated software load. This implies that the Series/1 node was previously generated into the DDN/SNA system, and that the resources required for that node are available in the DSX resource repository at the MNCH and ready for distribution.

Tapes of DDN/SNA Sysgen software and related macros.

VSAM tapes of the DDN/SNA baseline DSX resource repository.

To install the user's MNCH site, programs and tables are distributed from an IBM development site. The MNCH is the NCH on which the user runs Sysgen, and from which all Sysgen output is distributed to the such that they have a remote primary NCF and, optionally, a remote secondary NCF to which alerts are reported by the NCF's network control code. The exception is when only one NCF resides in a DDN/SNA system. In that case, the NCF is configured as its own NCF. Using the SET command, each NCF assures that all alerts created locally appear on the local NCF terminal, but the alert typically is sent to a remote NCF for alert handling and corrective measures.

If two NCFs are channel attached to the same NCH, those NCFs can take on both primary and secondary NCF roles for sets of Series/1 nodes in the DDN/SNA system. The same holds true for two logical NCFs that are attached to the same NCH, or for one logical NCF and one physical NCF that are attached to the same NCH.

Each time new DDN/SNA software is release it is identified by a version number (1 through 99) and a modification level (0 through 99). Two pieces of software that have both the release's version and modification numbers imbedded within them—the Sysgen Version and Modification macro and the Series/1 Node Initialization software—must always be distributed with a release. This provides a means for maintaining the integrity of the user's software configuration management at the MNCH and at each Series/1 node.

Sysgen Version and Modification Macro

This macro is placed by the installer into the MACLIB that contains all of the Sysgen macros. It contains the new version and modification numbers. Sysgen uses this macro to verify that the installer is running Sysgen against the version and modification level of DDN/SNA software that is specified on the Sysgen source statement in the user provided Phase I input file.

Series/1 Node Initialization Software

The Initialization software of each release includes two sets of version and modification numbers: the new software version and modification numbers, and the table version and modification compatibility level. The new software version and modification numbers are put into the Initialization Parameter File (IPF) table by Sysgen. The table version and modification compatibility level, which indicates the oldest level of tables with which the new software release is compatible, is hardcoded in the Initialization software.

The user needs to run Sysgen to distribute the new software release to each node. FIG. 17 shows the elements of a DDN/SNA system that are customized by Sysgen.

Node customizing takes place in three phases. The code for each of the phases are run on the MNCH by the user. FIGS. 18, 19 and 20 are overview descriptions of each phase. Each description is preceded by a processing overview figure for that phase.

Phase I Overview (FIG. 18)

The Phase I code verifies for consistency all definitions provided in the Phase I input file, analyzes the connectivity defined across the system, and, for each node defined in the user-provided phase I input file, outputs datasets containing intermediate Sysgen macro statements that reflect the network connectivity. Phase I resolves all internodal relationships as defined in the Phase I input file, and isolates all required information for each node into separate data sets. These Phase I output files contain intermediate sysgen macro statements that, when assembled in Phase II, generate tables that are unique to each node and that reflects the connectivity of the network.

Phase I creates as output six Partitioned Datasets (PDSs) and three Sequential Datasets (SDs).

Each member of the PDSs contain definitions for a specific Series/1 node or, in the case of VTAM statements, for a specific SNA host in the DDN/SNA system.

The user distributes, via DSX, the VTAM sysgen statement data sets to the SNA hosts for the VTAM modifications reflecting the DDN/SNA Sysgen. They are not used in Phase II or Phase III. All of the other datasets generated in Phase I are used as inputs to Phase II.

Phase I runs as an independent job on an MVS system.

Phase II Overview (FIG. 19)

The Phase II code builds tables. It processes intermediate Sysgen macro statements from the Node Sysgen Statement PDS, PU4 FEP Sysgen Statement PDS, and PU4 PATH Sysgen Statement PDS, which were all generated by Phase I. Phase II generates all of the tables that can be customized and itemizes all programs, both EDX and application programs, required for each Series/1 node. An itemized list of resources (that is EDX load modules, program load modules, and tables) is generated for each node. These lists, one for each Series/1, are referred to as Node Resource Distribution Lists (NRD Lists or NRDLs).

The Master Series/1 List, output from Phase I (See FIG. 17), is used to create the working Series/1 list that includes only those nodes that the installer wishes to generate on a particular run of Phase II and Phase III. This enables the installer to bring up a small number of Series/1 Nodes at a time.

Essentially, via Phase II, the user can run successive partial generations against the same Phase I output. The granularity of partial generations in Phase II is such that the partial generation granule shall be a Series/1 node found in the master Series/1 list created by Phase I, and the set of all of these granules makes up the working Series/1 List for a given run of Phase II. This assumes that nodes not processed on the current or previous runs of Phase II would be included in later runs. Phase II for "n" nodes is more time-consuming than Phase I for "n" nodes due to a multitude of assembler runs directly related to the number of nodes generated on a given Phase II run.

The tables created for a Series/1 node generated on a given run of Phase II contains all of the information required to describe its topology. The topology relates to the entire network as defined in the Phase I input file as if all of the other Series/1 nodes had been generated along with this Series/1 node, including all PU4 and PU2 application related control information.

The Job Control Language (JCL) for Phase II creates a job that automatically runs Phase III as a separate set of job steps. The JCL is such that the Phase III job steps run only if Phase II completes successfully.

Phase III Overview (FIG. 20)

The Phase III code transfers the programs and tables itemized in the NRDLs into the user's DDN/SNA baseline DSX resource repository. It then creates a DSX transmission plan and the JCL needed to distribute the files, which include all of the executable load modules and tables required to make the given Series/1 Nodes operations from the DSX resource repository to the targeted subset of Series/1 Nodes.

After Phase III finishes, the installer completes the DSX transmission plan created by Phase III. The installer adds the scheduling information designing the transmission date and time of DSX resources for the nodes in the plans.

Phase III creates three groups of resources in DSX for each Series/1 node in the working Series/1 List: programs, tables, and the EDX nucleus and utilities. The groups consist of list items from members of the NRD List PDS passed from Phase III. The installer can specify in the Sysgen statement that is required as a special global statement in the user-provided Phase I input file, what type of data to distribute. That is, if only tables have been changed, redistributing versions of programs and EDX that already exist on the node would be unnecessary. This decreases the transmission time for small generations and gives the installer more flexibility. However, if the installer adds a node to the system, all resources must be distributed to that node, even though only tables are being distributed to nodes that had previously been installed.

Distributing resources in this manner requires the following;

A CLIST is sent to a Series/1 node before any DSX resources are sent. The DSX 'INITIATE FUNCTION' is used to execute the CLIST at the Series/1 node. The CLIST automatically creates a new EDX volume and copy the entire contents of the EDX volume containing the most current software load to the newly created EDX volume. Then all resources that are to be sent to the node are sent to the new volume. These resources replaces older versions of the resource with the same names, but leaves those resources on the volume that are not updated by DSX. In this way, a new software load is constructed of new and old resources.

Even though some of the resources might not need to be distributed to a node for a given generation, those resources must still be assigned to the node in DSX's resource repository, associating them with the software load having the volume number of the current Sysgen. This implies that some DSX resources, for instance all EDX resources, assigned to an Series/1 node can be associated with more than one software load because these resources did not change in subsequent sysgen runs. This association takes place by defining a new group of DSX resources that contain one or more resources that are not newly created by Sysgen. The DSX resource group is a new set of resources, not necessarily a set of new resources.

Each software load is contained on its own unique EDX volume at the node. The name of an EDX volume associated with a specific software load is used in DSX as a part of the group names of the DSX resource groups that make up the software load, that is the group names have the EDX volume name imbedded in them. Note that the actual DSX resource names (names at host) may differ from their name at the Series/1 node. The difference is only in the VOLUME field of the resource name. When the volume name indicated by the DSX resource group name differs from the volume name field of a resource in that group, then the name at the node for that resource contains the volume name indicated by the resource group name from which it came, rather than the volume name the resource has at the host. This situation arises when a resource already exists, and satisfies a newly sysgen software load's requirements, that is an old resource is included in a new software load. In this case the volume field of the resource's name at host always reflect the EDX volume name of the software load for which it was first created.

Fast Paths Through Sysgen

The installer can specify that a fast path through Sysgen. There are three scenarios that require minor processing by Sysgen. In each case, assembly of the Phase I input file and table build, the bulk of Phase I and Phase II processing, is not required and, in fact, would only cause significant delay in accomplishing each of the tasks. Therefore, a separate JCL file is set up to run Sysgen in a fast path mode, which bypasses the time consuming Phase I and Phase II processing and executes specific utility programs that perform the required functions on behalf of Sysgen. These three scenarios are:

1. Create and distribute host name server tables only,
2. Create and distribute user profile and password files only, and
3. Distribute programs without performing a table build.

In each of these three scenarios it is assumed that: Sysgen has previously been run in its entirety for all nodes in the DDN/SNA system, the master Series/1 list dataset exists, and in the case of just distributing programs, the programs have already been moved into DSX along with distributed resource directory entries.

Maintenance

Maintenance of DDN/SNA resources is accomplished via DSX Version 3 Release 2. DSX maintains records and the status of all resources assigned to a given node in the network. Sysgen, via DSX batch facilities, assign a set of DSX resources to each Series/1 node that completes Phase III of Sysgen. The set of resources assigned to a Series/1 node for a given generation is the complete set of programs and tables needed by that node to be operational relative to that generation. DSX allows batch facilities to define nodes and resources.

Multiple software load sets allowed for a given node to provide chained backup of software loads at the Series/1 node. This makes it necessary for Sysgen and Configuration Management to maintain old versions of resource set assignments for Series/1 nodes from previous runs of Sysgen, rather than automatically replacing or deleting versions and modification levels from the DSX resource repository on the MNCH.

Because user commands are available for deleting obsolete software loads from the Series/1 nodes, it is equally necessary for the system administrator to be able to delete and archive obsolete software loads from the DSX resource repository. This is done by using the DSX batch facility. The user must provide his own archiving methods.

Host-to-Host

This section describes the PU4 Host-to-Host Application. FIG. 21 provides an overview of the DDN/SNA system as it relates to the PU4 Host-to-Host Application. The DDN/SNA system consists of two or more VTAM data hosts, each with a Series/1 FEP connecting them to the DDN, and a Network Control subsystem (the Network Control Host and Network Control Series/1 FEP). Each VTAM data host and Series/1 FEP is assigned a unique identification, called a subarea address, between 1 and 255. The PU4 Host-to-Host Application resides in the Series/1 FEP and routes Path Information Units (PIUs) from one VTAM data host to another over logical connections called Transmission Groups (TGs).

A FEP-to-host TG is implemented using a 370 channel interface. One and only one TG can be defined for each 370 channel attachment card on a Series/1 FEP, and it is always identified as TG1. A Series/1 FEP can contain up to two channel attachment cards.

A FEP-to-FEP TG is implemented using a logical connection through the DDN. Many TGs can be defined for each DDN attachment card on a Series/1 FEP. Each TG can be identified by a TG number between 1 and 255 and need only be unique between any two subareas in the network. The PU4Host-to-Host application can handle up to eight DDN attachment cards.

The term PU4 Host-to-Host Application, as used here, includes the Path Control, the Channel Support, and the Network Control Support Services functions. The following four subsections provide:

1. an overview of the major functions that constitute the PU4 Host-to-Host Applications and a layout of the partitions boundaries used by these functions;

2. the buffer management, queue management and major queues used by these functions;

3. the flow of data through the functions; and 4. the PU4 Host-to-Host application error processing philosophy.

Note that "inbound" and "outbound," as used throughout the PU4 Host-to-Host application subsections, is with respect to the FEP (that is into the FEP and out of the FEP respectively). Note also that the term "TG" is generally used only by the Path Control function; otherwise "channel" or "DDN connection" is used. The term "FEP-to-host TG" is synonymous with "channel TG" or "channel" and the term "FEP-to-FEP TG" is synonymous with "DDN TG" or "DDN connection."

Function and Partition Boundaries

This subsection describes the four main functions of the Host-to-Host application. It explains the function's main purpose and show in what Series/1 partition the code resides.

PU4 Channel I/O

Three partitions are shown in FIG. 22. The first partition, from left to right, contains the PU4 Channel I/O function, which interfaces with the Basic Channel Access Method (BCAM) to communicate with one host over one PU4 channel. The PU4 Channel I/O function and BCAM, together, perform the data link control function and as such, respond to all channel commands as a Network Control Program (NCP) 3725 Communications Controller. BCAM resides in one of the EDX supervisor partitions. The PU4 Channel I/O function:

Processes contact, discontact, and error sequences and informs Path Control when the channel operative-to-inoperative state changes, Receives PIUs from the host and passes them onto Path Control for routing to their destination, and Receives PIUs from Path Control and transmits them to the final destination host.

If there is a second channel attachment, then there is another partition identical to the first which processes channel commands for that channel. DDN I/O:

The last partition shown in FIG. 22 primarily contains the DDN I/O function, which interfaces with the DDN Access Method (DNAM) to communicate with the remote PU4 FEPs on the DDN. The DDN I/O function and DNAM, together, perform the data link control function for the DDN interface. DNAM resides in one of the EDX supervisor partitions. The DDN I/O function:

Processes open, close, and error sequences and informs Path Control when a DDN connection operative-to-inoperative state changes. For each remote PU4 FEP, one or more unique DDN connections are established by the DDN I/O code.

Receives PIUs from remote PU4 FEPs via the DDN connections and passes them to Path Control for routing to their final destination.

Receives PIUs from Path Control and transmits them to the remote PU4 FEPs via the DDN connections. It is the remote PU4 FEP's responsibility then to forward the PIUs to the final host destination.

Path control

The middle partition shown in FIG. 22 contains the Path Control and Network Control Services functions. The Path Control function:

Validates, prioritizes, traces, and routes PIUs;

Monitors the Virtual Routes (VRs) for congestion and paces VRs; and

Manages and maintains the status of the Explicit Routes (ERs) and broadcasts this information to all affected nodes as required.

Path Control resides primarily in one partition but a small part of it resides in each of the other partitions. The part that resides in the other partitions is the code generated by the macros to validate PIUs, to pass PIUs to and from Path Control, to inform Path Control of a change in the status of a TG, and to obtain transmission group information from Path Control.

Network Control Services

Network Control Services are utility functions that would normally have been accomplished by the Physical Unit Services function in a normal SNA node. They are invoked by the Network Control Operator and include:

Activating and deactivating a trace of a TG;

Displaying status of a TG and its associated ERs;

Collecting and displaying buffer utilization statistics; and

Activating and deactivating a FEP-to-FEP TG. Note that FEP-to-host TGs may not be activated or deactivated by the network control operator.

Buffer Management, Queue Management and Major Queues

The Buffer Management Facility and the Queue Management Facility are used by all programs requiring access to PIUs. A typical scenario for using of the buffer management and queue management facilities follows:

The first program that requires a buffer for a PIU issues a #GETBUF and, when finished with it, issues a #SAVEBUF followed by a FSPUTQ to pass it to another program in another partition.

The second program issues an FSGETQ followed by a #RSTRBUF to gain access to the PIU buffer. When finished with the PIU buffer, the program issues a #SAVEBUF, followed by a FSPUTQ to pass it on to still another program.

The third program issues an FSGETQ followed by a #RSTRBUF and when finished with the PIU buffer, issues a #FREEBUF to release the buffer back to the free buffer pool.

All queues used for passing PIU buffers use the same queue class and are first-in-first-out queues. Currently, four primary types of queues are defined to bridge the functions in each partition, as shown in FIG. 22. Other queues defined for use within a particular function are not described here (for example, PU4 Channel I/O's Intermediate and Hold queues and Path Control's TG Work queue). The four primary types of queues are logically part of Path Control but physically can be located in any partition.

PU4 Receive Queue

There is one PU4 Receive Queue. Path Control adds all PIUs received over all FEP-to-host and FEP-to-FEP TGs to this queue. Path Control dequeues PIUs one at a time and, based on routing information, queues them to one of the three other queues.

PU4 Channel Transmit Queue

There is one PU4 Channel Transmit Queue for each channel attachment card and a maximum of two cards. Each transmit queue comprises four physical queues, one for each of the four SNA transmission priorities. Path Control adds all PIUs destined for a local attached host via a 370 channel attachment card to the associated transmit queue. Upon request, Path Control dequeues PIUs from a transmit queue and transmits them to the host by the PU4 Channel I/O function. A channel attachment card and its transmit queue serves one and only one FEP-to-host TG.

PU4 DDN Transmit Queue

There is one PU4 DDN Transmit queue for each DDN attachment card. Each transmit queue comprises four physical queues, one of each of the four SNA transmission priorities. Path Control adds all PIUs destined for remote hosts to the associated transmit queue via a DDN attachment card. Upon request, Path Control dequeues PIUs from a transmit queue and transmits them over the DDN by the DDN I/O function. A DDN attachment card and its transmit queue can serve multiple FEP-to-FEP TGs. DNAM associates a FEP-to-FEP TG to an attachment card when the DDN connection is established.

ER Manager Process Queue

Path Control adds all PIUs destined for this PU4 FEP to the ER Manager Process Queue. Path Control processes these PIUs and creates additional PIUs as required to maintain the integrity of the ERs.

Data Flows

FIG. 23 shows the general data flow through the PU4 Host-to-Host application. The numbers under the arrows in the figure indicate the steps that are described below.

1. Before PIUs can flow through the network, the TGs must become operative. This takes place upon completing a contact sequence on the FEP-to-host TG and upon completing a TCP OPEN on the FEP-to-FEP TG.

2. By invoking a Path Control macro, the PU4 Channel I/O and DDN I/O functions inform Path Control that a FEP-to-host TG and FEP-to-FEP TG, respectively, is operational.

3. The Path Control function in the Channel I/O or DDN I/O partition enqueues a TG Control Block (TGB) on the ER Manager Process Queue with a request to build an ER Operative PIU. This PIU is destined for the node, host, or PU4 FEP, at the other end of the TG that became operative.

4. The Path Control ER Manager dequeues the PIU. The ER Manager updates the route operative table to reflect any changes in the state of all ERs using this TG. The ER Manager then forwards the PIU, creating additional PIUs if necessary, to adjacent nodes by queueing them to the PR4 Receive Queue.

5. Once a TG is operative, PIUs can begin to flow. A PIU can be received from the local host or the remote PU4 FEP. If from the local host, the PU4 Channel I/O function uses BCAM to receive the PIU. If the PIU is from the remote PU4 FEP, then the DDN I/O function uses DNAM to receive the PIU.

6. The receiving function, PU4 Channel I/O or DDN I/O, passes the PIU to Path Control.

7. The Path Control function, in the Channel I/O or the DDN I/O partition, validates the PIU and queues it to the PU4 Receive Queue.

8. Path Control removes the PIU from the PU4 Receive Queue and based on the Destination Subarea Field (DSAF) and Explicit Route Number (ERN) in the PIU, routed to the proper transmit or process queue. If the PIU is for this subarea, Path Control queues it to the ER Manager Process Queue. Otherwise, Path Control uses the DSAF and ERN to index into the routing tables to determine which outbound TG to use for routing the PIU toward its final destination.

9. When the PU4 Channel I/O or DDN I/O function is ready to send a PIU over a TG, it invokes a Path Control function in its partition that dequeues the PIU from the appropriate transmit queue and passes to the I/O function. If none is available, the Path Control function waits until a PIU is available.

10. The PU4 Channel I/O or DDN I/O function then transmits the PIU to the adjacent node using BCAM or DNAM, respectively, to perform the actual I/O. In the case of the PU4 Channel I/O function, it actually stores the PIUs on an intermediate queue, not shown in the figure, until sufficient PIUs are ready to send to the host. This reduces the number of interrupts to the host.

11. A TG might become inoperative because of a serious error or a controlled deactivate request. The latter takes place upon completing a Discontact sequence on the FEP-to-host TG and upon completing a TCP CLOSE on the FEP-to-FEP TG.

12. The PU4 Channel I/O and DDN I/O function informs Path Control that a FEP-to-host TG and FEP-to-FEP TG, respectively, has become inoperative.

13. The Path Control function, in the Channel I/O or DDN I/O partition, enqueues a TGB on the ER Manager Process Queue with a request to build an ER Inoperative PIU. This PIU is destined for all adjacent nodes, host, or PU4 FEP that are affected by the inoperative TG.

Error Processing

The PU4 Host-to-Host application error processing philosophy is based on the overall DDN/SNA system error processing philosophy. It detects five categories of errors.

Program (Software) Error

The program detecting the "can't happen" condition invokes the System Abend service routine (#ABEND). The first (left most) byte of the abend code passed to the service is the EBCDIC letter assigned to the functional component that is invoking the System Abend service routine. The second byte is the decimal number assigned to the subfunction of the functional component. The third byte identifies the particular call to the System Abend service routine. This third byte is unique for each call to the System Abend service routine. The last byte contains either zero or a return code, if applicable. A return code would apply if a service routine detected the abend condition and reported it to the calling program.

Intermittent Hardware Errors

Intermittent hardware errors, as used here, are errors that can be retried immediately and have a fair chance of success on an immediate retry. If successful, intermittent hardware errors are transparent to any other functions within or outside of this FEP. The PU4 Host-to-Host application can only receive intermittent hardware errors from the BCAM interface for the FEP-to-host TG over the channel. An intermittent error returned by BCAM is retried immediately up to "n" times, where "n" is an equated value determined by the programmer. If unsuccessful after "n" retries, the PU4 Channel I/O function changes the state of the TG to inoperative, closes the channel, issues an alert to notify the network operator of the failure, and processes the intermittent error as a solid error (described below).

Solid Hardware Errors

Solid hardware errors are those that occur during I/O operations and have been retried but failed or cannot be retried. The PU4 Host-to-Host application can receive solid hardware errors only from an EDX read and print statement or from the BCAM interface for a FEP-to-host TG.

The only use of EDX read or print statements are in the Network Control Services. Because these functions are not critical to the system, the program detecting the problem issues an alert and terminates. Solid errors from BCAM are processed as temporary errors (described below). This reduces the need for additional code and allows for the possibility that what appears to be a solid error might really be a temporary error that will go away with time.

Temporary Errors

Temporary errors, as used here, are those errors that are generally unsuccessful if retried immediately, but are generally successful if retried later. Temporary errors can occur within the Series/1 (such as lack of buffers or queue elements), or on a TG (such as no resources available for this DDN connection, a local VTAM data host being down, a node in the DDN being down, or a remote FEP being down). Temporary errors can be detected by the Buffer Management Facility (BMF), the BCAM, the DNAM, or the PU4 Channel I/O using timeouts. The Host-to-Host application processes these errors as follows:

Buffer Management Facility Error Return Codes

The virtual route pacing function minimizes congestion in the FEP and thereby minimizes the possibility of buffer/queue element depletion. Virtual route pacing, however, does not eliminate the possibility of depleting these resources. Therefore we added a slowdown mechanism to the BMF to notify the user program via a return code when buffers/queue elements become scarce. Upon receiving this slowdown notification, the Host-to-Host application programs stops requesting buffers, unless the need is critical, until notified that buffers and queue elements are no longer scarce. The effect of this is that during slowdown, the Channel I/O and DDN I/O functions do not request or accept any more PIUs from other nodes but continues to transmit PIUs to these nodes. Transmitting PIUs frees up buffers and queue elements, which eventually cause the Host-to-Host application programs to leave the slowdown state and allow again for PIUs to be received from other nodes.

The network operator is notified via an alert whenever slowdown is entered or exited.

BCAM and DNAM Return Codes

These temporary errors occur on a TG. They always result in the TG being marked inoperative and the associated channel or connection being closed. The network operator is informed of this error and TG status change via an alert. For a FEP-to-host TG, the Host-to-Host application attempts immediately and every "m" minutes thereafter to reopen the channel and wait for a contact sequence on that channel. For a FEP-to-FEP TG, it attempts immediately and every "m" minutes to reopen the DDN connection. The value "m" is specified by the user at sysgen time. The network operator is notified via an alert if and when the TG again becomes operative.

PU4 Channel I/O Timeouts

These temporary errors, generally caused by a lost event, occur because of a channel error, the host not responding, or a host being re-IPLed. The result is that the TG becomes inoperative but the channel remains open. The PU4 Channel I/O function informs the network operator of the error and TG status change via an alert. A contact sequence from the host makes the inoperative TG operative again.

Configuration Errors

Configuration errors (table inconsistencies) are caused by either: a user providing invalid and/or inconsistent parameters on the Sysgen statements, or program bugs in the Sysgen macros and/or bugs in the operational code.

During execution, the Host-to-Host application program cannot determine which of these caused the error. Therefore, if it is possible that the error could have been introduced by the user at sysgen time and if the error can be isolated to a particular TG, the program enters into a degraded mode (that is the TG will be made permanently inactive). If the configuration error is caused by a program bug or if it cannot be isolated to a TG (that is the error is global and, therefore, is normally detected during NCF. The facilities relationships in FEP, NCP or RAF are pictorially shown in FIGS. 24, 25 and 26.

Configuration Errors

Configuration errors (table inconsistencies) are caused by either: a user providing invalid and/or inconsistent parameters on the Sysgen statements, or program bugs in the Sysgen macros and/or bugs in the operational code.

During execution, the Host-to-Host application program cannot determine which of these caused the error. Therefore, if it is possible that the error could have been introduced by the user at sysgen time and if the error can be isolated to a particular TG, the program enters into a degraded mode (that is the TG will be made permanently inactive). If the configuration error is caused by a program but or if it cannot be isolated to at TG (that is the error is global and, therefore, is normally detected during initialization), then the PU4 program issues an #ABEND. Most configuration errors result in an #ABEND. An example of user parameter errors that does not cause an #ABEND is an invalid DDN network address for a Series/1 FEP. Sysgen cannot completely validate this parameter.

Terminal-to-Host and Network Control

Terminal-to-Host facilities include: Resource Manager, System Wide Operator Facilities (SWOF), SNA Passthru, High Level Interface (HLI) Application Program Interface (API), Logon, Security/Audit, $SNA Data Link Control (DLC) Interface, SNAPS to SNAPS Access Module (AMOD), HLI AMOD, DLC AMOD, Console Services Interface (CSI) Personality Module (PMOD), Transmission Control Interface (TCI) AMOD, Common AMOD, SNAP-LINK AMOD, SNAPS Hardware Module (HMOD), Operator Interface, Console Services, and Channel DLC.

Network Control facilities, include: Channel DLC., SNA Passthru, Resource Manager, FEP and RAF Alert Processor, $SNA TCP Interface, NCF Alert Processor, DLC AMOD, TCI AMOD, HLI AMOD, CSI PMOD, and Console Services.

These facilities along with the SNAPS products make up the FEP, RAF, and NCF. The facilities relationships in FEP, NCP or RAF are pictorially shown in FIGS. 24, 25 and 26.

With FEPs and RAFs, IBM SNA standard products can attach to the DDN using IBM Series/1 processors, which perform the role of communications servers and concentrators. A Series/1 communications server attached to an IBM MVS/VTAM host is called a DDN/SNA FEP and provides multiple PU2 interfaces to VTAM. For downstream PU2s we used a Series/1 communications concentrator called a RAF. This provides a PU5/SSCP facility to the multiple downstream PU2s such as 3270. The FEP/RAF combination interfaces to the DDN and provides the facility for passing SNA PIU data over the DDN media.

For Network Management, the FEP/RAF provides the following capabilities via the standard EDX product—the Remote Manager (RM) in each FEP and RAF.

Problems detected in the Series/1 hardware and EDX software are asynchronously reported to the Network Control Host as SNA ALERT messages via the alert processor.

The Network Communication Control Facility (NCCF) terminal operator can acquire a Host Command Facility (HCF) session with the Host Operator Facility (HOF) in the Series/1.

The relay facility of RM on each FEP and RAF can receive files from the Network Control Host program "DSX."

The standard EDX $SNA product has been modified to replace the SDLC interface with a TCP/IP interface providing the capability to transfer these SNA functions across the DDN media.

All SNA support within a FEP/NCF and RAF is provided by, SNAPS software (SNAP2, SNAP-5, SNAP-LINK, SNAP-THRU). We have ported this code to the 68000 co-processor hardware in the Series/1. Porting consisted of implementing specific interfaces (AMODs).

VTAM sees the FEP as a channel-attached 3274; therefore, SNAP-2 provides the PU2 functions to the channel. In the RAF, SNAP-5 provides the primary PU5 SNA support (SSCP) to downstream PU2 devices attached to the RAF. SNAP-LINK, with the associated SDLC HMODs, provides the DLC layer for communicating with the downstream SNA devices. The SNAPTHRU product provides a passthru function allowing RAF logical units to have SNA sessions with applications on a VTAM host.

We have provided Terminal-to-Host facilities that enable a remote SNA 3270 terminal user attached to a RAF to select and access a VTAM host and establish an SNA session with a host application. The LOGON program, in conjunction with the HLI interfaces to SNAP-5, provide menu-driven services to the user. These services include logon and password authorization via a security/audit program, and user selection of a host system and application. Logon establishes the connection through TCP/IP to the selected host FEP. A successful "bind" from the host, transfers control of the session to the passthru module. The passthru module then provides the interface between SNAPTHRU and TCP/IP. All SNAPS formatted messages are converted to standard SNA PIU messages and transported across the DDN network to the FEP and to the host application. Receipt of an "unbind" transfers control back to the LOGON program, the TCP/IP connection is broken, and the default menu reappears on the user terminal.

The Terminal-to-Host facilities provides host-initiated sessions to establish SNA sessions between the host and RAF Advanced Remote Job Entry (ARJE) functions and Network Control via the $SNA/RM functions. These functions are provided by the passthru functions of SNAPS. Remote job entry capabilities are provided by standard EDX ARJE program, $SNA Version 2, and a $DLC module replacing the $SNA SDLC interface.

The network control elements on a FEP or RAF can generate alert messages to a NCH. These messages are in standard NMVT or RECFMS format and are compatible for processing by NETVIEW. The FEP and RAF generate alerts when errors are detected in all software modules, SNAPS software, and from downstream SNA devices, such as 3274. Downstream SNA alert messages are passed by SNAP-5, through a console services interface PMOD and console services program, directly to an alert processing program that interfaces to TCP/IP and transports the alert message to the NCF host. All other software messages use a common facility of SWOF/SWOP (System Wide Operator Program) to pass these messages to SWOP for processing. SWOP formats the alert into a standard NMVT, logs the message to a common log file, and passes the formatted NMVT to the alert processor. The alert processor establishes the connection through TCP/IP to the alert processor in a NCF connected to the NCF host. If the FEP or RAF cannot make a connection to the primary NCF host an attempt is made to an alternate NCF host. If no connections are possible, then the FEP or RAF queues alert messages to disk for later transmission to the NCH.

The Resource Manager on each FEP, NCF, and RAF synchronizes the loading of all non-critical components and subsystems in a FEP or RAF environment and allows the operator to restart a subsystem via the SWOP interface. Functions performed by the Resource Manager are:

Reading and interpreting a configuration file,

Loading the co-processor programs and Series/1 programs, as specified in the configuration file, Providing the connections and routing between co-processor services/programs and Series/1 programs, Processing errors reported from the co-processor SNAPS programs and sending alert messages to SWOP and the Alert Processor, Maintaining current status of all managed components/subsystems, Requesting co-processor storage dumps, and Reloading a subsystem upon operator request.

DDN Access Method Support

The DNAM provides a set of generic instructions and associated data structures (DNAM API), defined in the EDL and implemented within the EDX operating system, that provide the basic services as defined in the MIL-STD documents for TCP, User Datagram Protocol (UDP), and IP, and X.25. Enhancements to the basic services are provided via additional EDL instructions as well as keyword parameters on the generic instructions.

Specifically, a record mode enhancement was added to preserve message boundaries across byte-oriented TCP connections. Also, we added a connection group enhancement that permits connections with similar characteristics to be grouped together to reduce the total amount of resources required to receive data and to reduce the complexity of the application required to manage the connections. The connection group enhancement also facilitate the flow of data between the DNAM API and the connections in the group. For receiving data, the application can issue a single receive instruction for all connections in the group, relieving the requirement for the application to pre-allocate buffer space for each open connection. For sending data, the completion of a send instruction is influenced by whether the completion should be based upon flow conditions for the group as a whole or for the individual connection. The final enhancement that we added allows the application program to get asynchronous notification or synchronous notification when a DNAM API instruction has completed.

Functionally, DNAM consists of the following components:

The DNAM Initialization task to initialize the DNAM following a system restart.

The DNAM API routine and associated task structures to execute the EDL instructions issued by an application.

The DNAM Administrator task structures to interface to system operators to process commands that capture status, statistical information, and trace data within DNAM and to control the operation of DNAM.

The DNAM utility programs to format a storage dump from a 68000 attachment. The utility also formats and prints status, trace, error and statistical information previously output to a disk data set.

DNAM API

In the DNAM API, we defined a set of generic instructions (OPEN, CLOSE, SEND, RECEIVE, STATUS, and HOSTNAM) and associated data structures (COND and BUFD) using EDL. These EDL instructions and structures provide Series/1 application programs with a way to communicate on the DDN to another application on a foreign host using one of several different protocol layers. To access the DDN at a particular protocol layer, an appropriate prefix is combined with the generic instructions.

The prefixes allowed by the DNAM API are TCP, ADM and DDR. DDR enables a Series/1 application program to send and receive IP datagrams on the DDN using DDN direct services. ADM enables the DNAM Administrative task to control the 68000 attachment microcode, as well as to monitor the attachment for statistical and trace information. TCP enables a Series/1 application program to communicate on the DDN using TCP services. The TCP generic instructions and data structures would be:

TCP OPEN—open a TCP connection,

TCP SEND—send data on a TCP connection,

TCP RECEIVE—receive data on a TCP connection,

TCP CLOSE—close a TCP connection,

TCP STATUS—status of the TCP connection,

TCP HOSTNAM—convert a TCP host name to an Internet address,

TCP COND—TCP connection descriptor, and

TCP BUFD—TCP send and receive buffer descriptor.

To communicate over the DDN to an application on a foreign host, the local application must first issue an OPEN instruction to create a communication connection to the DDN. From the information in the OPEN instruction, the application obtains access to the DDN at a specified protocol layer. After DNAM establishes the connection to the foreign application, the DNAM EDL Instruction Routine provides the services enabling the local application to send and receive data on a full duplex virtual connection. Finally, the DNAM EDL Instruction Routine terminates the connection in an orderly manner when the application executes a CLOSE instruction.

The DNAM EDL Instruction routine returns either synchronous or asynchronous control to the application. On the DNAM EDL instruction, the application specifies which return is desired.

FIG. 27 shows the steps required to process a synchronous instruction from an application program through the DNAM API. The numbers in the figure indicates the steps that are described below:

1. The application program executes a DNAM API EDL instruction specifying synchronous processing.

2. The DNAM Instruction Routine validates the parameters on the instruction, allocates any resources on behalf of the application, transfers, allocates any resources on behalf of the application, transfers the appropriate request to the attachment and now waits until a reply is received from the attachment.

3. When a reply is received from the network, the attachment transfers the reply to the DNAM Inbound Service Task in response to the previous request.

4. Having processed the response by updating control block structures the DNAM Inbound Service Task posts the DNAM Instruction Routine with the results of the request(s).

5. If the attachment card successfully executes all of the appropriate requests or if it encounters a terminating error, then control is returned to the application with a return code describing the results. If other requests are necessary, then steps 2 through 4 are repeated.

FIG. 28 shows the steps required to process an asynchronous instruction from an application program through the DNAM API. The numbers in the figure indicates the steps that are described below.

1. The application program executes a DNAM API EDL instruction specifying asynchronous processing.

2. The DNAM Instruction Routine validates the parameters on the instruction, allocates any resources on behalf of the user application, and transfers the appropriate request to the attachment.

3. Instead of waiting until the DNAM Instruction Routine receives a reply from the attachment card, control is returned to the user application immediately upon the successful transfer of the request to the attachment card. The application can now continue processing until it wants to issue the same DNAM EDL instruction for a second time. At that point, the application must wait for the result of the first DNAM EDL instruction.

4. When the attachment card receives a reply from the network, the attachment card transfers the reply to the DNAM Inbound Service Task in response to the previous request.

5. Having processed the response by updating control block structures, the DNAM Inbound Service Task posts the DNAM Asynchronous Service Task to complete the processing on behalf of the user application.

6. If another request is necessary, then the appropriate request is transferred to the attachment and the DNAM Asynchronous Service Task waits for the next request from the DNAM Inbound Service Task.

7. If all the appropriate requests have been executed by the attachment card successfully or a terminating error is encountered then control is returned to the application with a return code describing the results.

DNAM Administrative Task

The DNAM Administrative Task software provides three DNAM-relevant capabilities. First, the system operator is able to display the status of connections, a group of connections, and DNAM attachments in a detail relevant to the level of the request, such as a singly specified connection display contains more information than a display of all connections. DNAM attachment displays show control parameters and accrued statistics relevant to the protocol layers being provided by the attachment. Second, the user is able to terminate activity on designated connections, groups and attachments. Thirdly, the user is able to extract traces of messages at the various protocol layers on both the Series/1 and on the attachments. FIGS. 29A and 29B show the components of the Series/1 DNAM administrative software. Each box in the diagram represents one task. Each parallelogram represents a queue used to pass messages from one task to another. The large rectangle represents DNAM attachment interface software, as well as the attachment hardware and software.

Error Recovery and Error Processing

The DNAM error recovery and error processing is based on the overall DDN/SNA system error processing philosophy. DNAM detects four categories of errors and the processing for each is described below.

EDL Instruction Error

DNAM returns EDL instruction errors to the user application in the form of return codes. The user application is responsible for the appropriate error recovery. The errors can be separated into five groups:

A temporary situation (error to be retried) that, if retried later, usually complete successfully (that is, buffer shortage), An EDL instruction sequence that is inconsistent with the current state of the communication connection (that is, issuing a read on a connection that does not exist), An invalid or missing input parameter detected during EDL instruction validation, and An invalid EDL instruction parameter that was detected by the communications network (that is, no network path exists to remote host), and A failure beyond the control of the application (that is, a communications network failure) that terminates both the EDL instruction and the communication connection.

DNAM provides only limited parameter validation. Most parameters, such as storage addresses, are used as passed in the instruction. These parameters can cause an addressing exception or other Series/1 programming errors that are handled and returned to the user application by the EDX operating system for recovery.

68000 Attachment Hardware/Microcode Error

Recovery in the Motorola 68000 attachment ROS microcode and application microcode dictate the DNAM error recovery when errors are detected on a 68000 attachment. Hardware errors on the attachment or between the attachment and the Series/1 result in disruptions in the communication between DNAM and the application microcode on the attachment. Software errors in the application microcode (such as bus error and divide by zero) can cause the ROS microcode to terminate the attachment. In either instance, the 68000 attachment hardware returns error information to DNAM, describing in detail the error situation within the 68000 attachment hardware and/or microcode. The DNAM Error Task is signaled by the DNAM routine that encountered the hardware or software error. The DNAM Error Task analyzes the error information, generate the appropriate alerts and provide the necessary error recovery.

If the error can be isolated to a particular communication connection and if the attachment microcode can continue to execute effectively, then only that connection is terminated. Other communication connections on the attachment continues normally, without any indication to the user application of an error.

However, if error recovery requires that the attachment be reinitialized by reloading the attachment microcode, then DNAM terminates all communication connections on the attachment with an appropriate error code returned to the user application. In addition, on certain microcode errors, the DNAM Error Task attempts to transfer the attachment status, as well as a postmortem dump of the attachment storage, to a Series/1 data set before attempting to reload the microcode to the attachment.

During the recovery interval, the attachment is temporarily removed from the host configuration (that is, the attachment is off-line). The installation continues operation, performing in degraded mode. DNAM rejects requests from remote hosts to establish communication connections referencing the DDN physical or logical Internet address of that attachment during the recovery interval. Also, DNAM rejects requests to establish communication connections from the local host referencing the DDN physical or logical Internet address during the recovery interval. If the recovery action is successful, then DNAM updates the configuration to reflect the return of the attachment. The installation is now restored to normal operation.

If the recovery action is unsuccessful and the attachment is not the last on in the configuration, then the installation continues to operate in the degraded mode.

DNAM moves the DDN logical Internet address of the failed attachment to another physical attachment. DNAM accepts attempts to establish communication connections from a remote host using the DDN logical address, but it denies attempts using the DDN physical address.

However, if this is the last attachment in the configuration then the ABEND Service routine is invoked to automatically re-IPL the system.

Program (Software) Error in the Series/1

The program detecting a program logic error (cannot happen situation) invokes the ABEND service routine as the appropriate error recovery action to record the error, to capture the necessary data to Series/1 hard disk in a timely manner so that the bug can be fixed, and to initiate a re-IPL of the Series/1.

Configuration and Input Parameter Errors

DNAM generates the appropriate alerts to identify configuration and input parameter errors discovered during DNAM initialization. Because of these fatal system errors, DNAM invokes the ABEND Service routine to automatically re-IPL the Series/1 and cause an automatic fall back in the hierarchy of configuration volumes after the second attempted re-IPL.

The FEP, RAF and NCF have been disclosed as embodied in Series/1 processors. The IBM Series/1 is described for example in the IBM publication "IBM Series/1 System Summary, GA34-0035-5," dated 1979. However, other types of processors could be similarly applied, for example, the IBM Personal System/2 processor.

Although a specific embodiment of the invention has been disclosed, it will be understood by those having skill in the art that minor changes can be made to the embodiment of the invention disclosed, without departing from the spirit and the scope of the invention.

What is claimed is:

1. A data communications system for establishing a communications path from a first SNA host computer over an IP packet switched network to a second SNA host computer comprising:
    a first front end processor having a first SNA interface means coupled to said first SNA host and having a first packet switched interface coupled to said packet switched network, for transferring data and control messages between said first host with an SNA protocol and said packet switched network with a packet switched protocol;
    a second front end processor having a second SNA interface means coupled to said second SNA host and having a second packet switched interface coupled to said packet switched network, for transferring data and control messages between said second host with an SNA protocol and said packet switched network with a packet switched protocol;
    said first interface means including a first SNA PU4 interface in said first front end processor coupled to said first SNA host, for imbedding SNA protocol information in an IP datagram for messages transmitted from said first host;
    said second interface means including a second SNA PU4 interface in said second front end processor coupled to said second SNA host, for extracting said SNA protocol information from said IP datagram for said messages transmitted from said first host and received by said second front end processor.

2. The data communications system of claim 1, wherein said packet switched network is the Defense Data Network.

3. The data communications system of claim 2, wherein said first and second hosts are each a MVS/VTAM host.

4. The data communications system of claim 2, wherein said first front end processor includes means to encapsulate SNA path information units from said first SNA host in a TCP/IP envelope for transmission over said Defense Data Network to said second front end processor.

5. The data communications system of claim 4, wherein said first front end processor includes means to extract SNA path information units enveloped in a TCP/IP envelope received over said Defense Data Network from said second front end processor.

6. The data communications system of claim 5, wherein said second front end processor includes means to encapsulate SNA path information units from said second SNA host in a TCP/IP envelope for transmission over said Defense Data Network to said first front end processor.

7. The data communications system of claim 6, wherein said second front end processor includes means to extract SNA path information units enveloped in a TCP/IP envelope received over said Defense Data Network from said first front end processor.

8. The data communications system of claim 1 which further comprises:
    a network control front end processor having a third SNA interface means coupled to an SNA network control host computer and having a third packet switched interface coupled to said packet switched network, for transferring control messages between said network control host with an SNA protocol and said packet switched network with a packet switched protocol.

9. The data communications system of claim 8, wherein said first front end processor includes a first network control support means coupled to said first packet switched interface means for exchanging said control messages with said network control front end processor.

10. The data communications system of claim 9, wherein said second front end processor includes a second network control support and means coupled to said second packet switched interface means for exchanging said control messages with said network control front end processor.

11. The data communications system of claim 10, wherein said network control front end processor further comprises:
    a plurality of SNA PU2 channel interfaces coupled to said SNA network control host computer.

12. The data communications system of claim 11, wherein said packet switched network is the Defense Data Network.

13. The data communications of claim 12, wherein said SNA network control host is a MVS/VTAM host.

14. The data communications system of claim 12, wherein said network control front front end processor includes means to encapsulate SNA path information units from said SNA network control host in a TCP/IP envelope for transmission over said Defense Data Network to said first and second front end processor and said remote access facility.

15. The data communications system of claim 14, wherein said network control front end processor includes means to extract SNA path information units enveloped in a TCP/IP envelope received over said Defense Data Network from said first and second front end processor and said remote access facility.

16. In a data communications system, a method for establishing a communications path from a first SNA host computer over an IP packet switched network to a second SNA host computer, comprising:

transferring data and control messages between said first host with an SNA protocol and said packet switched network with a packet switched protocol, using a first front end processor having a first PU4 SNA interface means coupled to said first SNA host and having a first packet switched interface coupled to said packet switched network;

imbedding SNA protocol information in an IP datagram, using said first front end processor, for messages transmitted from said first host;

transferring data and control messages between said second host with an SNA protocol and said packet switched network with a packet switched protocol using a second front end processor having a second PU4 SNA interface means coupled to said second SNA host and having a second packet switched interface coupled to said packet switched network, and extracting said SNA protocol information from said IP datagram, using said second front end processor, for said messages transmitted from said first host and received by said second front end processor.

17. The method for establishing a communication path of claim 16, wherein said packet switched network is the Defense Data Network, which further comprises the step of:

encapsulating in said first front end processor, SNA path information units from said first SNA host in a TCP/IP envelope for transmission over said Defense Data Network to said second front end processor.

18. The method of claim 17, which further comprises the step of:

extracting in said first front end processor, SNA path information units enveloped in a TCP/IP envelope received over said Defense Data Network from said second front end processor.

19. The method of claim 18, which further comprises the step of:

encapsulating in said second front end processor, SNA path information units from said second SNA host in a TCP/IP envelope for transmission over said Defense Data Network to said first front end processor.

20. The method of claim 19, which further comprises the step of:

extracting in said second front end processor, SNA path information units enveloped in a TCP/IP envelope received over said Defense Data Network from said first front end processor.

* * * * *